(12) United States Patent
Yamazaki

(10) Patent No.: US 7,907,306 B2
(45) Date of Patent: Mar. 15, 2011

(54) IMAGE PROCESSING APPARATUS AND METHOD, AND IMAGE FORMING APPARATUS AND METHOD

(75) Inventor: Yoshirou Yamazaki, Kanagawa-ken (JP)

(73) Assignee: Fujifilm Corporation, Tokyo (JP)

( * ) Notice: Subject to any disclaimer, the term of this patent is extended or adjusted under 35 U.S.C. 154(b) by 728 days.

(21) Appl. No.: 11/905,116

(22) Filed: Sep. 27, 2007

(65) Prior Publication Data
US 2008/0079959 A1    Apr. 3, 2008

(30) Foreign Application Priority Data

Sep. 29, 2006  (JP) ................ 2006-269594

(51) Int. Cl.
*G06K 15/00* (2006.01)
(52) U.S. Cl. ........ 358/3.03; 358/1.8; 358/1.9; 358/3.06; 358/461; 358/502; 347/8; 347/9; 347/20; 347/37; 347/47
(58) Field of Classification Search .......... None
See application file for complete search history.

(56) References Cited

U.S. PATENT DOCUMENTS

| | | | | |
|---|---|---|---|---|
| 6,390,583 B1 * | 5/2002 | Kato et al. | ...... | 347/15 |
| 6,450,606 B1 * | 9/2002 | Kato et al. | ...... | 347/19 |
| 6,908,171 B2 * | 6/2005 | Ward et al. | ...... | 347/19 |
| 7,130,083 B1 * | 10/2006 | Konno et al. | ...... | 358/3.06 |
| 7,192,112 B2 * | 3/2007 | Nakanishi et al. | ...... | 347/14 |
| 7,201,462 B2 | 4/2007 | Shibata et al. | | |
| 7,281,780 B2 * | 10/2007 | Nagamura et al. | ...... | 347/19 |
| 7,344,225 B2 * | 3/2008 | Nakajo | ...... | 347/41 |
| 7,524,009 B2 * | 4/2009 | Chiwata | ...... | 347/15 |
| 7,564,591 B1 * | 7/2009 | Takahashi et al. | ...... | 358/3.21 |
| 7,673,958 B2 * | 3/2010 | Heiles et al. | ...... | 347/19 |
| 2003/0112283 A1 * | 6/2003 | Ward et al. | ...... | 347/5 |
| 2004/0104951 A1 | 6/2004 | Shibata et al. | | |
| 2004/0218005 A1 * | 11/2004 | Brugue et al. | ...... | 347/37 |
| 2005/0083360 A1 * | 4/2005 | Nakanishi et al. | ...... | 347/12 |
| 2005/0122366 A1 * | 6/2005 | Nagamura et al. | ...... | 347/19 |
| 2005/0259296 A1 * | 11/2005 | Faken et al. | ...... | 358/3.04 |
| 2005/0259885 A1 * | 11/2005 | Yamazaki | ...... | 382/252 |
| 2006/0187507 A1 | 8/2006 | Konno et al. | | |
| 2006/0214960 A1 * | 9/2006 | Chiwata | ...... | 347/10 |

FOREIGN PATENT DOCUMENTS

| | | | |
|---|---|---|---|
| JP | 2004-58282 A | | 2/2004 |
| JP | 2004-142196 A | | 5/2004 |
| JP | 2006-264069 | * | 5/2006 |
| JP | 2001-54956 A | | 2/2007 |

* cited by examiner

*Primary Examiner* — Mark K Zimmerman
*Assistant Examiner* — Dung D Tran
(74) *Attorney, Agent, or Firm* — Birch, Stewart, Kolasch & Birch, LLP

(57) ABSTRACT

An image processing apparatus which converts multiple-value image data of an image into a plurality of dot patterns to form the image on a recording medium includes: a corrected recording element signal table storage device which stores a plurality of corrected recording element signal tables respectively for the graduated tone numbers, each of the corrected recording element signals being one of corrected recording element signal numbers and determined so that banding caused by recording characteristics of the recording elements is corrected in accordance with a correlation between each of the recording elements and surrounding recording elements of said each of the recording elements; and a one-dimensional dot pattern table storage device which stores a one-dimensional dot pattern table which specifies a one-dimensional dot pattern for each of the corrected recording element signal numbers.

6 Claims, 27 Drawing Sheets

NOZZLE ROW
DEPOSITED INK DROPLETS

VIRTUAL NOZZLE ROW   ACTUAL NOZZLE ROW   DEPOSITED INK DROPLETS

FIG.12

CORRECTED NOZZLE SIGNAL TABLE

IMAGE PROCESSING APPARATUS AND METHOD, AND IMAGE FORMING APPARATUS AND METHOD

BACKGROUND OF THE INVENTION

1. Field of the Invention

The present invention relates to an image processing apparatus and method and to an image forming apparatus and method, and more particularly, to half-toning technology used in an image forming apparatus of a dot recording system, which is typified by an inkjet printer.

2. Description of the Related Art

An image forming apparatus has been known which forms an image on a recording medium by means of dots, such as an inkjet printer, thermal printer, or LED printer. In an image forming apparatus of this kind, an image is formed by means of a plurality of dots each of which is composed of droplets of ink liquid, toner particles, or the like, and therefore, essentially, an image is reproduced based on whether a dot is deposited or not deposited at each of locations on a recording medium, such as white paper. Since the number of inks used is limited, then a half-toning method has been used to represent continuous tonal graduation by means of a limited number of inks, or the like.

As one method for converting multiple-value image data which has a multiple-value graduated tone value for each pixel, into binary image data, Japanese Patent Application Publication No. 2004-142196 discloses a method which combines a density pattern method with an error diffusion method. In order to prevent decline in density due to defective nozzles, Japanese Patent Application Publication No. 2004-142196 proposes technology which restricts the quantization number used in the error diffusion method in order to avoid the use of nozzles suffering ejection failure.

Japanese Patent Application Publication No. 2001-054956 discloses a method in which, in order to prevent cyclical (spatially-periodic) non-uniformities which are a distinctive feature of a density pattern method, a dot pattern table which is expanded two-dimensionally is used to select the dot pattern to be adopted for each graduated tone value, on the basis of the positional information relating to the pixel.

Japanese Patent Application Publication No. 2004-058282 discloses technology whereby, in order to correct image defects, such as banding caused by variation in the volume or the ejection direction of a ink droplet ejected from one of the respective nozzles, a shading correction is applied by multiplying a correctional coefficient with respect to the processed nozzle and the surrounding nozzles thereof.

In the method disclosed in Japanese Patent Application Publication No. 2004-142196, it is difficult to correct for banding caused by recording errors other than ejection failure, in other words, to correct for banding caused by variation in the ejected volume of the ink droplet or the ejection direction. Furthermore, the technology described in Japanese Patent Application Publication No. 2004-142196 does not include the concept of using the nozzles surrounding a nozzle suffering ejection failure in order to perform correction, and the corrective performance of this technology is low.

Although the technologies described in Japanese Patent Application Publication No. 2001-054956, and Japanese Patent Application Publication No. 2004-058282 propose techniques for remedying the drawbacks of Japanese Patent Application Publication No. 2004-142196, they involve problems of the following kinds, when considering their application to a combination of an error diffusion method and a density pattern method. With regard to the terms used in the following description, when recording is carried out by moving the recording head and the recording paper (recording medium) relative to each other, the direction of this relative movement is called the "sub-scanning direction" and the direction perpendicular to this sub-scanning direction is called the "main scanning direction".

Using the techniques described in Japanese Patent Application Publication No. 2001-054956 and Japanese Patent Application Publication No. 2004-058282, when a dot pattern table which corrects the respective nozzle characteristics and which has the number of dot pixels corresponding to the number of recording elements in the main scanning direction, and a prescribed number of dots (a sufficiently large number of dots) in the sub-scanning direction, is created for each graduated tone value, and when an image is processed by selecting a dot pattern on the basis of the graduated tone value of the corresponding input pixel and the positional relationship of the pixel (the position of the pixel in the sub-scanning direction with respect to the nozzle to be used), then a problem arises in that the storage capacity required to store the dot pattern tables becomes extremely large.

Furthermore, as for dots in the end portions of a dot pattern, the effects of dots belonging to a neighboring pixel block (dot pattern), are taken into consideration, and therefore, although there is no problem if the neighboring block and the processed block have the same graduated tone value, the corrective performance will decline in the case of dot pixels belonging to the boundaries of the block, if the neighboring blocks have graduated tone values different from the processed block. Since dot pixels (namely, pixels in the boundary sections of blocks) suffering this decline in corrective performance are arranged consecutively in the sub-scanning direction and are also aligned in a regular fashion in the main scanning direction, then there is a problem in that cyclical (spatially-periodic) non-uniformities caused by these dot pixels suffering a decline in corrective performance are liable to be visible.

SUMMARY OF THE INVENTION

The present invention has been contrived in view of these circumstances, an object thereof being to provide an image processing apparatus and method and an image forming apparatus and method, whereby it is possible to reduce the storage capacity required when using density patterns to process an input image at high speed, while correcting image defects such as banding caused by variation in the volume or the ejection direction of the ink droplets ejected from respective nozzles, as well as being able to restrict regular non-uniformities which are liable to occur in the boundary sections between blocks of dot patterns.

In order to attain the aforementioned object, the present invention is directed to an image processing apparatus which converts multiple-value image data of an image into a plurality of dot patterns to form the image on a recording medium, the multiple-value image data being constituted of a plurality of pixels each of which has a graduated tone value that is one of graduated tone numbers, the image being formed by means of: a recording head which has a plurality of recording elements arranged in a first direction, the recording elements forming dots on the recording medium to form the image in accordance with the dot patterns, each of the dot patterns representing an arrangement of the dots corresponding to the graduated tone value for each of the pixels, at least two of the recording elements being disposed at a position corresponding to each of the pixels to form the dots for said each of the pixels; and a relative movement device which causes the recording head and the recording medium to move relative to each other in a second direction that is substantially perpendicular to the first direction, the image processing apparatus including: a corrected recording element signal table storage device which stores a plurality of corrected recording element signal tables respectively for the graduated tone numbers, each of the corrected recording element signal tables being constituted of corrected recording element signals correlated with positions of the recording elements, each of the corrected recording element signals being one of corrected recording element signal numbers and determined so that banding caused by recording characteristics of the recording elements is corrected in accordance with a correlation between each of the recording elements and surrounding recording elements of said each of the recording elements; a one-dimensional dot pattern table storage device which stores a one-dimensional dot pattern table which specifies a one-dimensional dot pattern for each of the corrected recording element signal numbers, the one-dimensional dot pattern representing an arrangement of the dots in the second direction and reproducing said each of the corrected recording element signal numbers; a corrected recording element signal conversion device which converts the multiple-value image data into a one-dimensional sequence of the corrected recording element signals in the first direction correlated with the positions of the recording elements, by selecting the corrected recording element signals from one of the corrected recording element signal tables corresponding to the graduated tone value of each of the pixels according to a position and the graduated tone value of said each of the pixels; and a one-dimensional dot pattern conversion device which converts each of the corrected recording element signals of the one-dimensional sequence in the first direction into the one-dimensional dot pattern in the second direction, by reading out the one-dimensional dot pattern composed of a prescribed number of dot pixels, from the one-dimensional dot pattern table in accordance with said each of the corrected recording element signals of the one-dimensional sequence.

In order to attain the aforementioned object, the present invention is also directed to an image forming apparatus which forms an image on a recording medium by converting multiple-value image data of the image into a plurality of dot patterns, the multiple-value image data being constituted of a plurality of pixels each of which has a graduated tone value that is one of graduated tone numbers, the image forming apparatus including: a recording head which has a plurality of recording elements arranged in a first direction, the recording elements forming dots on the recording medium to form the image in accordance with the dot patterns, each of the dot patterns representing an arrangement of the dots corresponding to the graduated tone value for each of the pixels; a relative movement device which causes the recording head and the recording medium to move relative to each other in a second direction that is substantially perpendicular to the first direction; a recording element characteristics information acquisition device which acquires characteristics information representing recording characteristics of the recording elements based on recording states of the dots formed on the recording medium by the recording elements of the recording head; a virtual recording element conversion device which converts the recording elements into a plurality of virtual recording elements and stores a correspondence relationship between positions of the virtual recording elements and positions of the recording elements, the virtual recording elements being disposed in an arrangement such that an adjacency relationship of the virtual recording elements in the first direction and an adjacency relationship of the dots formed on the recording medium in the first direction are preserved; a correction function calculation device which determines a correction function that corrects recording element signals for the pixels corresponding to the virtual recording elements, in such a manner that banding caused by the recording characteristics of the recording elements is corrected in accordance with a correlation between each of the recording elements and surrounding recording elements of said each of the recording elements; a corrected recording element signal calculation device which calculates corrected recording element signals correlated with the positions of the virtual recording elements for each of the graduated tone numbers by correcting the multiple-value image data of a single density image in accordance with the correction function, each of the corrected recording element signals being one of corrected recording element signal numbers, the single density image being such that all of the pixels constituting the single density image have a same graduated tone value corresponding to said each of the graduated tone numbers; a corrected recording element signal table generation device which divides up the corrected recording element signals for each of the graduated tone numbers into a prescribed number of blocks arranged in the first direction to generate a plurality of corrected recording element signal tables respectively for the graduated tone numbers, each of the corrected recording element signal tables being constituted of the blocks of the corrected recording element signals corresponding to positions of the pixels in the multiple-value image data of the single density image; a corrected recording element signal table storage device which stores the corrected recording element signal tables respectively for the graduated tone numbers; a one-dimensional dot pattern table generation device which generates a one-dimensional dot pattern table which specifies a one-dimensional dot pattern for each of the corrected recording element signal numbers, the one-dimensional dot pattern representing an arrangement of the dots in the second direction and reproducing said each of the corrected recording element signal numbers; a one-dimensional dot pattern table storage device which stores the one-dimensional dot pattern table generated by the one-dimensional dot pattern table generation device; a corrected recording element signal conversion device which converts the multiple-value image data into a one-dimensional sequence of the corrected recording element signals in the first direction corresponding to the positions of the recording elements, by selecting the corrected recording element signals from one of the corrected recording element signal tables corresponding to the graduated tone value of each of the pixels according to a position and the graduated tone value of said each of the pixels; a one-dimensional dot pattern conversion device which converts each of the corrected recording element signals of the one-dimensional sequence in the first direction into the one-dimensional dot pattern in the second direction, by reading out the one-dimensional dot pattern composed of a prescribed number of dot pixels, from the one-dimensional dot pattern table in accordance with said each of the corrected recording element signals of the one-dimensional sequence; and a recording control device which controls driving of the recording elements in accordance with the one-dimensional dot pattern converted by the one-dimensional dot pattern conversion device, and the correspondence relationship between the positions of the virtual recording elements and the positions of the recording elements stored by the virtual recording element conversion device.

According to the present invention, it is possible to correct banding caused by the characteristics of the respective recording elements in a recording head, as well as reducing the data volume of the dot pattern tables required to convert to density pattern (dot patterns), and therefore the storage capacity of the storage device which stores these dot pattern tables can be reduced.

BRIEF DESCRIPTION OF THE DRAWINGS

The nature of this invention, as well as other objects and benefits thereof, will be explained in the following with reference to the accompanying drawings, in which like reference characters designate the same or similar parts throughout the figures and wherein:

FIG. 12 is an illustrative diagram showing a composition of reading out dot rows from a position (read-out position) specified in a one-dimensional dot pattern table;

DETAILED DESCRIPTION OF THE PREFERRED EMBODIMENTS

Overview of Image Processing

Figure 1:
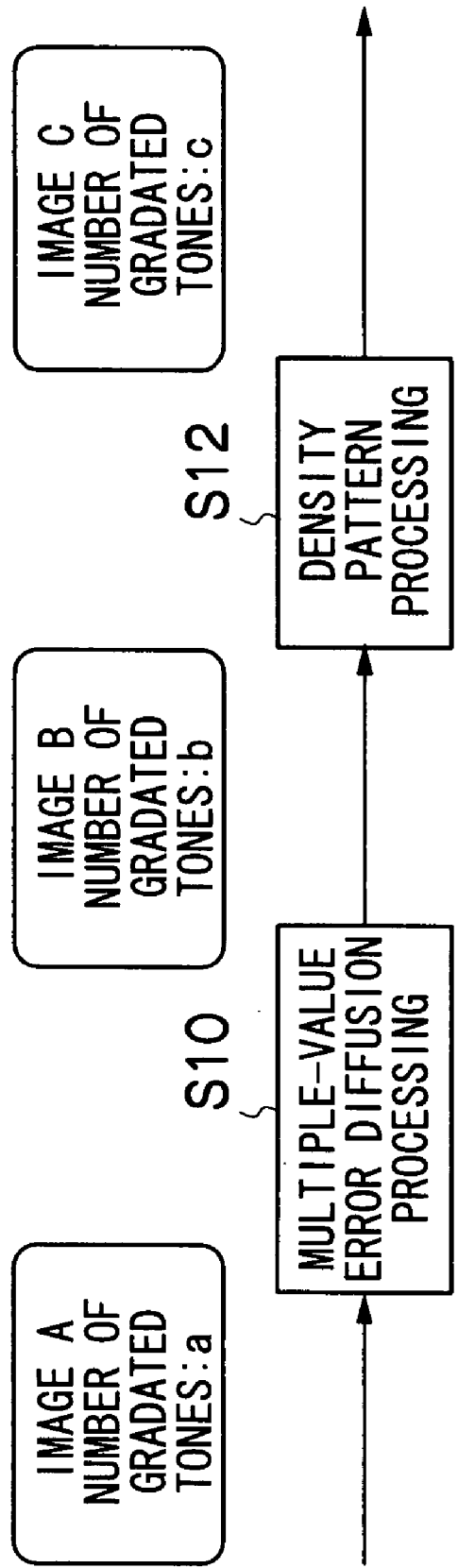
FIG. 1 is a conceptual diagram showing a step of a half-toning process which combines a multiple-value error diffusion method and a density pattern method.

Firstly, an overview of an image processing technique which combines a multiple-value error diffusion method and a density pattern method will be described. FIG. 1 is a conceptual diagram showing steps of a half-toning process which combines a multiple-value error diffusion method with a density pattern method. As shown in FIG. 1, the input image A (number of graduated tones: a) is converted to an image B (number of graduated tones: b) by means of a multiple-value error diffusion processing step (reference numeral S10), and furthermore, this image B is input to a density pattern processing step (reference numeral S12), whereby the image B is converted to a dot image, namely, image C (number of graduated tones: c) (where a>b>c).

For example, it is supposed that the input image A is composed of color image data (number of graduated tones: a=256) in which, for each color component, the graduated tone value of one pixel is represented by 8-bit data (0 to 255). The input image A having 256 tones is converted into a 16-tone image B (number of graduated tones: b=16), for each color component, by means of a multiple-value error diffusion process, and is then further converted into an image C having two tone values (or three to four values specifying the dot size in cases where the dot size is variable), by means of a density pattern process. Here, the color components of the image data that is subject to processing are not specified, but in the case of color image data, similar processing is carried out with respect to the data of each color component (for example, the data of the cyan, magenta, yellow and black color components).

Figure 2:
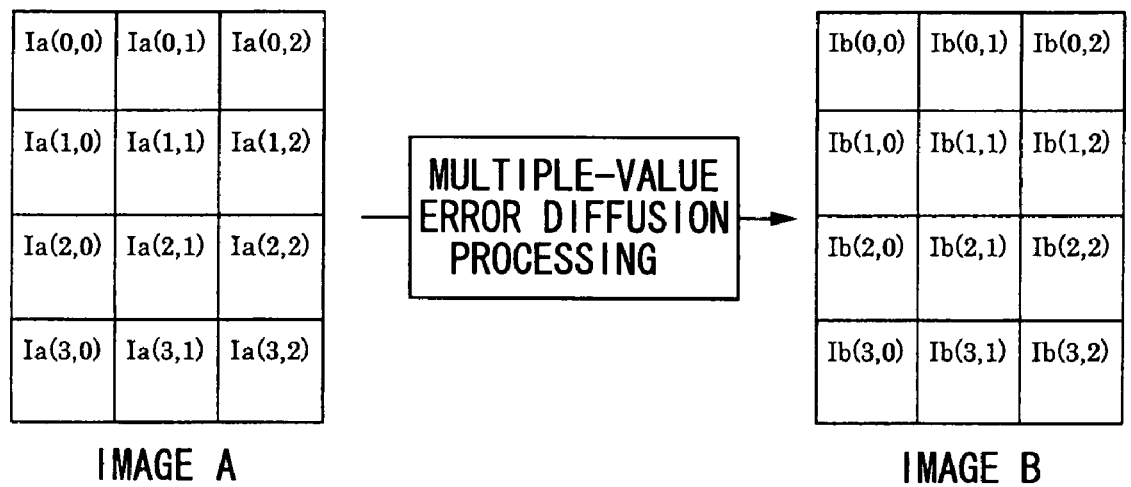
FIG. 2 is a conceptual diagram of multiple-value error diffusion processing.

FIG. 2 is a conceptual diagram of multiple-value error diffusion processing.

The principles of the multiple-value error diffusion method are disclosed in Japanese Patent Application Publication No. 2004-142196. To give an overview of this method, in multiple-value error diffusion, a plurality of quantization threshold values for quantizing to multiple values (here, the number of graduated tones: b) are specified, together with output graduated tone values corresponding to quantization at these respective quantization threshold values, and quantization is then carried out in a raster sequence with respect to each of the image pixels (x, y) in an input image A (number of graduated tones: a), the pixel value Ia (x, y) of a position (x, y) under processing (under quantization processing), which incorporates the accumulated error diffused from surrounding pixels that have already been quantized, being compared with the quantization threshold values, thereby quantizing the number "a" of graduated tones into the number "b" of graduated tones. The differential between the output graduated tone value after quantization and the pixel value before quantization is taken as the error, and this error is diffused in the surrounding pixels that have not yet been processed.

By carrying out the quantization processing described above with respect to all of the pixel positions, the input image A (number of graduated tones: a) is converted into an image B (number of graduated tones: b) having the same number of pixels as the input image A. In FIG. 2, the pixel values of each of the pixel positions (x, y) in the image B are represented as Ib(x, y).

Figure 3:
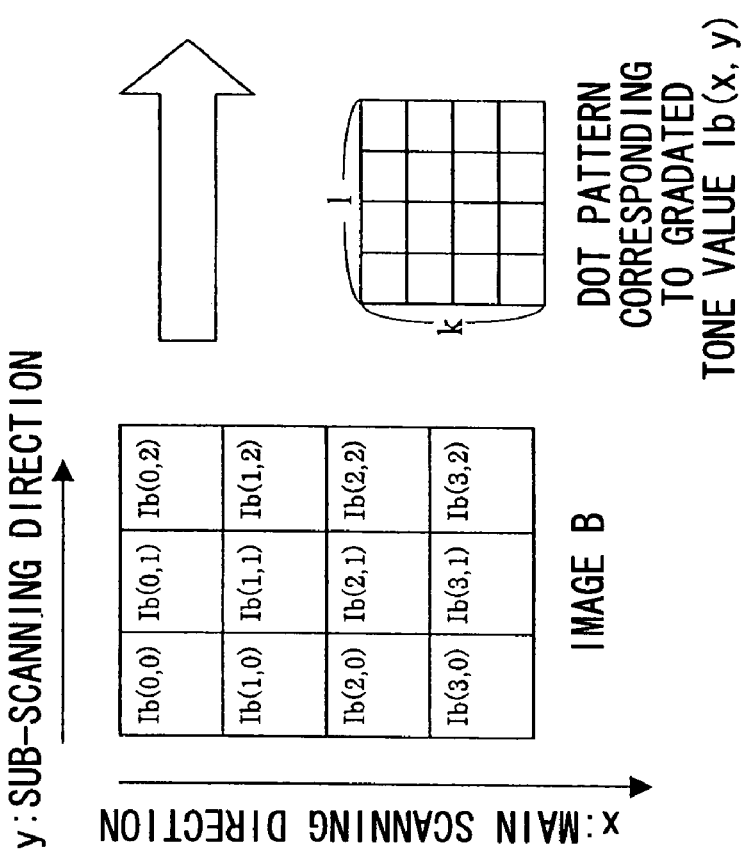
FIG. 3 is a conceptual diagram of density pattern processing.

FIG. 3 is a conceptual diagram illustrating density pattern processing.

The principles of the density pattern method described here are disclosed in Japanese Patent Application Publication No. 2001-054956. In a density pattern method, the graduated tone values Ib(x, y) of the respective pixel positions (x, y) in the image B are each represented (reproduced) by a dot arrangement (distribution) inside a pixel block having a size of k×l (in FIG. 3, a size of 4×4). A dot pattern table having a size of K×L is specified in advance for each of the graduated tone values, and processing is carried out by substituting each of the pixels in the image B with a dot pattern, by selecting a dot pattern having a size of k×l from the dot pattern table, in accordance with the pixel position and the graduated tone value in the image B. K and L are natural numbers which represent the size of the dot pattern table, and k and l are natural numbers which represent the size of the dot pattern.

In FIG. 3, a dot pattern corresponding to a graduated tone value Ib(x, y) is expressed as a pixel block having a size of 4×4, but in actual practice, a dot arrangement pattern is defined which specifies the presence or absence (on/off switching) of a dot, in accordance with the graduated tone value, for each of the dot pixels in one pixel block.

The address information which specifies the location, within the whole dot pattern table having a size of K×L, of a dot pattern corresponding to the position (x, y) of the pixel currently under processing is represented by the value of the remainder when x is divided by (K/k), namely, mod(x/(K/k)), and the value of the remainder when y is divided by (L/l), namely, mod(y/(L/l)).

In other words, the corresponding position (mod(x/(K/k)), mod(y/(L/l))) in the dot pattern table created for each graduated tone value is accessed on the basis of the graduated tone value Ib(x, y) of the pixel at position (x, y) in the image B, and a dot pattern having a size of k×l is output.

In the case shown in FIG. 3, one pixel of the image B is converted into a dot pattern of a 4×4 size pixel block (in other words, one pixel of the image B is rewritten in the form of a dot pattern having 4×4 dot pixels). Each of the dot pixels constituting one pixel block of a dot pattern corresponds to a pixel in which a dot is recorded by means of corresponding one of the nozzles of the recording head, as shown in FIG. 3.

Principles of Correction of Banding by Using Adjacent Nozzles

If a nozzle suffering an ejection defect (an ejection volume abnormality, ejection direction abnormality or a combination of these) is present in a nozzle row of the recording head, then banding is corrected by using nozzles adjacent to the defective nozzle. In this case, the concept of a "virtual nozzle" is introduced.

Figure 4:
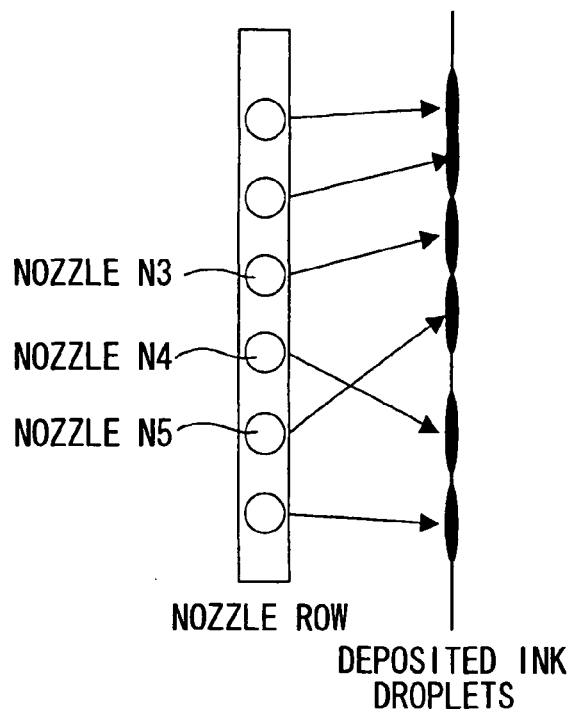
FIG. 4 is a schematic drawing of a nozzle row in a recording head and the variation in the ink droplet depositing positions caused by the nozzle characteristics of the nozzles.

FIG. 4 is a schematic drawing showing a nozzle row in a recording head and the variation in the ink droplet ejection positions caused by the nozzle characteristics of the respective nozzles. FIG. 4 depicts an example of variation in the droplet depositing positions caused by variation in the ejection directions of the respective nozzles. In FIG. 4, the depositing positions of an ink droplet ejected from the nozzle N4 and an ink droplet ejected from the nozzle N5 cross with each other. If crossing of this kind occurs, then a problem arises when a correction function based on the use of adjacent nozzles is performed.

More specifically, in actual practice, performing correction by means of a nozzle that is adjacent to a nozzle under processing (under correction processing) means adjusting the droplet ejection volume and the droplet ejection frequency of dots which are deposited at positions close to each other on the recording medium, so as to correct the respective densities of the dots, and hence this correction is based on the correlation between the dot under processing and adjacent dots (dots to be deposited adjacently to the dot under processing). For example, a dot which is adjacent to the dot formed by a droplet ejected from nozzle N3 in FIG. 4 is the dot formed by a droplet ejected from nozzle N5, and supposing that correction is to be performed on the basis of this nozzle position, then it is necessary to include the nozzle N5 as an adjacent nozzle which is required for the correction of nozzle N3.

In this way, the nozzles adjacent (surrounding nozzles of the nozzle under processing) to the nozzle under processing, which are to be involved in correctional processing, are required to be surrounding nozzles in a nozzle range covering the two neighboring nozzles (N2, N4) on either side of the actual nozzle under processing (for example, the actual nozzle N3), and also including the nozzle beyond N4 (namely, nozzle N5), and hence the corrective hardware installed is required to take the effects of this range of nozzles (the nozzles on either side and a nozzle beyond these) into account. Therefore, a problem arises in that the circuitry becomes very large in size in order to perform this correctional processing.

Figure 5:
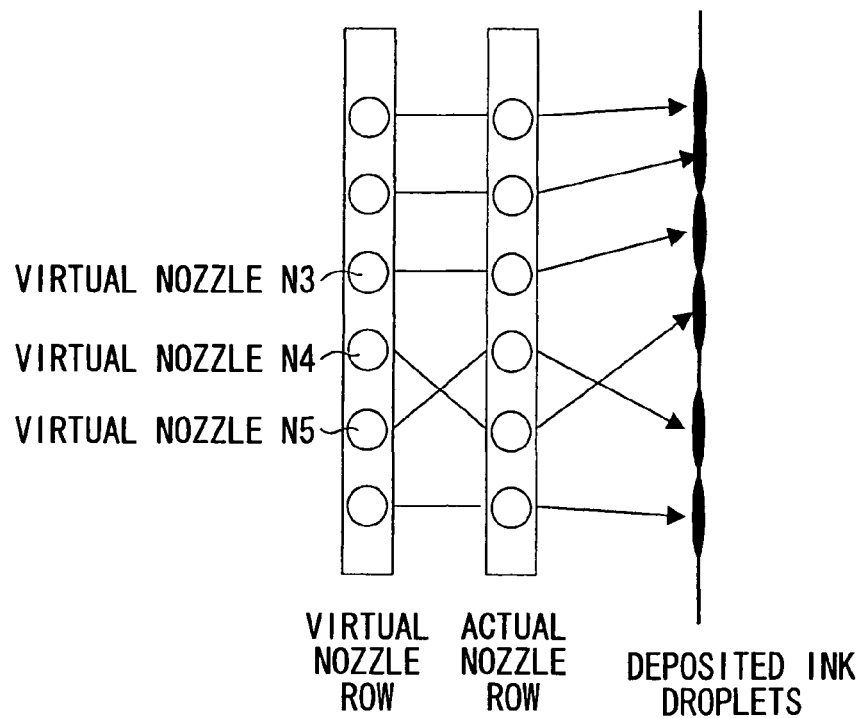
FIG. 5 is an illustrative diagram showing the concept of virtual nozzles.

In order to resolve problems of this kind, as shown in FIG. 5, the concept of "virtual nozzle" is introduced, in order to preserve the adjacency relationships between the nozzle positions in the nozzle row, and the adjacency relationships between the dots formed by the deposited droplets (the dots which are deposited on the recording medium). More specifically, it is supposed that a dot formed by a droplet ejected from virtual nozzle N3 and a dot formed by a droplet ejected from virtual nozzle N4 are adjacent to each other on the recording medium. After calculating the dot arrangement by introducing a row of virtual nozzles of this kind, processing is carried out to revert to data corresponding to the original actual nozzles, on the basis of the correspondence relationships between the actual nozzle positions and the virtual nozzle positions.

In the example shown in FIG. 5, the actual nozzle positions and the virtual nozzle positions are returned to their original states on the basis of the correspondence relationships: virtual nozzle N3→actual nozzle N3, virtual nozzle N4→actual nozzle N5, virtual nozzle N5→actual nozzle N4.

If the "virtual nozzle" concept as described above is used, then it is possible to focus only on the relationship between the nozzle under processing and the adjacent nozzles, irrespective of the actual nozzle characteristics (namely, the fact that droplets are deposited at interchanged positions, or the like). Therefore, benefits are obtained in that the calculational processing is simplified and the related circuitry does not become very large in size.

Figure 6:
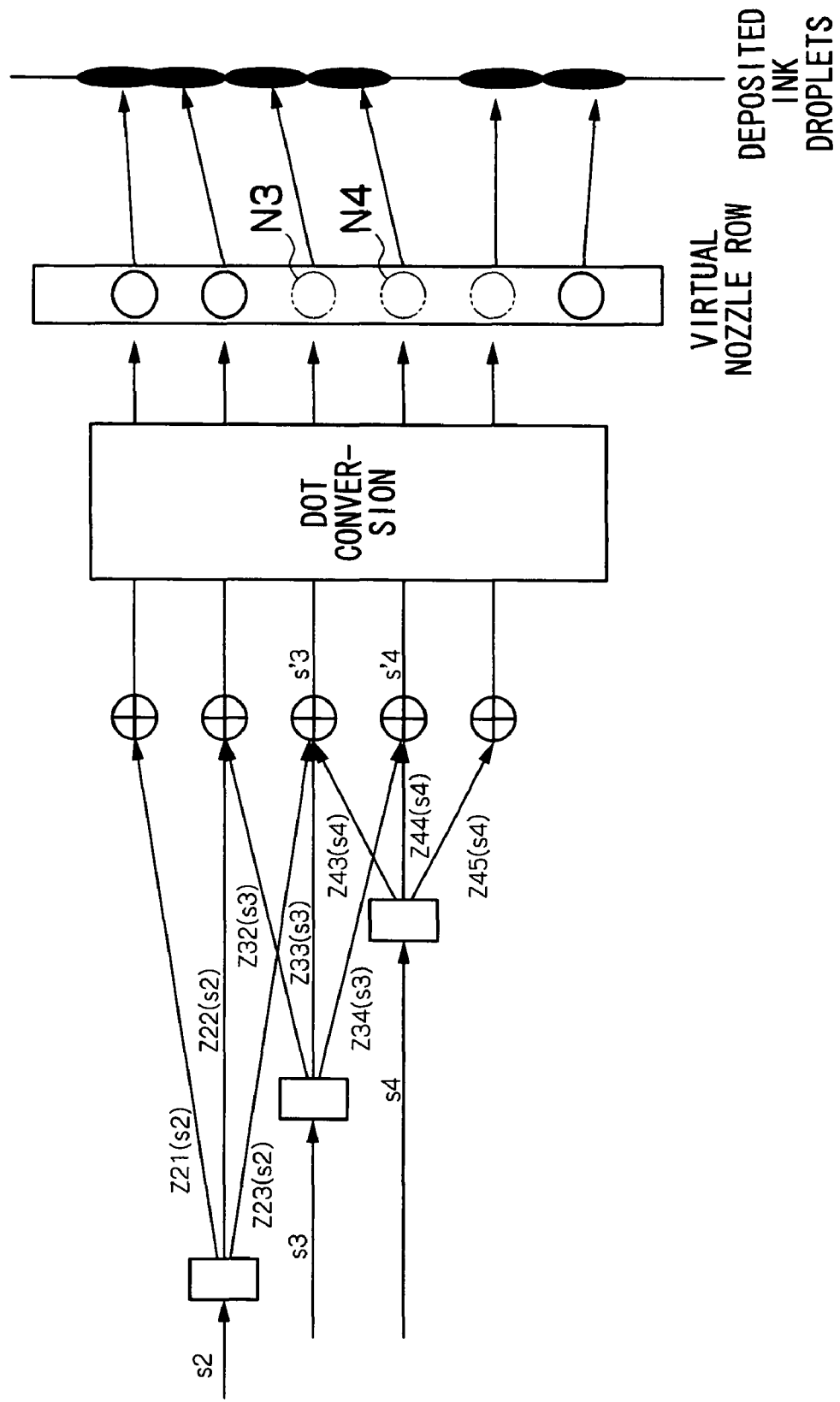
FIG. 6 is an illustrative diagram showing the principles of banding correction on the basis of the correlation with neighboring nozzles.

Method of Creating Dot Pattern Table for Correcting Banding on the Basis of Nozzle Characteristics Here, a method for creating a dot pattern table is described in relation to the row of virtual nozzles described above. FIG. 6 is a diagram showing an overview of correctional processing based on a nozzle correlation model which seeks to correct the banding on the basis of the correlations between the nozzle under processing and the nozzles adjacent to that nozzle.

S2, S3 and S4 respectively represent input signals to the virtual nozzles N2, N3 and N4. Furthermore, $Zij(x)$ represents the correction function from a virtual nozzle Ni to a virtual nozzle Nj. For example, $Z23(x)$ represents the correction function from the virtual nozzle N2 to the virtual nozzle N3.

As shown in FIG. 6, the correctional formulas for the signals of the pixel positions corresponding respectively to virtual nozzle N3 and virtual nozzle N4 are as follows:

$$S'3 = Z33(S3) + Z23(S2) + Z43(S4); \text{ and}$$

$$S'4 = Z44(S4) + Z34(S3) + Z54(S5).$$

The description given here relates to correction by means of the nozzle under processing and the (two) adjacent nozzles on either side of that nozzle, but it is also possible to extend further the range of surrounding nozzles which are used for correction. For example, in a case where correction is made using a nozzle range which covers the two adjacent nozzles on either side of the nozzle under processing and also covers the two nozzles to the outside of these adjacent nozzles, the correctional formula will be as given below:

$$S'4 = Z44(S4) + Z34(S3) + Z54(S5) + Z24(S2) + Z64(S6).$$

The correction function may be based on a table that is beforehand stored, or it may use a primary polynomial expression, such as $Zij(x) = Cij \times x + Dij$.

For the method of determining the correction functions and coefficients, it is possible to use a commonly known technique as described in Japanese Patent Application Publication No. 2004-058282. To give one example, in the case of an Nth-order polynomial expression, the coefficient (Vijk) is taken to be an undetermined coefficient, the dot density distribution based on the positions and sizes of the dots to be formed by droplets ejected from the respective nozzles is measured and stored as data, perceived values are calculated (possibly, by means of VTF: Visual Transfer Function) for a predetermined input signal Sx (signals which are input to the nozzle are set as the same signal Sx), the perceived values being deduced from the brightness distribution calculated on the basis of the expected output (namely, the dot positions and the dot density distribution of dots deposited by the respective nozzles, as obtained by converting the output values from the respective nozzles into dots by means of a commonly known blue noise characteristics dithering process or an error diffusion method, or the like), and the respective coefficients (Vijk) can then be calculated by means of an optimization technique, in such a manner that the perceived values become equal to or less than a prescribed value or assume a minimum value. The optimization technique used may be, for example, a Genetic Algorithm (GA), a Simulated Annealing (SA) method, or the like.

Using the correction functions corresponding to respective nozzles determined in this fashion, the same input signals Sx are input in respect of all of the nozzles, and the signals Sx is corrected to obtain a signal Sx' for each of the nozzles. By performing a dot conversion of this corrected signal Sx' (by using a commonly known blue noise characteristics dithering process, an error diffusion method, or the like), a dot image corresponding to the virtual nozzles is obtained. The obtained dot image has a number of pixels (K×L), namely, K pixels in the main scanning direction, where K is the number of nozzles arranged in the main scanning direction in the virtual nozzle row, and a prescribed number of dots L in the sub-scanning direction. Here, the prescribed number of dots L in the sub-scanning direction is preferably a sufficient number of dots to prevent undesirable repeat patterns (spatially-periodic patterns) from becoming visible, when the dot images are arranged repeatedly in the sub-scanning direction.

By inputting the respective graduated tone values of the image B as the input signal Sx, and carrying out the calculation described above, a dot image (an image of a dot arrangement which has been corrected in respect of banding) corresponding to the respective graduated tone numbers is obtained. In this case, the graduated tone value and the graduated tone number have a relationship in which the graduated tone value is a specific value indicated by the graduated tone number (i.e., the graduated tone value is one of the graduated tone numbers). The plurality of dot images thus formed respectively for the graduated tone numbers are used as a plurality of dot pattern tables.

<Consideration of Technical Issue 1>

Figure 7:
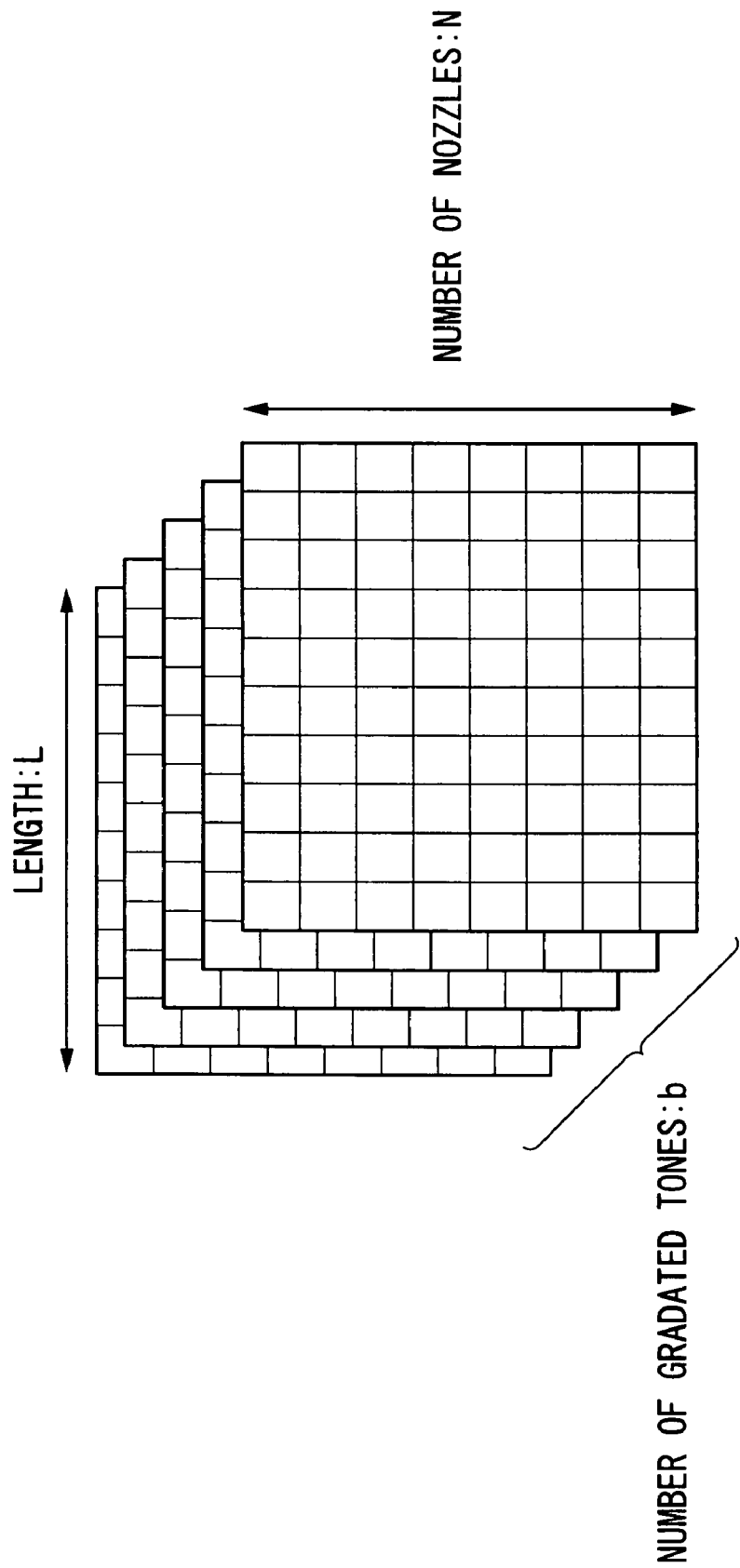
FIG. 7 is a conceptual diagram for describing the storage volume of a dot pattern table in the related art.

The size of the dot pattern tables required in this case (in the related art) is calculated provisionally. Taking the number of graduated tones in the image B to be b (in other words, there are "b" graduated tone numbers), taking the number of nozzles to be N, and taking the length of the dot pattern tables (the number of pixels in the direction perpendicular to the nozzle row), to be L, it can be seen that a storage capacity of the order of N×L×b is required in the related art, as shown in FIG. 7. Therefore, to reduce the storage capacity is an issue (technical issue 1) in the related art.

<Consideration of Technical Issue 2>

The dot pattern tables in FIG. 7 are created in order to correct the banding in the input image, and the dot pattern tables correspond to a case where the input image (image B) is a solid image (uniform density image) when the dot pattern tables are prepared in the above-described manner. In other words, when preparing the dot patterns, a solid image of each of the graduated tone values is input, and the dot arrangement pattern (dot image) obtained as a result of this calculation is taken as a dot pattern table, as described above with reference to FIG. 6.

Processing based on a density pattern method is then carried out using the dot pattern tables created under the conditions described above. In this case, if the input image is not a solid image, then in the dot rows belonging to the boundary regions of the dot patterns which are substituted respectively for pixels in the density pattern method, there may in practice be a density variation with respect to the adjacent pixel (dot pattern block). However, the dot pattern used (the dot pattern created from a solid image) is based on the premise that there is no density variation between adjacent pixels. Therefore, a problem arises in that the banding correction performance declines in these boundary positions.

In particular, if the input image is a graduated image which has a density gradient in the nozzle arrangement direction (the nozzle arrangement direction is the main scanning direction in the case of a full line recording head which has a page-wide recording width), then the aforementioned problem is particularly marked, and if dot rows which are suffering a decline in the banding correction performance (at the boundary positions of dot patterns) are arranged in a linear fashion, then due to the characteristics of human vision (which has high visual sensitivity in the horizontal and vertical directions and poor sensitivity in oblique directions), line-shaped artifacts which continue in the horizontal direction or the vertical direction of the image will be readily visible (conspicuous).

First Embodiment of the Present Invention

From the viewpoint of resolving the technical issue 1 which is described above, in a first embodiment of the present invention, firstly, an image B which has been converted to have a number of graduated tones "b" by means of a multiple-value error diffusion process is further converted to multiple rows in the main scanning direction (nozzle arrangement direction).

Here, the case of one pixel Ib(1,1) in the image B will be described as an example with reference to FIG. 8. This pixel Ib(1,1) is disposed in a position corresponding to the virtual nozzles N3, N4, N5, and N6. Corrected nozzle signals as described above with reference to FIG. 6 which include the contributions of the adjacent nozzles in order to correct the banding are calculated in advance for the virtual nozzles N3, N4, N5, and N6, and are beforehand stored in the form of a table (corrected nozzle signal table) in a storage device. In this case, the plurality of corrected nozzle signal tables are stored respectively for the graduated tone numbers (in the case of the present example, integers 1 through b, for example). The corrected nozzle signals corresponding to a particular pixel value (a specific graduated tone value) are then extracted from the storage device.

Figure 9:
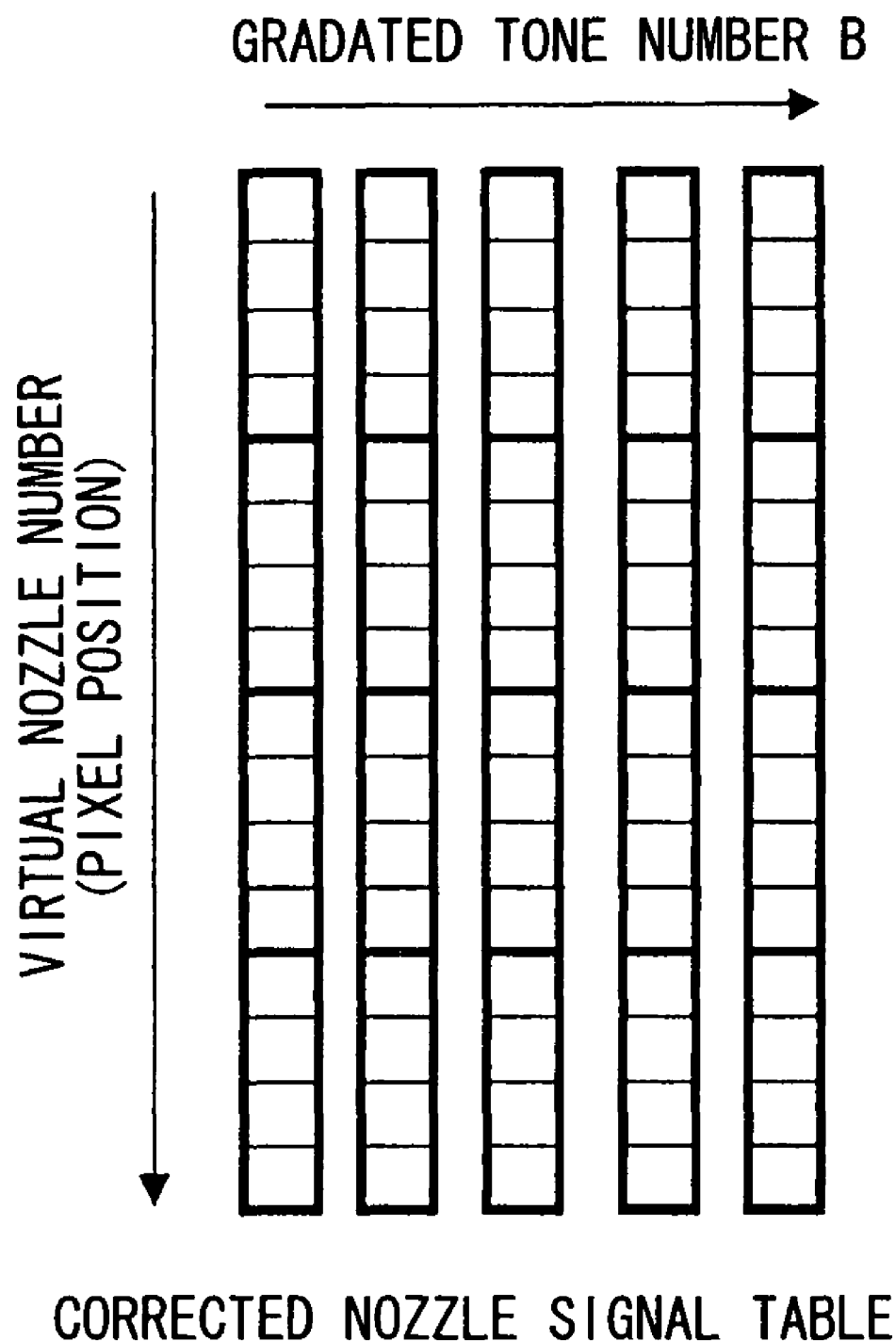
FIG. 9 is an illustrative diagram of a corrected nozzle signal table used in the first embodiment.

FIG. 9 is a conceptual diagram of the corrected nozzle signal table. The vertical axis in FIG. 9 represents the nozzle position in the virtual nozzle row (the virtual nozzle number), in other words, the dot pixel position which corresponds to the virtual nozzle number, and the horizontal axis indicates the graduated tone number. The details of the method of creating the corrected nozzle signal table are described later. In the corrected nozzle signal table, corrected nozzle signals corresponding to the respective virtual nozzle positions are defined for each of the graduated tone numbers, in such a manner that any banding caused by the nozzle characteristics (recording characteristics such as variation in the ejection volume or variation in the depositing positions) is corrected on the basis of the correlation with neighboring nozzles. The banding caused by the nozzle characteristics will thus be eliminated, provided that the multiple-value graduated tone values indicated by these corrected nozzle signals are reproduced accurately (by conversion to a dot arrangement).

The method of creating a corrected nozzle signal table is as follows. More specifically, the same graduated tone value B (graduated tone number) is input in respect of each of the nozzles, a calculation is performed using previously determined correctional coefficients from the adjacent nozzles, and the results of this calculation are beforehand stored in the form of a table. For example, a table of nozzle signals for a specified graduated tone number is calculated by using the correction function determined by the method shown in FIG. 6 (more specifically, S'4=Z44(S4)+Z34(S3)+Z54(S5), etc.), and this calculation is repeated for all of the graduated tone numbers. The corrected nozzle signal table (corrected recording element signal table) is thereby prepared for each of the graduated tone numbers.

As shown in FIG. 9, a plurality of one-dimensional sequences of corrected nozzle signals aligned in the nozzle row direction (corresponding to "first direction") are specified in accordance with the graduated tone value B (graduated tone number), the number of rows of corrected nozzle signals being equal to the number of graduated tones. As shown in FIG. 6, the corrected nozzle signals correct the original graduated tone value (number of graduated tones: b) on the basis of the correlation with the adjacent nozzles, and therefore the corrected nozzle signals have a larger number of graduated tone values (for example, 32 tones) than the number of graduated tone values in the image B (for example, 16 tones). The tones which are added to the number of tones in the image B are equivalent to fractional tone values.

Furthermore, in the present embodiment, the graduated tone value (pixel value) assigned to one pixel (x,y) in the image B is ultimately converted into a two-dimensional pattern of dots (a density pattern) formed by ejecting droplets from a plurality of virtual nozzles (in the present example, four virtual nozzles) which are aligned in the main scanning direction, and therefore in the corrected nozzle signal table shown in FIG. 9, the cells at the positions (each of which is equivalent to a position of a dot pixel) in the main scanning direction, which correspond to the respective virtual nozzle numbers, are divided into blocks composed of four consecutive cells in the main scanning direction, each block being associated with a pixel position in the main scanning direction of the image B. In other words, as shown in FIG. 9, the demarcated dot pixel blocks each of which has a unit of four cells aligned in the main scanning direction are each associated with one pixel in the main scanning direction of the pixel B.

Figure 8:
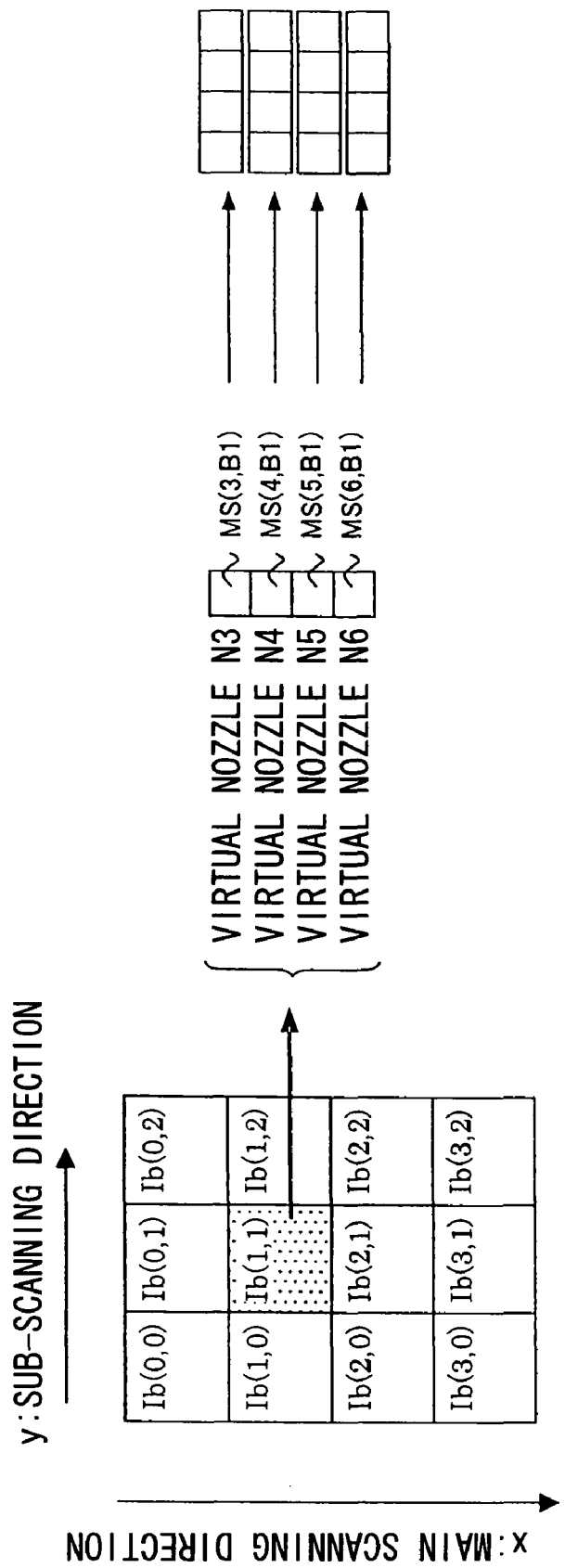
FIG. 8 is a conceptual diagram of a density pattern method according to a first embodiment of the present invention.

When converting one pixel in the image B into a two-dimensional dot pattern (density pattern) of a prescribed block of dot pixels (here, a block of size 4×4), firstly, as shown in FIG. 8, the pixel is converted into a one-dimensional nozzle signal block (one-dimensional sequence of the corrected nozzle signals in the main scanning direction) which corresponds to nozzle positions in one row which is aligned in the main scanning direction (vertically).

To give a concrete description in relation to FIG. 8, the corresponding virtual nozzles are specified in accordance with the position of x=1 in the main scanning direction, of the pixel Ib(1,1), and the recording start position on the recording medium. Here, it is supposed that the positions of the virtual nozzles N3, N4, N5 and N6 (virtual nozzle numbers: 3, 4, 5, and 6) correspond to the main scanning direction position x=1. In this embodiment, a case is described in which four nozzles are associated with one pixel in the main scanning direction, but the number of associated nozzles is not limited to four.

By referring to the corrected nozzle signal table (FIG. 9) on the basis of the graduated tone value B1 (graduated tone numbers) and the virtual nozzle numbers relating to the pixel Ib(1,1), a corrected nozzle signal MS(Ni, B1) is specified for each of the nozzle positions (virtual nozzle positions). In other words, the corrected nozzle signals MS(3,B1), MS(4,B1), MS(5,B1) and MS(6,B1), which correspond to the respective nozzles having the virtual nozzle numbers Ni=3, 4, 5, and 6, are read out from the storage device (the memory which stores the corrected nozzle signal table). The one-dimensional sequence of the corrected nozzle signals in the main scanning direction (nozzle row direction) is thereby obtained.

Thereupon, for each of these corrected nozzle signals in the one-dimensional sequence in the main scanning direction, a one-dimensional dot pattern aligned in the sub-scanning direction (corresponding to "second direction"), which is previously determined for each pixel, is read out from a storage device (a memory storing the one-dimensional dot pattern tables) and output. These dot patterns are converted to a two-tone image (dot pattern) composed of four dot pixels aligned respectively in the horizontal direction, for each of the four pixel positions aligned in the vertical direction.

Figure 10:
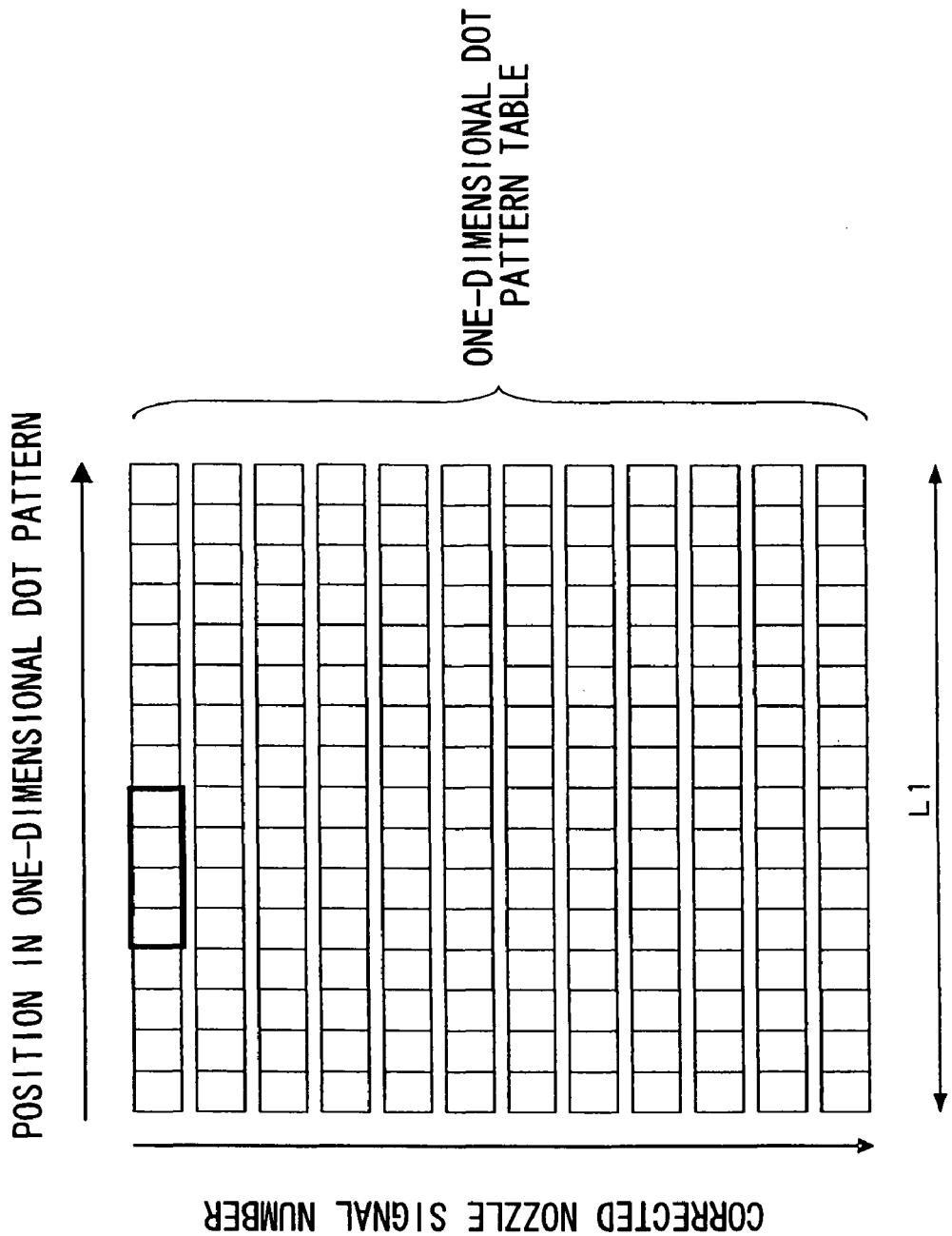
FIG. 10 is a conceptual diagram of dot pattern tables according to the first embodiment.

FIG. 10 is a conceptual diagram of one-dimensional dot pattern tables used in the present embodiment. In FIG. 10, the vertical axis represents corrected nozzle signal (corresponding to "corrected recording element signal number"), and is divided up according to the number of graduated tones of the corrected nozzle signal (in other words, the corrected nozzle signal and the corrected nozzle signal number have a relationship in which the corrected nozzle signal is one of the corrected nozzle signal numbers). The horizontal axis represents the position of the one-dimensional dot pattern. The length L1 of the one-dimensional dot pattern tables, in the direction of the horizontal axis, is a length (number of dot pixels) corresponding to the number of dots required in order to reproduce accurately the graduated tone value (i.e., each of the corrected nozzle signal numbers) indicated by the corrected nozzle signal, and the number of dots is adjusted in such a manner that the prescribed graduated tone value is achieved when a particular length is extracted.

Here, the method of creating a one-dimensional dot pattern table will be described.

The following methods, for example, are used to create a one-dimensional dot arrangement (a number of dots within a uniform space), which is specified in respect of the value of the corrected nozzle signal.

Method 1

Mode Using One-dimensional Error Diffusion Processing

Figure 11:
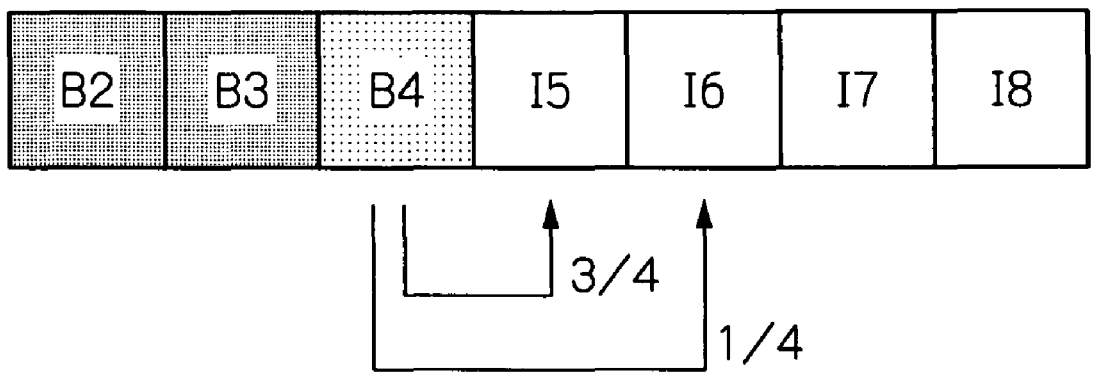
FIG. 11 is an illustrative diagram showing one example of a method of creating one-dimensional dot pattern tables.

FIG. 11 is a diagram showing an overview of one-dimensional error diffusion processing. In FIG. 11, B2 to B4 represent the value of pixels after quantization. The pixel under processing is B4; and I5 to I8 represent unquantized pixels. The error which occurs when the pixel under processing (B4) is quantized is diffused into the subsequent unquantized pixels I5 and I6, at a prescribed allocation ratio. Here, the diffusion coefficients are taken to be ¾ and ¼, respectively, but the diffusion coefficients can be set appropriately, as desired.

A one-dimensional dot pattern table is obtained by converting a prescribed number of pixels into a dot row, taking the value Ii of each of the unquantized pixels to be the same graduated tone value (a number of dots decided in accordance with the corrected nozzle signal).

Method 2

Mode Using Blue Noise Mask Method

A uniform signal (uniform value) of a solid image is input and converted into dots using a blue noise mask calculated by means of a commonly known method, and the result of this conversion process is extracted in a one-dimensional form. A mode is also possible in which the extracted one-dimensional dot row is set as a one-dimensional dot pattern table.

By using the methods 1, 2, or the like, described above, a one-dimensional dot pattern table is obtained for each of the corrected nozzle signal numbers, as illustrated in FIG. 10.

The position in the vertical axis direction, in the one-dimensional dot pattern tables shown in FIG. 10, is specified on the basis of the value of the corrected nozzle signal (in other words, one dot pattern is selected (specified) from the one-dimensional dot patterns shown in FIG. 10), and furthermore, the extraction position (the read-out position) in the horizontal axis direction within the dot pattern table (length L1) thus specified, is decided by means of a random number or the like. In this way, a dot sequence at the specified position (for example, the dot row corresponding to four dot pixels outlined by the thick line in FIG. 10) is read out.

Figure 12:
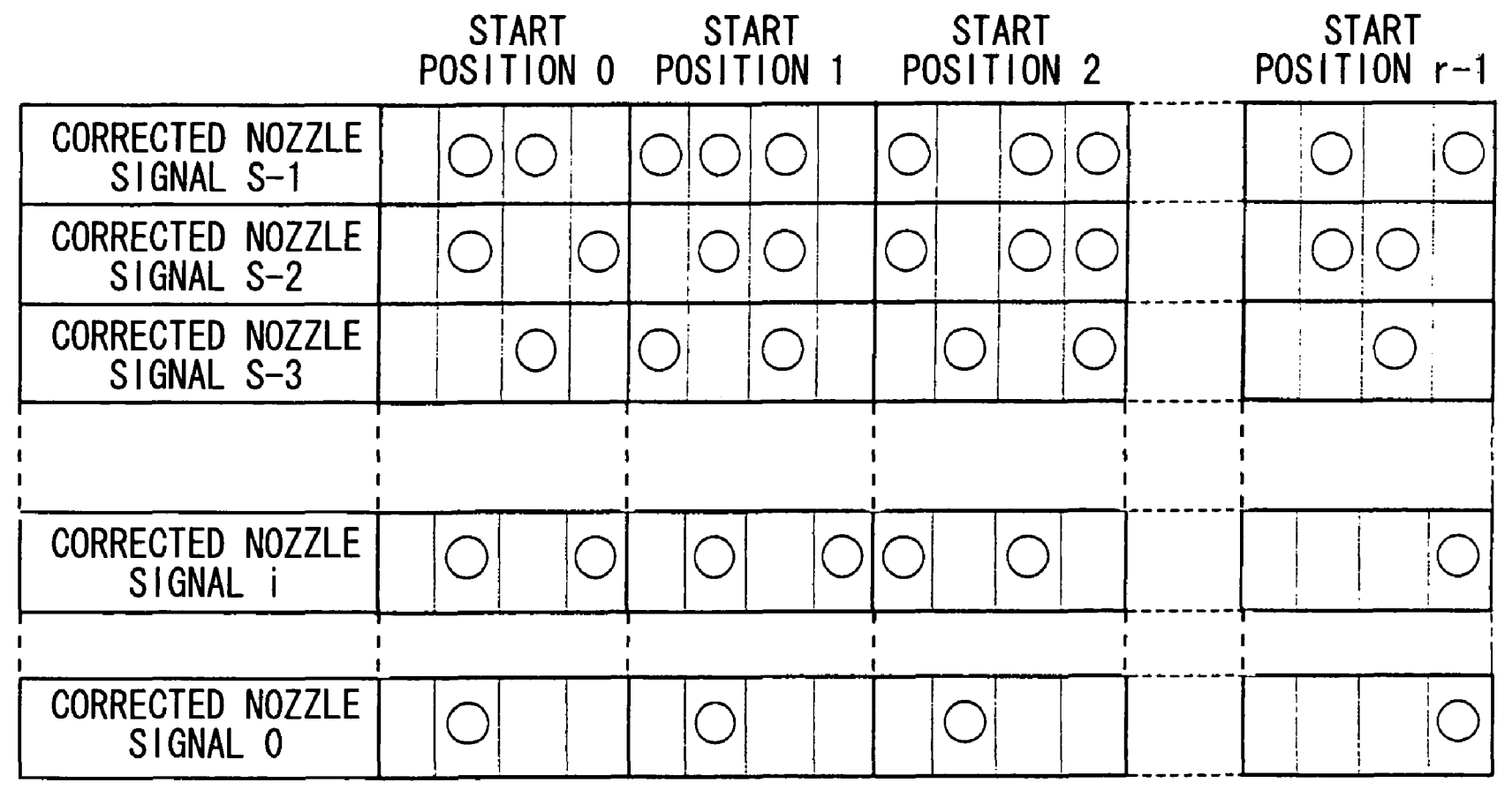

FIG. 12 is a diagram showing a chart of the dot pattern extraction units in the one-dimensional dot pattern table (the read-out unit of a one-dimensional dot row), and the extraction positions (also referred to a "read-out positions" or "read-out start positions"). The vertical axis in this chart represents the value of the corrected nozzle signal numbers, and the horizontal axis represents the position of the dot pixel in the one-dimensional dot pattern table. In FIG. 12, a one-dimensional dot pattern table having a length of L1 (=4×r) in the horizontal axis direction is divided up into blocks (units) of four dots each, starting from the pixel cell position on the left-hand end (j=0), and start position numbers 0, 1, 2, ..., r−1 are assigned to the blocks according to their sequence of alignment. Here, r is an appropriate natural number.

As stated previously, the read-out start position is specified from numbers 0, 1, 2, ..., and r−1, by means of a random number. For example, in respect of the corrected nozzle signal MS(3,B1) shown in FIG. 8, the one-dimensional dot pattern table (FIG. 10 or FIG. 12) is referenced, the position of the one-dimensional dot pattern that is to be extracted is decided by means of a random number, and the one-dimensional dot row contained in the one-dimensional dot pattern table at the specified position is read out and output as a dot pattern constituted of four dot pixels which corresponds to MS(3, B1).

In a similar fashion, dot pattern positions are decided by means of a random number, and dot patterns each constituted of four dot pixels are output on the basis of the dot row at the corresponding position, in respect of MS(4,B1), MS(5,B1) and MS(6,B1) in FIG. 8. This embodiment is described with respect to dot patterns each of which is constituted of four dot pixels aligned in the sub-scanning direction, but the number of dots in a dot pattern is not limited to four.

The reasons for using a random number in order to decide the position at which the dot pattern (dot row) starts to be read out from the one-dimensional dot pattern table of length L1 are as follows. More specifically, if a pattern having the same dot arrangement is always output with respect to a signal (the same corrected nozzle signal) of the same value, in each of the nozzle positions, rather than using a random number, then when the output dot rows are viewed in a two-dimensional configuration, the same dot arrangement is repeated in a regular fashion and therefore an artifact is liable to occur. In order to prevent the occurrence of artifacts of this kind, even if the corrected nozzle signals have the same value in respect of different nozzle positions, it is desirable to read out the dot patterns each constituted of four dot pixels from different positions (in other words, from random positions determined by means of a random number) within the dot row in the previously calculated one-dimensional dot pattern table. In so doing, it is possible to eliminate any recurrent characteristics in the dot patterns of the two-dimensional arrangement of dot rows which is output, and therefore the occurrence of artifacts as described above can be suppressed.

A more desirable mode of a method for deciding the position of the dot row that is to be read out from the one-dimensional dot pattern table is one where the corrected nozzle signal is compared with the corrected nozzle signal for the previous pixel which has been stored, and if the signal value of the pixel under processing is the same as that of the previous pixel, then the one-dimensional dot pattern is read out at a position in the sub-scanning direction which is adjacent to the position of the one-dimensional dot pattern read out for the previous pixel (for instance, the previous pixel in relation to Ib(2,1) in FIG. 8 will be the pixel Ib(2,0)), which has already been stored.

In other words, similarly to the alignment sequence of the pixels in the sub-scanning direction, the pixel block in the next position of the alignment of pixel block units in the one-dimensional dot pattern table is used (in other words, the next pixel block in the sub-scanning direction that is adjacent to the pixel block position corresponding to the previous pixel is used). The one-dimensional dot pattern tables are calculated and prepared with the aim of reproducing the respective graduated tone values favorably by means of a row of dots in the sub-scanning direction, and therefore if the same signal value is repeated consecutively, it is desirable to maintain this favorable dot arrangement.

On the other hand, if the corrected nozzle signal is not the same as the corrected nozzle signal of the previous pixel, which has been stored, then the position is determined by generating a random number.

According to this mode, in a case where pixels having the same signal value are adjacent to each other, favorable dot patterns are selected following the alignment sequence of the dot pattern table, whereas in the case of pixels having different signal values, dot rows are specified at random, thereby making it possible to avoid the occurrence of cyclical (spatially-periodic) non-uniformities.

An even more desirable mode is one in which, similarly to the mode described above, when a corrected nozzle signal has the same signal value when compared with the corrected nozzle signal for the previous pixel, which has already been stored, the position which is adjacent to the position in the one-dimensional dot pattern table relating to the already stored previous pixel in the sub-scanning direction is used, but if the graduated tone value is not the same as that of the previous pixel, then after generating a position by means of a random number, it is judged whether or not the total of the dot row conversion results for a number of consecutive pixels in the main scanning direction are able to maintain a prescribed standard level, and if the standard level cannot be maintained, then a random number is generated again, and a new position in the one-dimensional dot pattern table is selected, this reselection of the position being carried out repeatedly until the prescribed standard level described above is achieved.

Figure 13:
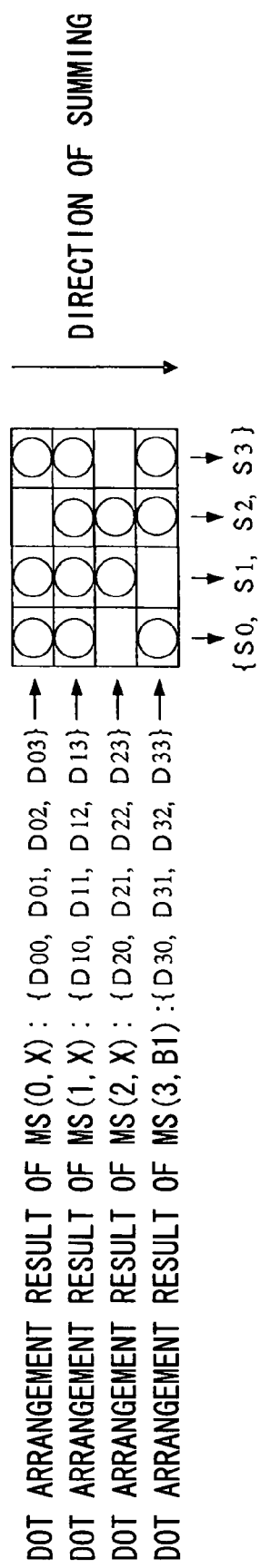
FIG. 13 is an illustrative diagram showing a method for determining one-dimensional dot pattern tables while evaluating the level of the dot distribution in consideration of the results of previous conversion operations.

Describing a concrete example with reference to FIG. 13, for instance, when deciding a position in the one-dimensional dot pattern table in relation to MS(3,B1), if the signal value of the pixel is different from the signal value of the previous pixel in the sub-scanning direction, then the position is specified by means of a random number and the dot row conversion candidates D30, D31, D32, and D33 are determined for MS(3,B1) for a pixel to be processed.

On the other hand, the dot row conversion results for a number of the most recent pixels (in FIG. 13, the three previous pixels) in the main scanning direction are stored provisionally in a storage device, such as a buffer, and a plurality of dot rows including the stored dot row conversion results for a number of previous pixels and the dot row conversion candidate currently under processing are studied in order to find the total of the number of dots in the main scanning direction, at each of the dot pixel positions aligned in the sub-scanning direction. It is then judged whether or not the total of the number of dots is substantially equal between the pixels in the sub-scanning direction (namely, whether or not there is any marked variation in the number of dots in the main scanning direction between pixels in the sub-scanning direction).

If the already stored dot row conversion results of the recent pixels, and the dot row conversion candidates for the position under processing are written in the form given below:

Dot row conversion results for MS(0,X): D00, D01, D02, D03
Dot row conversion results for MS(1,X): D10, D11, D12, D13
Dot row conversion results for MS(2,X): D20, D21, D22, D23
Dot row conversion results for MS(3,B1): D30, D31, D32, D33, then the total number of the dots in the main scanning direction (the vertical direction in FIG. 13) for each position j (j=0, 1, 2, 3) in the sub-scanning direction of the dot rows (the horizontal direction in FIG. 13) are given by the following expressions:

$$S0=\Sigma Di0, S1=\Sigma Di1, S2=\Sigma Di2, S3=\Sigma Di3.$$

Here, the symbol $\Sigma$ indicates that the sum is determined for values of i=0, 1, 2, 3 (in other words, S0=D00+D10+D20+D30, in the case of S0=$\Sigma$Di0, for example). In FIG. 13, the graduated tone value X is a different value from B1, and the respective X values in MS(0,X), MS(1,X) and MS(2,X) may all be the same, or they may be different to each other.

In evaluating with respect to the prescribed standard level, on the basis of the values S0, S1, S2 and S3 determined by the calculation described above, for example, if the value of R calculated as described below is smaller than a prescribed value, then it is judged that the prescribed standard level can be maintained. The value of R is calculated by means of the following expression:

$$R=\Sigma(Si-Ave)^2, \text{ where } Ave=\Sigma Si/n.$$

In this equation, n is the number of values of i, and in the case of FIG. 13, n=4 (i=0, 1, 2, 3).

The method of evaluating the standard level is not limited to the example described above (the square of the difference with respect to an average value), and various other substitute methods may be employed. For example, a more simple method is one where it is judged that the prescribed standard level can be maintained, when the differential between the maximum value MAX (S0, S1, S2, S3) and the minimum value MIN (S0, S1, S2, S3) among S0, S1, S2, and S3 is equal to or less than a prescribed value. In other words, if the prescribed value (threshold value) forming a judgment reference is taken to be K, then it is judged that the prescribed standard level can be maintained in cases where a relationship of MAX (S0, S1, S2, S3)−MIN (S0, S1, S2, S3)$\leq$K is satisfied.

As described above, it is judged whether or not a prescribed standard level can be maintained by the dot row conversion candidate for the position under processing, and if the standard level can be maintained, then the candidate is adopted. On the other hand, if it is judged that the standard level cannot be maintained, then this means that the conversion would be inappropriate, and therefore the dot row conversion candidate (in the case of the above example, the combination of D30, D31, D32, and D33) is discarded, a new dot row conversion candidate is extracted by generating a random number again, and the processing described above is repeated, until a suitable dot row conversion candidate is discovered. In so doing, it is possible to suppress the occurrence of artifacts as described above.

Comparison of Storage Volume of Dot Pattern Tables

As described above with reference to FIG. 7, when using the two-dimensional dot pattern tables in a density pattern method as in the related art, if the number of graduated tones is b, the number of nozzles is N, and the length of the two-dimensional dot pattern is L2, then the dot pattern tables in the case of the related art will have a data size of the order of N×L2×b.

On the other hand, when using one-dimensional dot pattern tables according to the present embodiment, taking the number of graduated tones of the corrected nozzle signals to be S, and taking the length of the one-dimensional dot pattern tables to be L1, then the required data size is the sum of the data size of the corrected nozzle signal table (N×b) shown in FIG. 9, plus the data size of the one-dimensional dot pattern table (S×L1) shown in FIG. 10, in other words, the data size is of the order of N×b+S×L1.

Here, if the ratio between the "data size of the two-dimensional dot pattern tables in the related art" and the "data size of the one-dimensional dot pattern tables according to the present embodiment" is calculated, taking L1=m×L2 (where m is a natural number), then the following equation is obtained:

(Data size according to the present embodiment)/
(Data size in the related art)={N×b+S×L1}/{N× L2×b}=1/L2+(S×m)/(N×b).

If this equation is calculated by supposing, for example, S≈2× b, m=8, then the following equation is obtained:

(Data size according to the present embodiment)/
(Data size in the related art)=1/L2+16/N.

Moreover, if the equation above is calculated by using concrete values of N=4096 and L2=4096, then the following value is obtained:

(Data size according to the present embodiment)/
(Data size in the related art)=1/4096+16/ 4096=17/4096

In other words, by adopting the present embodiment under the concrete conditions described above, it is possible to reduce the storage volume to approximately 1/240 compared to the storage volume required in the related art.

Even accounting for the addition of compositional elements, such as a device for generating random numbers, a storage device for evaluating the standard level, and the like, a suitable reduction in storage volume is achieved in comparison with the related art.

Second Embodiment of the Present Invention

Figure 14:
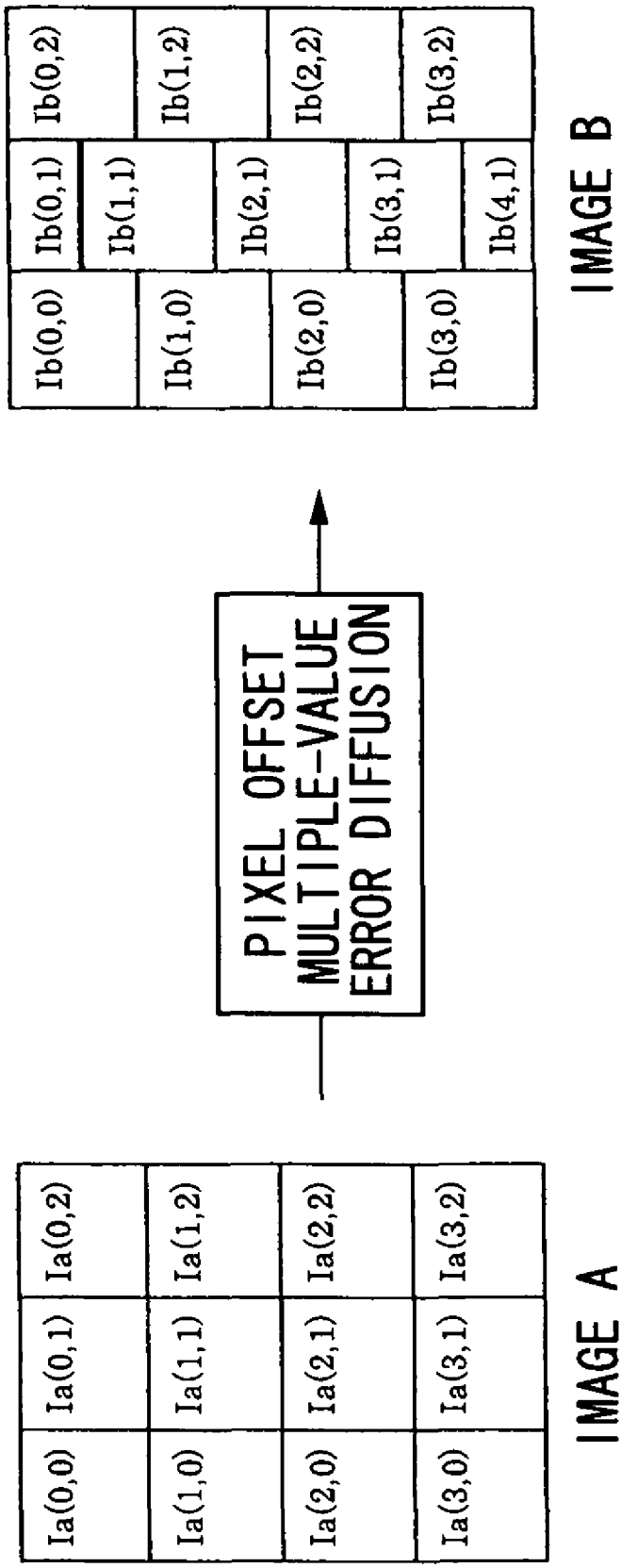
FIG. 14 is a conceptual diagram of multiple-value error diffusion processing which includes pixel offset, according to a second embodiment of the present invention.

Next, a second embodiment which resolves both of the technical issues 1 and 2 considered above will be described. FIG. 14 is a conceptual diagram of multiple-value error diffusion processing used in the second embodiment. Instead of the "multiple-value error diffusion process" described in FIG. 1, a "pixel shift multiple-value error diffusion process (also referred to as "pixel offset multiple-value error diffusion process")" as shown in FIG. 14 is carried out.

The image B (number of graduated tones: b) obtained by the pixel offset multiple-value error diffusion process described here is an image having a pixel arrangement in which the pixel positions in a row of pixels aligned in the main scanning direction (a main scanning direction pixel row) are offset (shifted) by a distance corresponding to half a pixel in the main scanning direction, with respect to a pixel row that is adjacent to that row in terms of the sub-scanning direction. For example, as shown in FIG. 8, the even-numbered rows are shifted by a distance corresponding to half a pixel, in the main scanning direction, with respect to the odd-numbered rows.

One example of a process for offsetting the arrangement of pixels by half a pixel in the main scanning direction as shown in image B in FIG. 14, is a method where, for instance, when converting the image A (number of graduated tones: a) to the image B (number of graduated tones: b) in the multiple-value error diffusion processing, the pixels are offset by half a pixel in the main scanning direction, in the converted image.

Below, one example of a method for creating the image B described above having a half-pixel offset in the multiple-value error diffusion process will be described.

Figure 15:
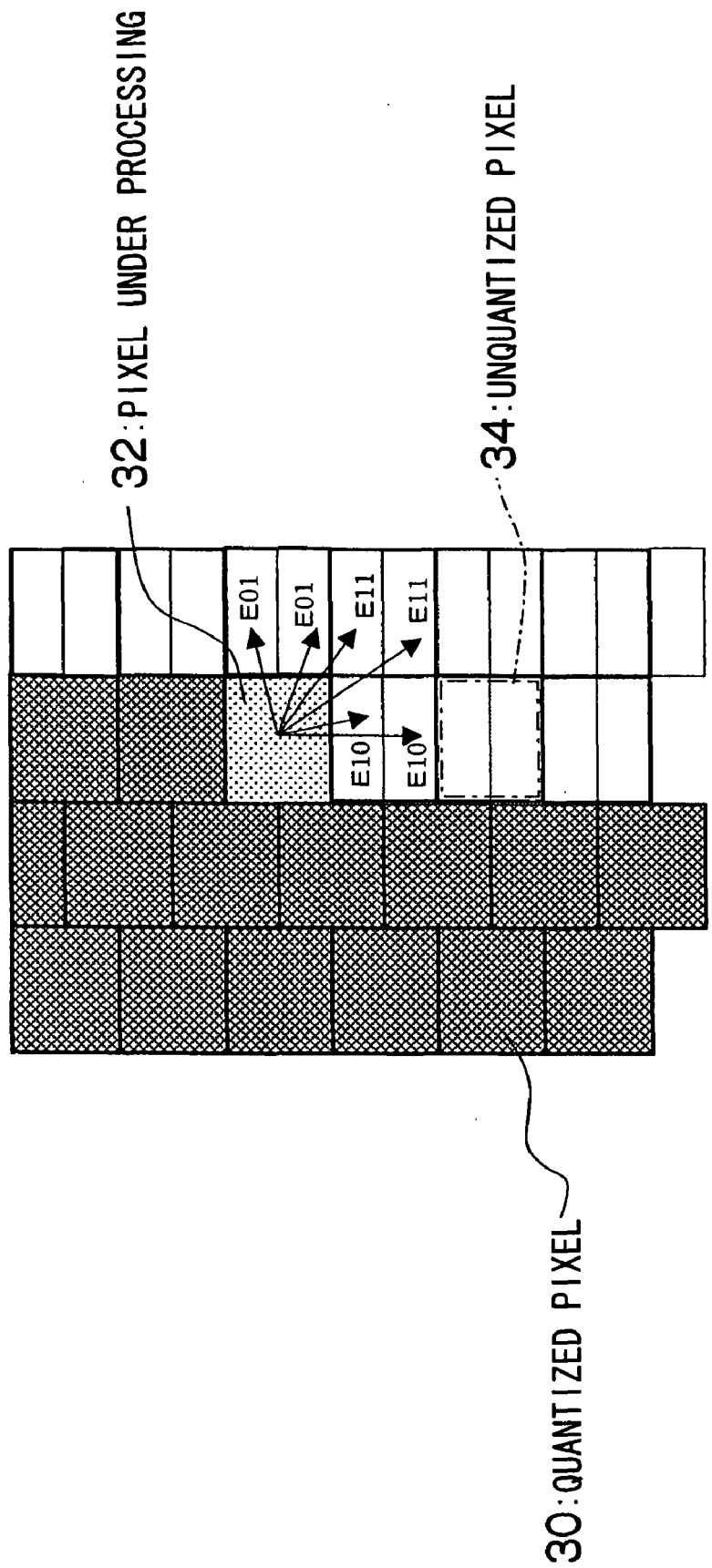
FIG. 15 is an illustrative diagram showing an overview of pixel offset multiple-value error diffusion processing.

FIG. 15 is a diagram showing an overview of a pixel offset multiple-value error diffusion process. In FIG. 15, a reference numeral 30 represents quantized pixels (pixels having been quantized) and a reference numeral 32 represents a pixel under processing for which quantization processing is to be carried out. Furthermore, the region marked in blank white in FIG. 15 is the region of unquantized pixels 34 for which quantization processing has not yet been carried out.

As shown in FIG. 15, the unquantized pixels 34 are divided into two regions (pixels) to double the number of pixels in the main scanning direction (the vertical direction in FIG. 15). The pixel under processing 32 is formed by uniting two divided pixels which are mutually adjacent in the main scanning direction, to create one pixel. When creating this pixel under processing 32 (by uniting two divided pixels), two divided pixels which are adjacent in the main scanning direction are united into one pixel (by calculating the average value of the graduated tone values), the phase being offset by half a pixel respectively between the odd-numbered rows and the even-numbered rows in the sub-scanning direction, and multiple-value quantization is carried out by comparing with a threshold value, any resulting error being diffused into the surrounding divided pixels which have not yet been quantized. Here, in either the even-numbered rows or the odd-numbered rows, the first and the last pixels in the main scanning direction are left without being united.

The error diffusion coefficients in FIG. 15 are similar to normal error diffusion coefficients; and the coefficients ($E01$, $E11$, $E10$), where $E01+E11+E10=1.0$, are used to diffuse error respectively into the corresponding divided pixels, as shown in FIG. 15. By carrying out error diffusion processing of this kind, multiple-value image data is obtained which has a staggered pixel arrangement in which the pixel positions are shifted by half a pixel in the main scanning direction, between the odd-numbered rows and the even-numbered rows.

The method is not limited to that described in FIG. 15, and for example, it is also possible to create data for positions offset by half a pixel, on the basis of the image A shown in FIG. 14, by performing interpolation with respect to the even-numbered rows in the sub-scanning direction.

Figure 16:
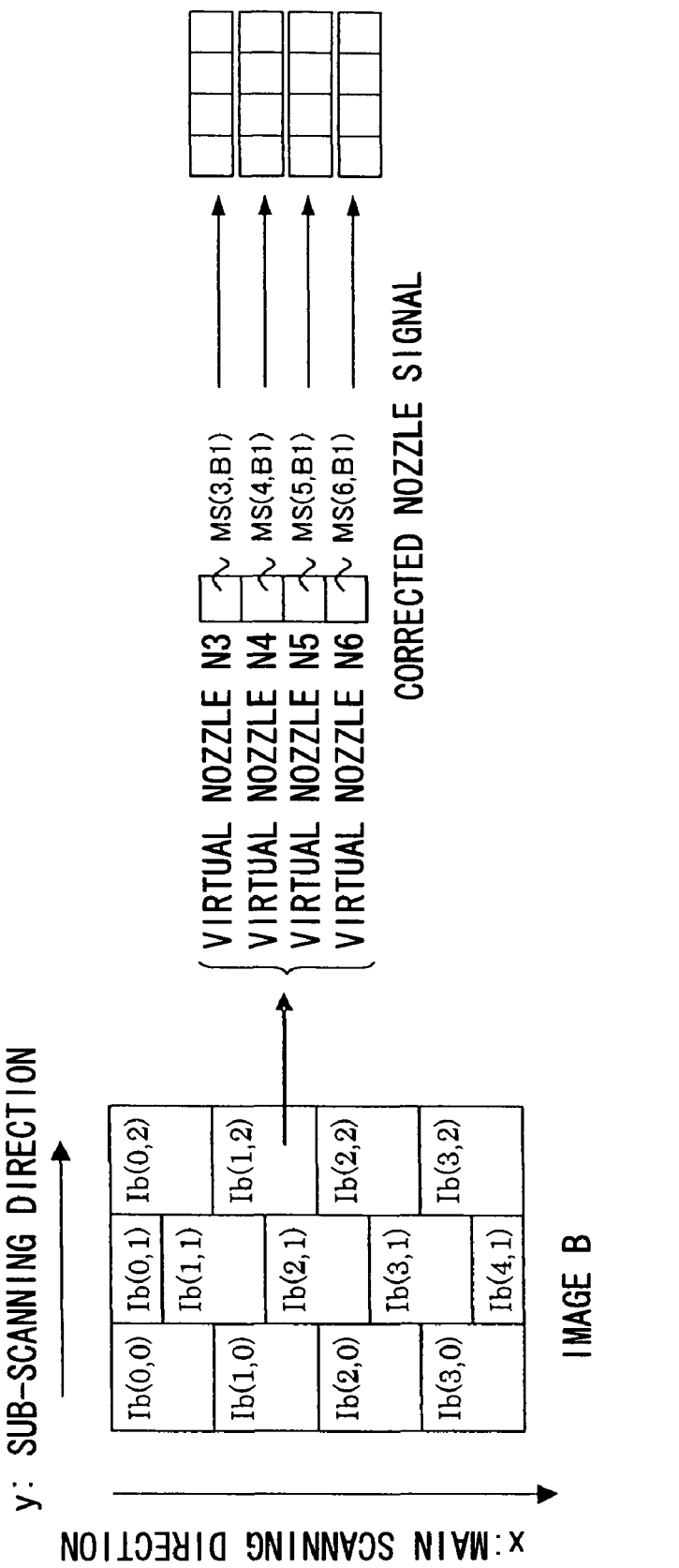
FIG. 16 is a conceptual diagram of a density pattern method according to the second embodiment.

On the basis of the image data (image B) obtained in this manner, which has a pixel arrangement incorporating a half-pixel offset, for each pixel position (x, y), conversion to a corrected nozzle signal sequence in the vertical direction (main scanning direction) (processing using the corrected nozzle signal table), and conversion to a dot row in the lateral direction (sub-scanning direction) (processing using a one-dimensional dot pattern table) are carried out, as shown in FIG. 16.

Figure 17:
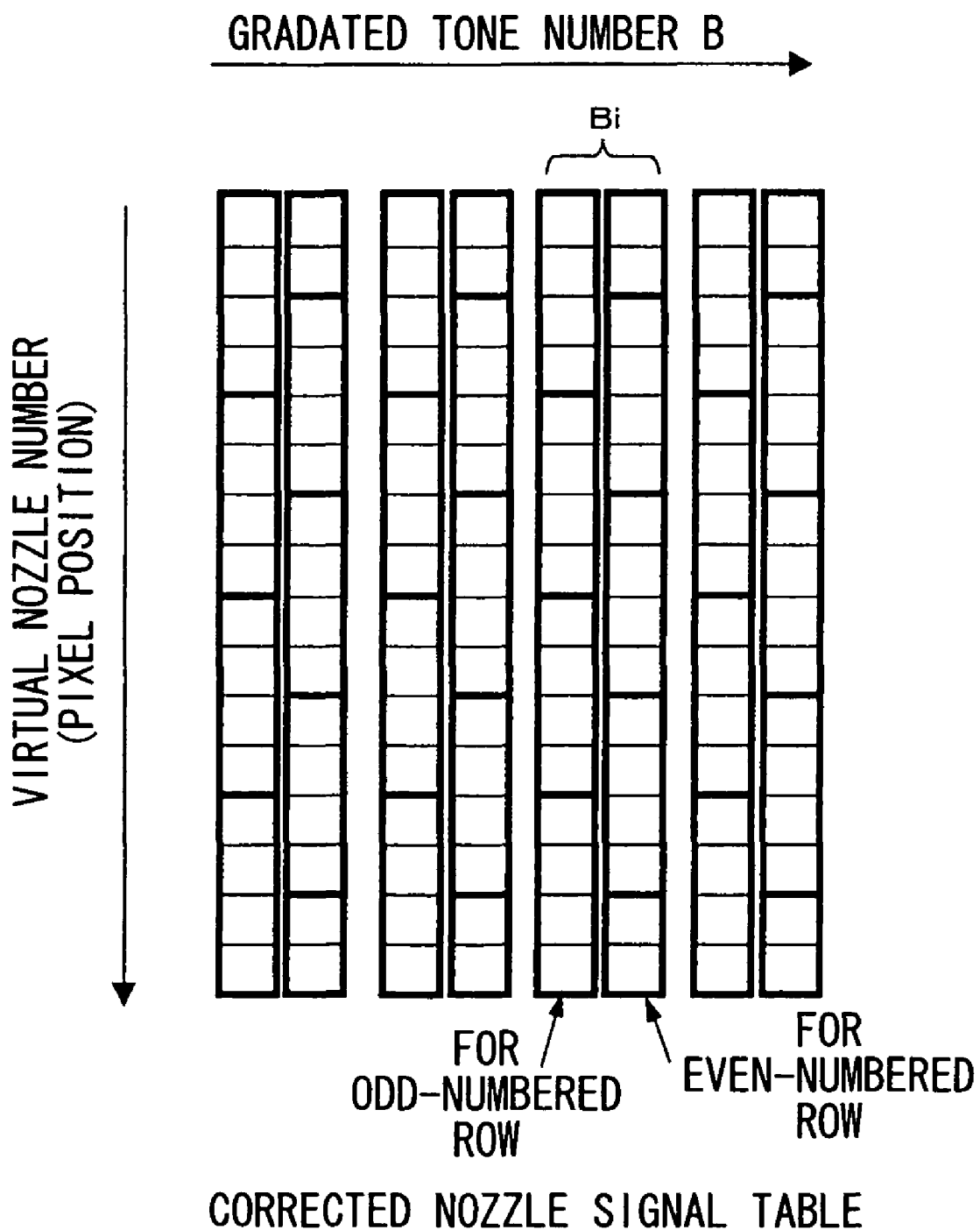
FIG. 17 is an illustrative diagram of a corrected nozzle signal table used in the second embodiment.

In the second embodiment, the positions of the pixels in the main scanning direction are shifted between the odd-numbered rows and the even-numbered rows, and accordingly, the corrected nozzle signal table includes two types of corrected nozzle signal table: one for the odd-numbered rows and one for the even-numbered rows as shown in FIG. 17.

The table for the odd-numbered rows is divided into block units (each of which is constituted of four cells) which correspond to the pixel arrangement of the odd-numbered rows in the image B, and each unit (constituted of four cells) is associated with a pixel position x in the main scanning direction in image B. Similarly, the table for the even-numbered rows is divided into block units which correspond to the pixel arrangement of the even-numbered rows in the image B, the blocks being divided at positions which are shifted by one half of a block (corresponding to half of a pixel in image B), with respect to the table for the odd-numbered rows.

When referencing the corrected nozzle signal table shown in FIG. 17, the two types of table are used selectively, depending on whether the position (x,y) of the pixel under processing in the image B in FIG. 16 belongs to an odd-numbered row or belongs to an even-numbered row, and the corrected nozzle signal sequence at the corresponding position is read out accordingly. Apart from the differences in the corrected nozzle signal table used, the remaining composition is the same as that of the first embodiment described above, and the one-dimensional dot pattern tables used are similar to those described with reference to FIG. 10.

Figure 18:
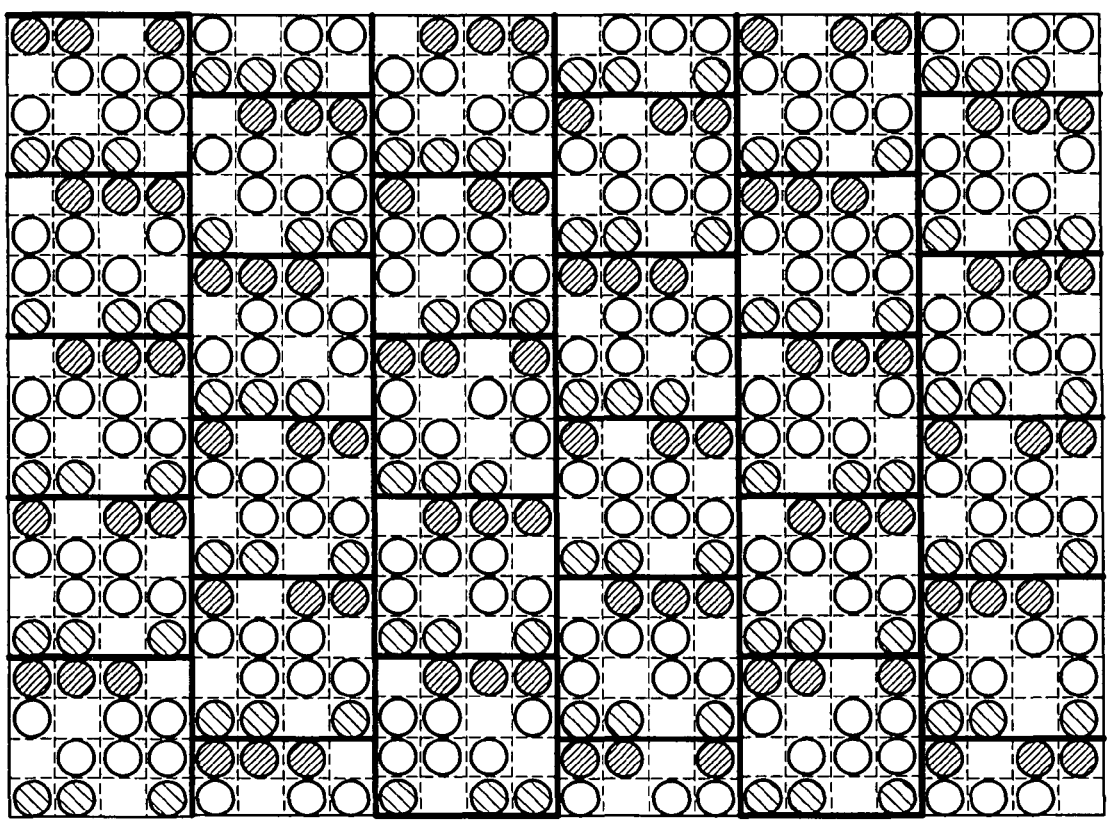
FIG. 18 is a diagram showing an example of a dot arrangement obtained by carrying out the second embodiment.

As shown in FIG. 18, in the dot image C (as shown in FIG. 1) generated in this way, the two-dimensional dot pattern blocks (here, blocks of 4×4 size; rectangular blocks of 2×4 size being used in the boundary regions of the even-numbered rows) obtained by the conversion process are shifted by half a block in the main scanning direction, between the odd-numbered rows and the even-numbered rows, in accordance with the pixel arrangement in image B.

Consequently, dot rows (in FIG. 18, the dot pixel positions indicated by oblique shading patterns) belonging to a boundary region of the respective square blocks are not arranged on a single continuous straight line in the sub-scanning direction, but rather are arranged on a crooked line (bent line) which undulates in the manner of a rectangular wave (block pulse). Humans characteristically have high visual sensitivity in the horizontal and vertical directions, and poor visual sensitivity in oblique directions, and therefore, the visibility of artifacts caused by this (non-linear shaped) arrangement of the dot rows belonging to the boundaries is low.

If there is in fact a density change (difference in the graduated tone value) between mutually adjacent pixels, then the use of a dot pattern which is calculated on the premise (condition) that there is no density change between mutually adjacent pixels will give rise to reduced performance in correcting the banding in these boundary positions. However, in the present embodiment, since the boundary regions which suffer this decline in the banding correction performance are not arranged in a straight line, then regular non-uniformities are not liable to appear.

In the second embodiment described above, the pixel offset is performed with the offset amount of half a pixel, but a composition is also possible in which the pixel positions are shifted by a suitable shift amount, other than half a pixel.

Example of Application to Inkjet Recording Apparatus

There follows a description of an inkjet recording apparatus which is a concrete applicational example of an image forming apparatus according to an embodiment of the present invention. The image forming apparatus according to the present embodiment is provided with an image processing function for converting multiple-value image data into dot arrangement data by using the image processing method described above.

Figure 19:
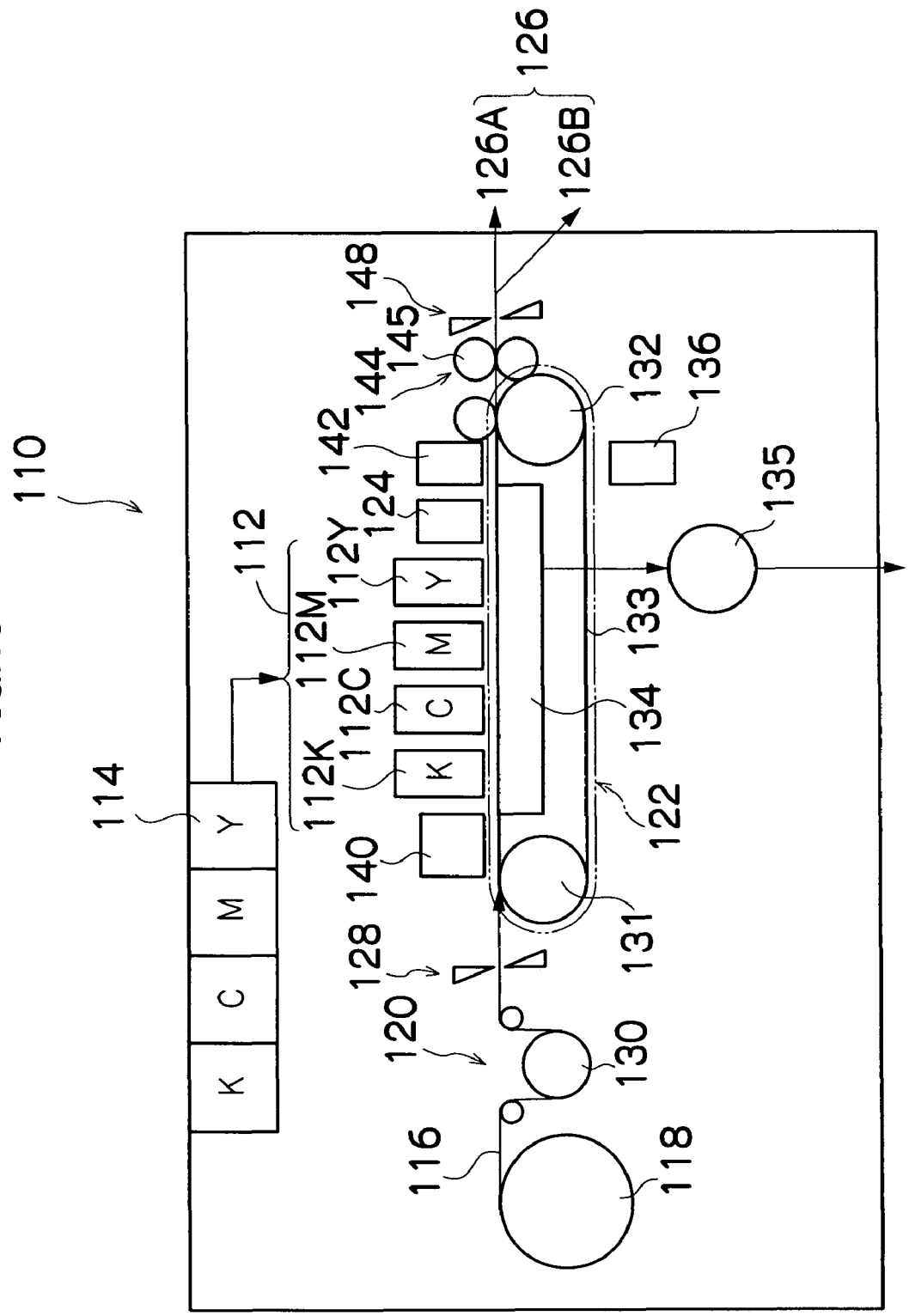
FIG. 19 is a general schematic drawing of an inkjet recording apparatus which forms an image forming apparatus according to an embodiment of the present invention.

FIG. 19 is a general configuration diagram of an inkjet recording apparatus which forms one embodiment of an image forming apparatus according to the present invention. As shown in FIG. 19, the inkjet recording apparatus 110 comprises: a print unit 112 having a plurality of inkjet recording heads (hereafter, called "heads") 112K, 112C, 112M, and 112Y provided for ink colors of black (K), cyan (C), magenta (M), and yellow (Y), respectively; an ink storing and loading unit 114 for storing inks of K, C, M and Y to be supplied to the print heads 112K, 112C, 112M, and 112Y; a paper supply unit 118 for supplying recording paper 116 which is a recording medium; a decurling unit 120 removing curl in the recording paper 116; a belt conveyance unit 122 disposed facing the nozzle face (ink-droplet ejection face) of the print unit 112, for conveying the recording paper 116 while keeping the recording paper 116 flat; a print determination unit 124 for reading the printed result produced by the print unit 112; and a paper output unit 126 for outputting image-printed recording paper (printed matter) to the exterior.

The ink storing and loading unit 114 has ink tanks for storing the inks of colors corresponding to the heads 112K, 112C, 112M, and 112Y, and the tanks are connected to the heads 112K, 112C, 112M, and 112Y by means of prescribed channels. The ink storing and loading unit 114 has a warning device (for example, a display device or an alarm sound generator) for warning when the remaining amount of any ink is low, and has a mechanism for preventing loading errors among the colors.

In FIG. 19, a magazine for rolled paper (continuous paper) is shown as an example of the paper supply unit 118; however, more magazines with paper differences such as paper width and quality may be jointly provided. Moreover, papers may be supplied with cassettes that contain cut papers loaded in layers and that are used jointly or in lieu of the magazine for rolled paper.

In the case of a configuration in which a plurality of types of recording medium (media) can be used, it is preferable that an information recording medium such as a bar code and a wireless tag containing information about the type of medium is attached to the magazine, and by reading the information contained in the information recording medium with a predetermined reading device, the type of recording medium to be used (type of medium) is automatically determined, and ink-droplet ejection is controlled so that the ink-droplets are ejected in an appropriate manner in accordance with the type of medium.

The recording paper 116 delivered from the paper supply unit 118 retains curl due to having been loaded in the magazine. In order to remove the curl, heat is applied to the recording paper 116 in the decurling unit 120 by a heating drum 130 in the direction opposite from the curl direction in the magazine. The heating temperature at this time is preferably controlled so that the recording paper 116 has a curl in which the surface on which the print is to be made is slightly round outward.

In the case of the configuration in which roll paper is used, a cutter (first cutter) 128 is provided as shown in FIG. 19, and the continuous paper is cut into a desired size by the cutter 128.

After decurling, the cut recording paper 116 is delivered to the belt conveyance unit 122. The belt conveyance unit 122 has a configuration in which an endless belt 133 is set around rollers 131 and 132 so that the portion of the endless belt 133 facing at least the nozzle face of the print unit 112 and the sensor face of the print determination unit 124 forms a plane (flat surface).

The belt 133 has a width that is greater than the width of the recording paper 116, and a plurality of suction holes (not shown) are formed on the belt surface. A suction chamber 134 is disposed in a position facing the sensor surface of the print determination unit 124 and the nozzle surface of the print unit 112 on the interior side of the belt 133, which is set around the rollers 131 and 132, as shown in FIG. 19; and a negative pressure is generated by sucking air from the suction chamber 134 by means of a fan 135, thereby the recording paper 116 is held by suction on the belt 133. It is also possible to use an electrostatic attraction method, instead of a suction-based attraction method.

The belt 133 is driven in the clockwise direction in FIG. 19 by the motive force of a motor (reference numeral 188 in FIG. 24) being transmitted to at least one of the rollers 131 and 132, which the belt 133 is set around, and the recording paper 116 held on the belt 133 is conveyed from left to right in FIG. 12.

Since ink adheres to the belt 133 when a marginless print job or the like is performed, a belt-cleaning unit 136 is disposed in a predetermined position (a suitable position outside the printing area) on the exterior side of the belt 133. Although the details of the configuration of the belt-cleaning unit 136 are not shown, examples thereof include a configuration in which the belt 133 is nipped with a brush roller and a water absorbent roller, an air blow configuration in which clean air is blown onto the belt 133, or a combination of these.

Instead of a belt conveyance unit 122, it might also be possible to use a roller nip conveyance mechanism, but since the print region passes through the roller nip, the printed surface of the paper makes contact with the rollers immediately after printing, and hence smearing of the image is liable to occur. Therefore it is desirable to adopt suction belt conveyance which does not make contact with the image surface in the printing region.

A heating fan 140 is provided on the upstream side of the print unit 112 in the paper conveyance path formed by the belt conveyance unit 122. This heating fan 140 blows heated air onto the recording paper 116 before printing, and thereby heats up the recording paper 116. Heating the recording paper 116 before printing means that the ink will dry more readily after landing on the paper.

Figure 20:
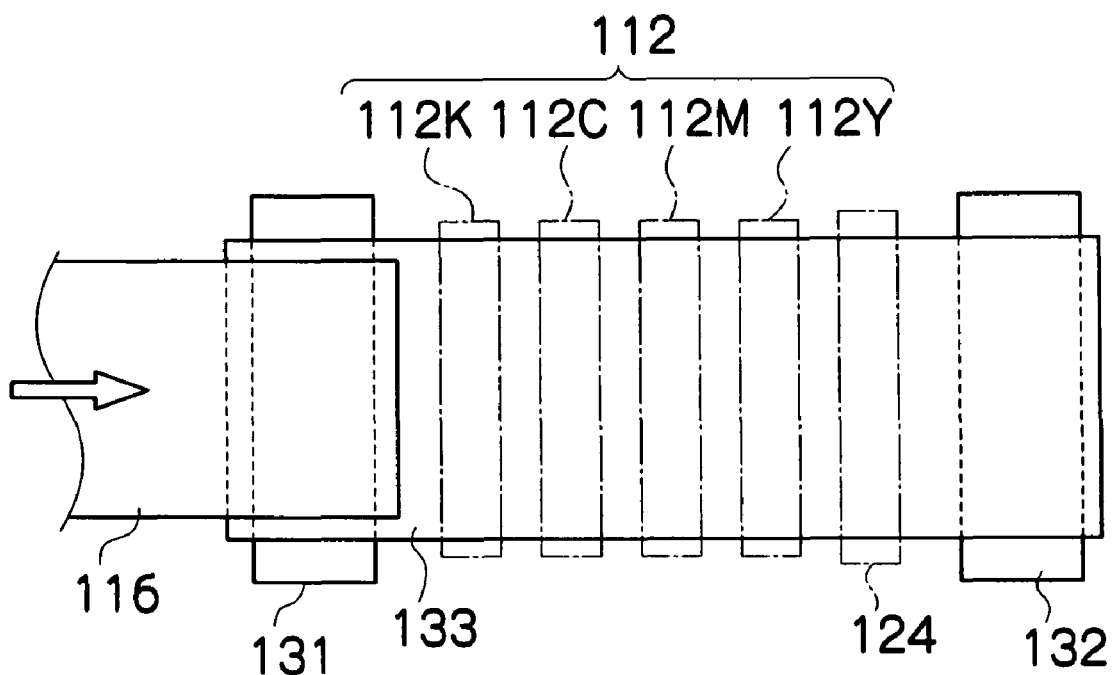
FIG. 20 is a principal plan diagram of the peripheral area of a print unit in the inkjet recording apparatus illustrated in FIG. 19.

The heads 112K, 112C, 112M and 112Y of the print unit 112 are full line heads having a length corresponding to the maximum width of the recording paper 116 used with the inkjet recording apparatus 110, and comprising a plurality of nozzles for ejecting ink arranged on a nozzle face through a length exceeding at least one edge of the maximum-size recording medium (namely, the full width of the printable range) (see FIG. 20).

The print heads 112K, 112C, 112M and 112Y are arranged in color order (black (K), cyan (C), magenta (M), yellow (Y)) from the upstream side in the feed direction of the recording paper 116, and these respective heads 112K, 112C, 112M and 112Y are fixed extending in a direction substantially perpendicular to the conveyance direction of the recording paper 116.

A color image can be formed on the recording paper 116 by ejecting inks of different colors from the heads 112K, 112C, 112M and 112Y, respectively, onto the recording paper 116 while the recording paper 116 is conveyed by the belt conveyance unit 122.

By adopting a configuration in which the full line heads 112K, 112C, 112M and 112Y having nozzle rows covering the full paper width are provided for the respective colors in this way, it is possible to record an image on the full surface of the recording paper 116 by performing just one operation of relatively moving the recording paper 116 and the print unit 112 in the paper conveyance direction (the sub-scanning direction), in other words, by means of a single sub-scanning action. Higher-speed printing is thereby made possible and productivity can be improved in comparison with a shuttle type head configuration in which a recording head reciprocates in the main scanning direction.

Although the configuration with the KCMY four standard colors is described in the present embodiment, combinations of the ink colors and the number of colors are not limited to those. Light inks, dark inks or special color inks can be added as required. For example, a configuration is possible in which inkjet heads for ejecting light-colored inks such as light cyan and light magenta are added. Furthermore, there are no particular restrictions of the sequence in which the heads of respective colors are arranged.

The print determination unit 124 illustrated in FIG. 19 has an image sensor (line sensor or area sensor) for capturing an image of the droplet ejection result of the print unit 112, and functions as a device to check the ejection characteristics, such as blockages, landing position error, and the like, of the nozzles, on the basis of the image of ejected droplets read in by the image sensor.

A CCD area sensor in which a plurality of photoreceptor elements (photoelectric transducers) are two-dimensionally arranged on the light receiving surface is suitable for use as the print determination unit 124 of the present example. An area sensor has an imaging range which is capable of capturing an image of at least the full area of the ink ejection width (image recording width) of the respective heads 112K, 112C, 112M and 112Y. It is possible to achieve the required imaging range by means of one area sensor, or alternatively, it is also possible to ensure the required imaging range by combining (joining) together a plurality of area sensors. Alternatively, a composition may be adopted in which the area sensor is supported on a movement mechanism (not illustrated), and an image of the required imaging range is captured by moving (scanning) the area sensor.

Furthermore, it is also possible to use a line sensor instead of the area sensor. In this case, a desirable composition is one in which the line sensor has rows of photoreceptor elements (rows of photoelectric transducing elements) with a width that is greater than the ink droplet ejection width (image recording width) of the print heads 112K, 112C, 112M and 112Y.

A test pattern or the target image printed by the print heads 112K, 112C, 112M, and 112Y of the respective colors is read in by the print determination unit 124, and the ejection performed by each head is determined. The ejection determination includes detection of the ejection, measurement of the dot size (liquid droplet ejection volume), and measurement of the dot formation position.

A post-drying unit 142 is disposed following the print determination unit 124. The post-drying unit 142 is a device to dry the printed image surface, and includes a heating fan, for example. It is preferable to avoid contact with the printed surface until the printed ink dries, and a device that blows heated air onto the printed surface is preferable.

A heating/pressurizing unit 144 is disposed following the post-drying unit 142. The heating/pressurizing unit 144 is a device to control the glossiness of the image surface, and the image surface is pressed with a pressure roller 145 having a predetermined uneven surface shape while the image surface is heated, and the uneven shape is transferred to the image surface.

The printed matter generated in this manner is output from the paper output unit 126. The target print (i.e., the result of printing the target image) and the test print are preferably output separately. In the inkjet recording apparatus 110, a sorting device (not shown) is provided for switching the outputting pathways in order to sort the printed matter with the target print and the printed matter with the test print, and to send them to paper output units 126A and 126B, respectively. When the target print and the test print are simultaneously formed in parallel on the same large sheet of paper, the test print portion is cut and separated by a cutter (second cutter) 148. Although not shown in FIG. 19, the paper output unit 126A for the target prints is provided with a sorter for collecting prints according to print orders.

Structure of the Head

Next, the structure of a head will be described. The heads 112K, 112C, 112M and 112Y of the respective ink colors have the same structure, and a reference numeral 150 is hereinafter designated to any of the heads.

Figure 21A:
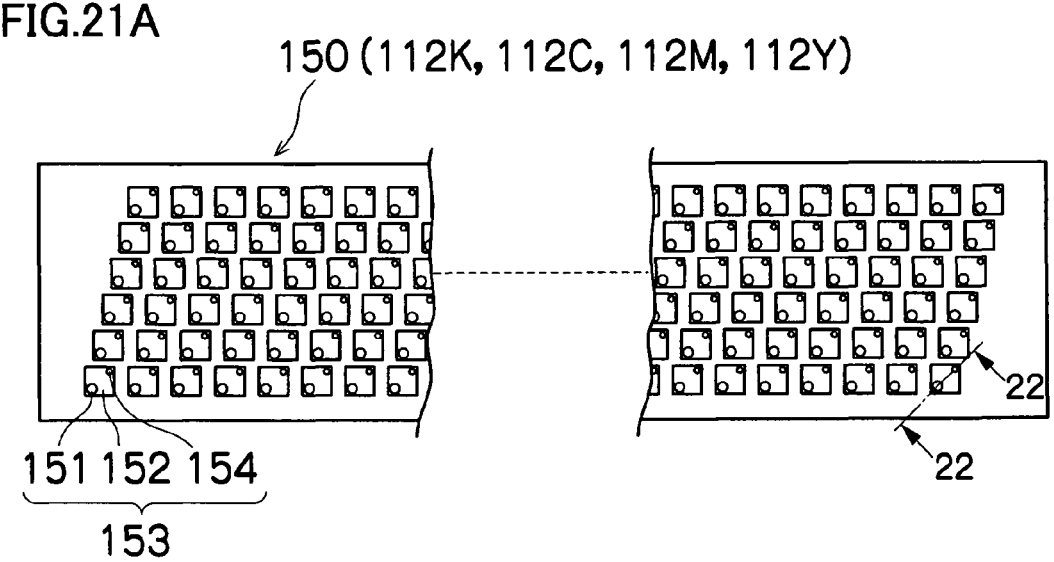
FIG. 21A is a plan view perspective diagram showing an example of the composition of a print head.
Figure 21B:
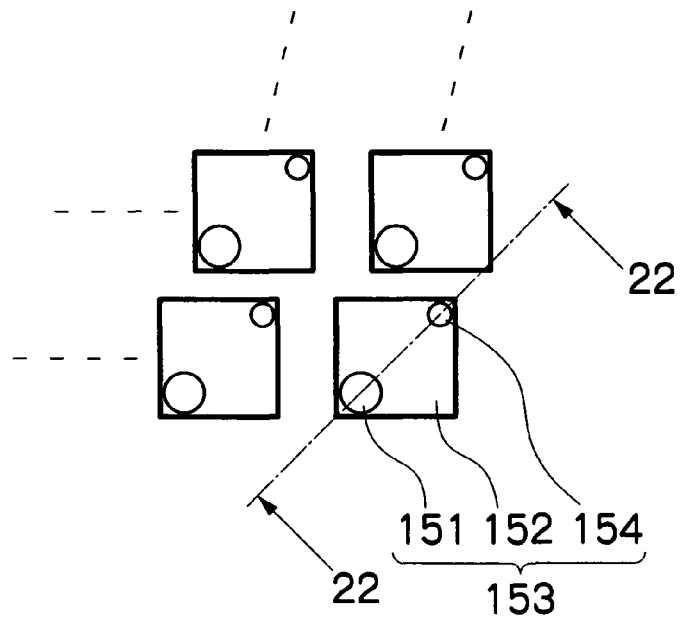
FIG. 21B is a principal enlarged view of FIG. 21A.
Figure 21C:
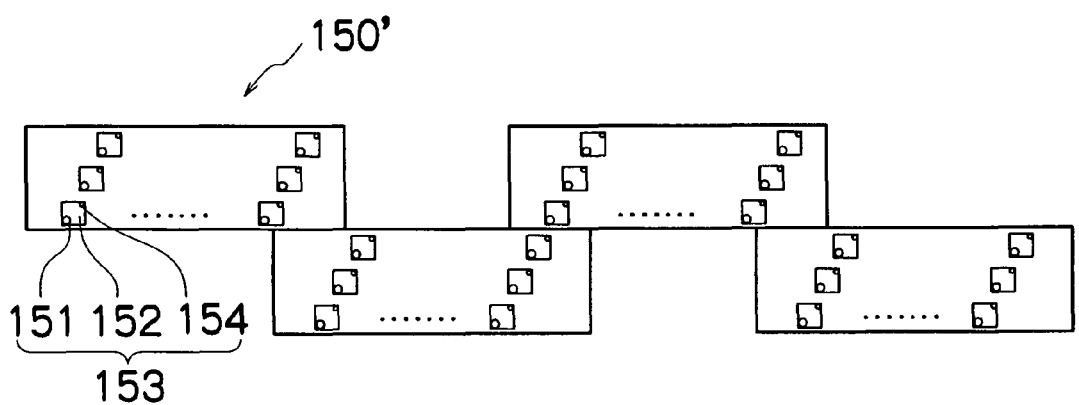
FIG. 21C is a plan view perspective diagram showing a further example of the structure of a full line head.
Figure 22:
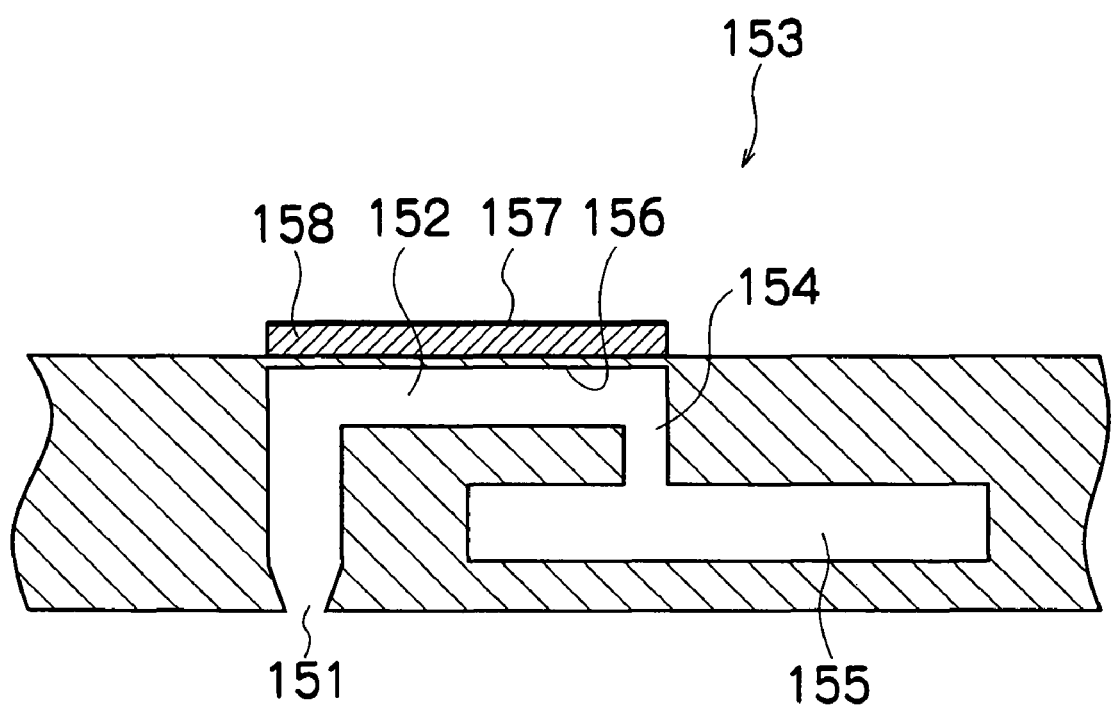
FIG. 22 is a cross-sectional view along line 22-22 in FIG. 21A.

FIG. 21A is a perspective plan view showing an example of the configuration of the head 150, FIG. 21B is an enlarged view of a portion thereof, FIG. 21C is a perspective plan view showing another example of the configuration of the head 150, and FIG. 22 is a cross-sectional view taken along the line 22-22 in FIGS. 21A and 21B, showing the inner structure of a droplet ejection element (an ink chamber unit for one nozzle 151).

The nozzle pitch in the head 150 should be minimized in order to maximize the density of the dots printed on the surface of the recording paper 116. As shown in FIGS. 21A and 21B, the head 150 according to the present embodiment has a structure in which a plurality of ink chamber units (droplet ejection elements) 153, each comprising a nozzle 151 forming an ink ejection port, a pressure chamber 152 corresponding to the nozzle 151, and the like, are disposed two-dimensionally in the form of a staggered matrix, and hence the effective nozzle interval (the projected nozzle pitch) as projected (orthogonally projected) in the lengthwise direction of the head (the direction perpendicular to the paper conveyance direction) is reduced and high nozzle density is achieved.

The mode of forming one or more nozzle rows through a length corresponding to the entire width of the recording paper 116 in a direction substantially perpendicular to the conveyance direction of the recording paper 116 is not limited to the example described above. For example, instead of the configuration in FIG. 21A, as shown in FIG. 21C, a line head having nozzle rows of a length corresponding to the entire width of the recording paper 116 can be formed by arranging and combining, in a staggered matrix, short head module 150' having a plurality of nozzles 151 arrayed in a two-dimensional fashion.

As shown in FIGS. 21A and 21B, the planar shape of the pressure chamber 152 provided corresponding to each nozzle 151 is substantially a square shape, and an outlet port to the nozzle 151 is provided at one of the ends of the diagonal line of the planar shape, while an inlet port (supply port) 154 for supplying ink is provided at the other end thereof. The shape of the pressure chamber 152 is not limited to that of the present example and various modes are possible in which the planar shape is a quadrilateral shape (diamond shape, rectangular shape, or the like), a pentagonal shape, a hexagonal shape, or other polygonal shape, or a circular shape, elliptical shape, or the like.

As shown in FIG. 22, each pressure chamber 152 is connected to a common channel 155 through the supply port 154. The common channel 155 is connected to an ink tank (not shown in drawings), which is a base tank that supplies ink, and the ink supplied from the ink tank is delivered through the common flow channel 155 to the pressure chambers 152.

An actuator 158 provided with an individual electrode 157 is bonded to a pressure plate (a diaphragm that also serves as a common electrode) 156 which forms the surface of one portion (in FIG. 22, the ceiling) of the pressure chambers 152. When a drive voltage is applied to the individual electrode 157 and the common electrode, the actuator 158 deforms, thereby changing the volume of the pressure chamber 152. This causes a pressure change which results in ink being ejected from the nozzle 151. For the actuator 158, it is possible to adopt a piezoelectric element using a piezoelectric body, such as lead zirconate titanate, barium titanate, or the like. When the displacement of the actuator 158 returns to its original position after ejecting ink, the pressure chamber 152 is replenished with new ink from the common flow channel 155, via the supply port 154.

By controlling the driving of the actuators 158 corresponding to the nozzles 151 in accordance with the dot arrangement data generated from the input image, it is possible to eject ink droplets from the nozzles 151. As shown in FIG. 19, by controlling the ink ejection timing from the nozzles 151 in accordance with the speed of conveyance of the recording paper 116, while conveying the recording paper 116 in the sub-scanning direction at a uniform speed, it is possible to record a desired image on the print medium 116.

Figure 23:
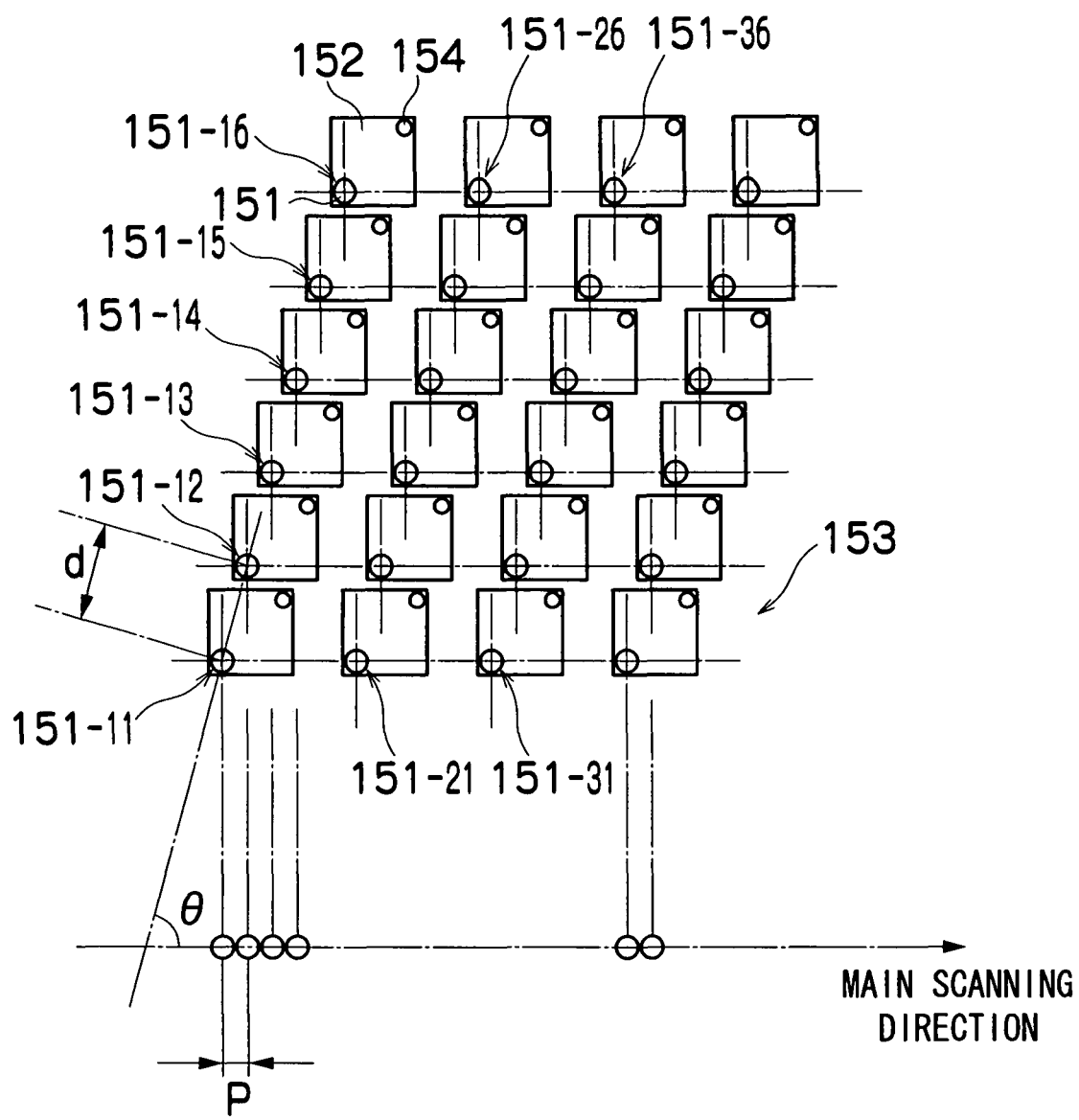
FIG. 23 is an enlarged view showing a nozzle arrangement in the head illustrated in FIG. 21A.

As shown in FIG. 23, the high-density nozzle head according to the present embodiment is achieved by arranging a plurality of ink chamber units 153 having the above-described structure in an oblique lattice fashion based on a fixed arrangement pattern, in a row direction which coincides with the main scanning direction, and a column direction which is inclined at a fixed angle of θ with respect to the main scanning direction, rather than being perpendicular to the main scanning direction.

More specifically, by adopting a structure in which a plurality of ink chamber units 153 are arranged at a uniform pitch d in line with a direction forming an angle of θ with respect to the main scanning direction, the pitch P of the nozzles projected so as to align in the main scanning direction is d×cos θ, and hence the nozzles 151 can be substantially regarded to be equivalent to those arranged linearly at a fixed pitch P along the main scanning direction. Such configuration results in a nozzle structure in which the nozzle row projected in the main scanning direction has a high nozzle density of up to 2,400 nozzles per inch.

In a full-line head comprising rows of nozzles that have a length corresponding to the entire width of the image recordable width, the "main scanning" is defined as printing one line (a line formed of a row of dots, or a line formed of a plurality of rows of dots) in the width direction of the recording paper (the direction perpendicular to the conveyance direction of the recording paper) by driving the nozzles in one of the following ways: (1) simultaneously driving all the nozzles; (2) sequentially driving the nozzles from one side toward the other; and (3) dividing the nozzles into blocks and sequentially driving the nozzles from one side toward the other in each of the blocks.

In particular, when the nozzles 151 arranged in a matrix such as that shown in FIG. 23 are driven, the main scanning according to the above-described (3) is preferred. More specifically, the nozzles 151-11, 151-12, 151-13, 151-14, 151-15 and 151-16 are treated as a block (additionally; the nozzles 151-21, 151-22, . . . , 151-26 are treated as another block; the nozzles 151-31, 151-32, . . . , 151-36 are treated as another block; . . . ); and one line is printed in the width direction of the recording paper 116 by sequentially driving the nozzles 151-11, 151-12, . . . , 151-16 in accordance with the conveyance velocity of the recording paper 116.

On the other hand, "sub-scanning" is defined as to repeatedly perform printing of one line (a line formed of a row of dots, or a line formed of a plurality of rows of dots) formed by the main scanning, while moving the full-line head and the recording paper relatively to each other.

The direction indicated by one line (or the lengthwise direction of a band-shaped region) recorded by main scanning as described above is called the "main scanning direction", and the direction in which sub-scanning is performed, is called the "sub-scanning direction". In other words, in the present embodiment, the conveyance direction of the recording paper 116 is called the sub-scanning direction and the direction perpendicular to same is called the main scanning direction.

In implementing the present invention, the arrangement of the nozzles is not limited to that of the example illustrated. Moreover, a method is employed in the present embodiment where an ink droplet is ejected by means of the deformation of the actuator 158, which is typified by a piezoelectric element; however, in implementing the present invention, the method used for discharging ink is not limited in particular, and instead of the piezo jet method, it is also possible to apply various types of methods, such as a thermal jet method where the ink is heated and bubbles are caused to form therein by means of a heat generating body such as a heater, ink being ejected by means of the pressure applied by these bubbles.

Description of Control System

Figure 24:
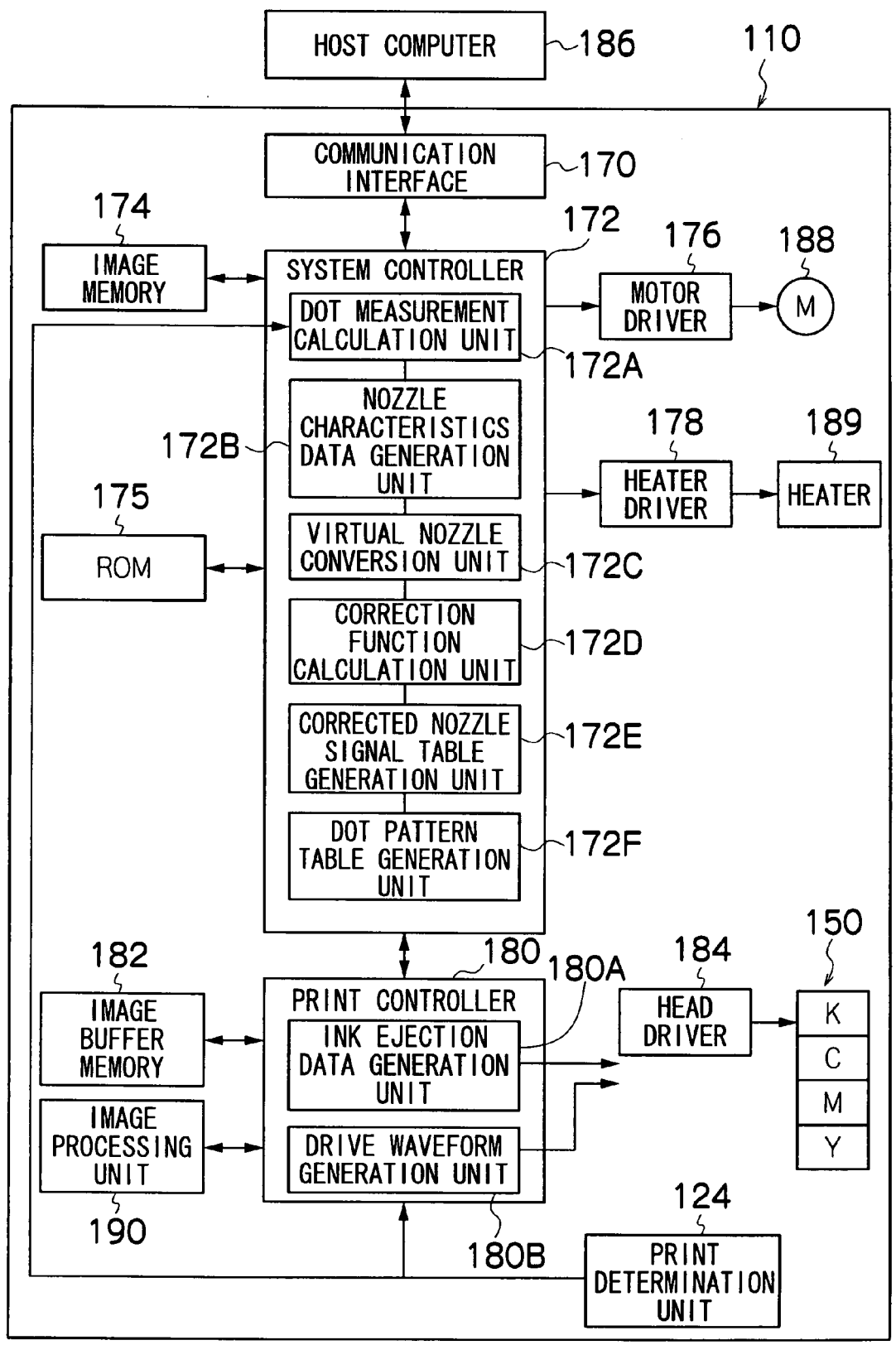
FIG. 24 is a block diagram showing the system configuration of the inkjet recording apparatus according to the present embodiment.

FIG. 24 is a block diagram showing the system configuration of the inkjet recording apparatus 110. As shown in FIG. 24, the inkjet recording apparatus 110 comprises a communication interface 170, a system controller 172, an image memory 174 and ROM 175, a motor driver 176, a heater driver 178, a print control unit 180, an image buffer memory 182, a head driver 184, and the like.

The communication interface 170 is an interface unit (image input unit) which functions as an image input device for receiving image data transmitted by a host computer 186. A serial interface such as USB (Universal Serial Bus), IEEE1394, Ethernet (registered trademark), wireless network, or a parallel interface such as a Centronics interface may be used as the communication interface 170. A buffer memory (not shown) may be mounted in this portion in order to increase the communication speed.

The image data sent from the host computer 186 is received by the inkjet recording apparatus 110 through the communication interface 170, and is temporarily stored in the image memory 174. The image memory 174 is a storage device for storing images inputted through the communication interface 170, and data is written and read to and from the image memory 174 through the system controller 172. The image memory 174 is not limited to a memory composed of semiconductor elements, and a hard disk drive or another magnetic medium may be used.

The system controller 172 is constituted by a central processing unit (CPU) and peripheral circuits thereof, and the like, and it functions as a control device for controlling the whole of the inkjet recording apparatus 110 in accordance with a prescribed program, as well as a calculation device for performing various calculations. More specifically, the system controller 172 controls the various sections, such as the communication interface 170, image memory 174 and ROM 175, motor driver 176, heater driver 178, and the like, as well as controlling communications with the host computer 186 and writing and reading to and from the image memory 174, and it also generates control signals for controlling the motor 188 and heater 189 of the conveyance system.

Furthermore, the system controller 172 includes calculational processing devices, such as: a dot measurement calculation unit 172A which carries out calculational processing for generating depositing position error data (data indicating the error in the actual depositing position with respect to the ideal depositing position), dot shape data, and the like, from test pattern read data read in by the print determination unit 124; a nozzle characteristics data generation unit 172B which creates nozzle characteristics data indicating the recording characteristics of the respective nozzles, from information relating to the measured dot states; a virtual nozzle conversion unit 172C which sets up associations between virtual nozzles and actual nozzles; a correction function calculation unit 172D which determines correction functions for correcting the banding caused by the nozzle characteristics; a corrected recording element signal table generation unit 172E which determines corrected nozzle signals for each of the graduated tone numbers, in respect of each virtual nozzle position, by using the determined correction functions, divides up this sequence of corrected recording element signals generated for each of the graduated tone numbers, in the virtual nozzle alignment direction (the main scanning direction), into unit blocks composed of a prescribed number of signals, and then generates a corrected recording element signal table which associates the corrected recording element signal sequences in the respective block with pixel positions in the input image; a dot pattern table creation unit 172F which creates one-dimensional dot pattern tables representing (reproducing) a graduated tone indicated by the corrected nozzle signal, for each value of the correction nozzle signals; and the like. The processing functions of the respective calculational units denoted with reference numerals 172A to 172F can be achieved by means of an ASIC, software, or a suitable combination of same.

The ROM 175 stores a program to be executed by the CPU of the system controller 172, and various data required for control operations (including data for a test pattern for determining nozzle characteristics), and the like. The ROM 175 may be a non-rewriteable storage device, but if the various types of data are updated as and when necessary, then desirably, a rewriteable storage device such as an EEPROM is used. Furthermore, by utilizing the storage extent of this ROM 175, it is also possible to make the ROM 175 serve as a storage device for storing information indicating the correspondence relationships between the virtual nozzle positions and the actual nozzle positions, as well as serving as a dot pattern storage unit for storing dot pattern tables.

The image memory 174 is used as a temporary storage region for the image data, and it is also used as a program development region and a calculation work region for the CPU.

The motor driver 176 is a driver (drive circuit) that drives the motor 188 of the conveyance system in accordance with commands from the system controller 172. The heater driver 178 drives the heater 189 of the post-drying unit 142 or the like in accordance with commands from the system controller 172.

The print controller 180 is a control unit which functions as a signal processing device for performing various treatment processes, corrections, and the like, in accordance with the control implemented by the system controller 172, in order to generate a ejection control signal on the basis of the image data (the data of a multiple-value input image) in the image memory 174, in cooperation with the image processing unit 190, as well as functioning as a recording control device which controls the ejection driving of the head 150 by supplying the ink ejection data thus generated to the head driver 184.

The image processing unit 190 is a signal processing device which generates dot arrangement data for the respective ink colors, from the input image data, and it functions as an image processing apparatus (image processing device) which specifies a high-quality dot arrangement by carrying out half-toning with respect to the input image data by means of the multiple-value error diffusion process and the density pattern process described above.

In other words, the image processing unit 190 according to the present embodiment is a signal processing device which carries out processing, such as density conversion processing (including UCR processing and color conversion), and according to requirements, pixel number conversion processing, density correction processing, and half-toning for converting multiple-value density data into binary (or multiple-value) dot arrangement data.

In FIG. 24, the image processing unit 190 is depicted as a separate device from the system controller 172 and the print controller 180, but the image processing unit 190 may be incorporated in the system controller 172 or the print controller 180, for example, forming a portion of same.

Furthermore, the print controller 180 is constituted by an ink ejection data generation unit 180A, which generates ink ejection data (control signals for the actuators corresponding to the nozzles of the head 150) on the basis of the dot arrangement data generated by the image processing unit 190, and a drive waveform generation unit 180B. These functional blocks (180A to 180B) can be realized by means of an ASIC, software or a suitable combination of same.

The ink ejection data generated by the ink ejection data generation unit 180A is supplied to the head driver 184, which controls the ink ejection operation of the head 150 accordingly.

The drive waveform generation unit 180B is a device for generating drive signal waveforms in order to drive the actuators 158 (see FIG. 22) corresponding to the respective nozzles 151 of the head 150. The signals (drive waveforms) generated by the drive waveform generation unit 180B are supplied to the head driver 184. The signals output from the drive waveform generation unit 180B may be digital waveform data, or they may be analog voltage signals.

The print controller 180 is provided with the image buffer memory 182; and image data, parameters, and other data are temporarily stored in the image buffer memory 182 when image data is processed in the print controller 180. The aspect shown in FIG. 24 is one in which the image buffer memory 182 accompanies the print controller 180; however, the image memory 174 may also serve as the image buffer memory 182. Also possible is an aspect in which the print controller 180 and the system controller 172 are integrated to form a single processor.

To give a general description of the sequence of processing from image input to print output, image data to be printed is input from an external source via a communication interface 170, and is accumulated in the image memory 174. At this stage, multiple-value RGB image data is stored in the image memory 174, for example.

There are no particular restrictions on the data format of the input image, but 8-bit RGB data may be input, for example. Density conversion processing based on a look-up table is carried out on this input image, thereby converting it into graduated tone value data I(x,y) having multiple values (for example, 256 tones) corresponding to each of the ink colors of the printer. Here, (x,y) indicates the position of a pixel, and therefore a graduated tone value is assigned to each respective pixel.

Furthermore, the resolution of the input image and the resolution of the printer (nozzle resolution) are scale factors (each of which is a natural number) of the dot pattern size. If the two scale factors are not matching, then the input image is subjected to pixel number conversion processing, in accordance with the scale factors.

The density conversion processing uses a general process, which includes under color removal (UCR) processing, or light ink distribution processing in the case of a system which uses light inks (light inks of the same color).

In the case of the present example, it is converted to multiple-value image data for inks of four colors: C (cyan), M (magenta), Y (yellow) and K (black). Alternatively, in the case of a system which also uses other inks, such as LC (light cyan) and LM (light magenta), in addition to the four inks mentioned above, then the image is converted into density data which includes these ink colors.

In this inkjet recording apparatus 110, an image which appears to have continuous tonal graduations to the human eye is formed by changing the droplet ejection density and the dot size of fine dots created by ink (coloring material), and therefore, it is necessary to convert the input digital image into a dot pattern which reproduces the tonal graduations of the image (namely, the light and shade toning of the image) as faithfully as possible. Therefore, original image data (RGB data) stored in the image memory 174 is sent to the print controller 180 through the system controller 172, and is converted by the image processing unit 190 to dot arrangement data for each ink color, by means of processing which combines multiple-value error diffusion processing and density pattern processing.

In other words, in the case of the present example, it is converted into dot arrangement data for the four colors of K, C, M and Y. The dot arrangement data generated in this way is stored in the image buffer memory 182. This dot arrangement data for the respective colors is converted into KCMY droplet ejection data for ejecting ink from the nozzles of the head 150, thereby establishing the ink ejection data to be printed.

The head driver 184 outputs a drive signal for driving the actuators 158 corresponding to the nozzles 151 of the head 150 in accordance with the print contents, on the basis of the ink ejection data and the drive waveform signals supplied by the print controller 180. A feedback control system for maintaining constant drive conditions for the heads may be included in the head driver 184.

By supplying the drive signals output by the head driver 184 to the head 150 in this way, ink is ejected from the corresponding nozzles 151. By controlling ink ejection from the head 150 in synchronization with the conveyance speed of the recording paper 116, an image is formed on the recording paper 116.

As described above, the ejection volume and the ejection timing of the ink droplets from the respective nozzles are controlled via the head driver 184, on the basis of the ink ejection data generated by implementing prescribed signal processing in the print controller 180, and the drive signal waveform. By this means, prescribed dot size and dot positions can be achieved on the recording paper 116 (recording medium).

As shown in FIG. 19, the print determination unit 124 is a block including an image sensor, which reads in the image printed onto the recording medium 116, performs various signal processing operations, and the like, and determines the print situation (presence/absence of ejection, depositing position error, dot shape, optical density, and the like), these determination results being supplied to the print controller 180 and the system controller 172.

According to requirements, the print controller 180 implements various corrections with respect to the head 150, on the basis of the information obtained from the print determination unit 124, and implements control for carrying out cleaning operations (nozzle restoring operations), such as preliminary ejection, suctioning, or wiping, as and when necessary.

In the case of the present embodiment, a combination of the print determination unit 124, the dot measurement calculation unit 172A and the nozzle characteristics data generation unit 172B corresponds to the "recording element characteristics information acquisition device", and the virtual nozzle conversion unit 172C corresponds to the "virtual recording element conversion device". Furthermore, the correction function calculation unit 172D corresponds to the "correction function calculation device", and the corrected nozzle signal generation unit 172E corresponds to the "corrected recording element signal calculation device" and the "corrected recording element signal table generation device". The dot pattern table generation unit 172F corresponds to the "one-dimensional dot pattern table generation device". The print controller 180 or a combination of the print controller 180 and the system controller 172 corresponds to the "recording control device". The image processing unit 190 functions as the "multiple-value error diffusion processing device" and the "one-dimensional dot pattern conversion device".

Figure 25:
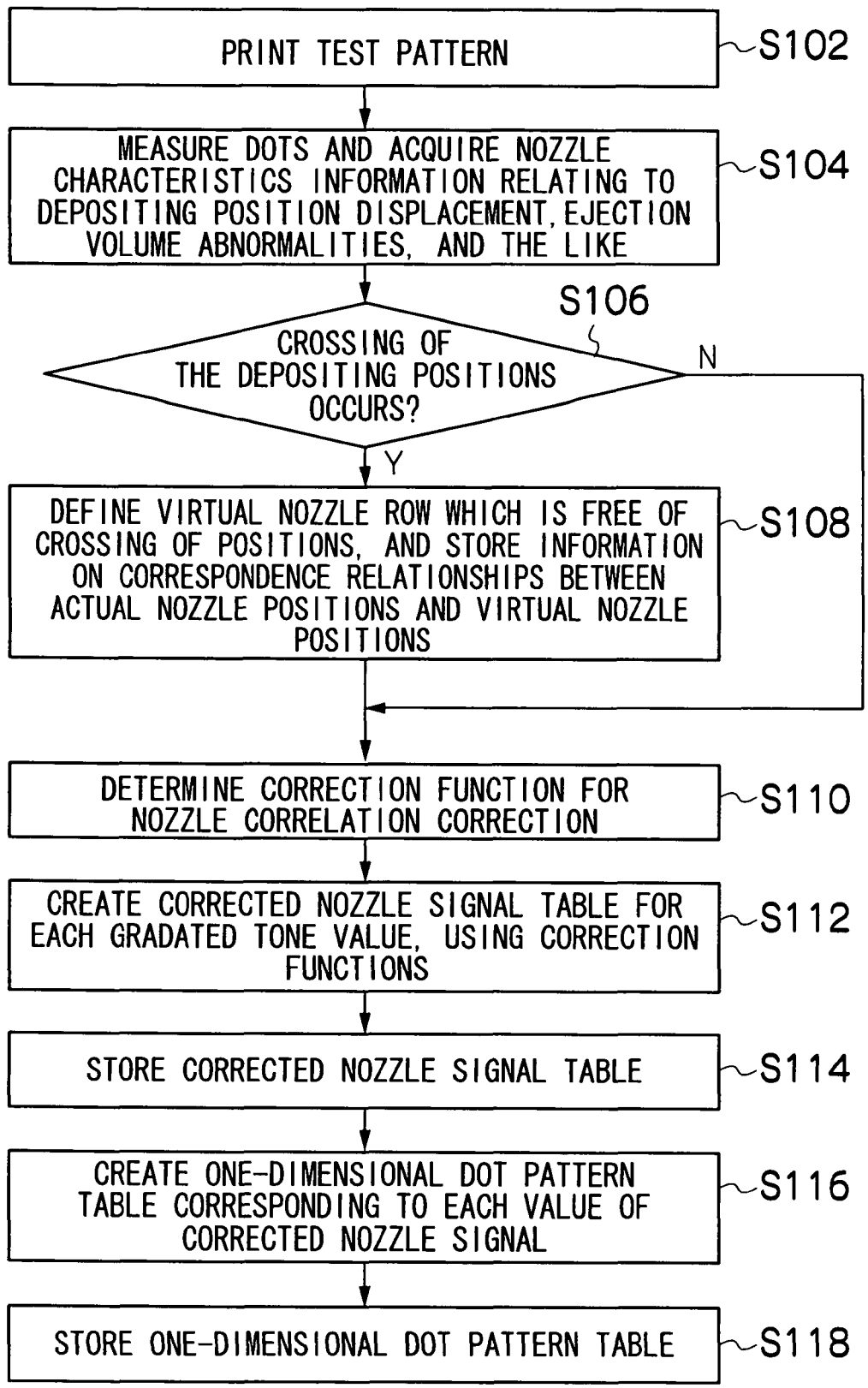
FIG. 25 is a flowchart indicating a dot pattern table creation procedure of the inkjet recording apparatus according to the present embodiment.

FIG. 25 is a flowchart showing a procedure for creating a one-dimensional dot pattern table in the inkjet recording apparatus 110 having the composition described above. There are no particular restrictions on the start timing of the one-dimensional dot pattern table creation processing sequence shown in FIG. 25, and this sequence may be started at a wide variety of timings, such as when the apparatus is manufactured, when the head is replaced, when maintenance is performed, when the apparatus is started up, a prescribed timing based on monitoring of the cumulative operating time, or at a timing specified upon occasion by the operator, or the like.

When creating a dot pattern table, firstly, in order to ascertain the recording characteristics of each nozzle, a prescribed test pattern is printed onto the recording medium (step S102). There are no particular restrictions on the mode of the test pattern, but desirably it is a pattern which allows measurement of the depositing positions and dot shapes (dot sizes), and the like, of the dots recorded by the respective nozzles.

Subsequently, the results of printing the test pattern are read in and nozzle characteristics information, such as the depositing position displacement, ejection volume abnormalities, and the like, is acquired (step S104). On the basis of the nozzle characteristics information thus obtained, it is judged whether or not crossing between depositing positions occurs as shown in FIG. 4 (step S106 in FIG. 25), and if such crossing does occur (YES verdict), then a virtual nozzle row which maintains the adjacency relationships between the deposited dots and the adjacency relationships between the nozzle positions is defined, as described in FIG. 5, and information indicating the correspondence relationships between the actual nozzle positions and the virtual nozzle positions is stored (step S108 in FIG. 25). On the other hand, if it is judged that there is no crossing of the depositing positions at step S106, then the processing in step S108 is omitted and the procedure advances to step S110.

Thereupon, at step S110, correction functions are determined in order to correct the banding caused by the nozzle characteristics on the basis of the correlation with the adjacent nozzles. More specifically, as shown in FIG. 6, calculation is carried out in order to determine polynomial coefficients by using an optimization technique.

The correction functions determined in this manner are used to correct the data of the single density image (a so-called solid image) which has a uniform graduated tone value for all of the pixels, thereby creating corrected nozzles signals for each nozzle position. The results are divided into blocks corresponding to the pixel positions, thereby forming a corrected nozzle signal table (step S112 in FIG. 25). By carrying out similar calculational processing while changing the input graduated tone value successively to each of the graduated tone values, a corrected nozzle signal table is obtained for each of the graduated tone values (see FIG. 9).

The corrected nozzle signal tables obtained in this way are stored in the storage unit (corrected nozzle signal table storage unit) (step S114 in FIG. 25).

Thereupon, for each value of the corrected nozzle signal, one-dimensional dot rows which represent (reproduces) the graduated tone indicated by the corrected nozzle signal value are created, and these dot rows are taken to form a one-dimensional dot pattern table (step S116). The one-dimensional dot pattern tables obtained in this manner are stored in a storage unit (one-dimensional dot pattern table storage unit) (step S118), and the processing then terminates.

FIG. 25 shows an example where it is judged whether or not there is crossing in the depositing positions of the step S106, and virtual nozzles are set only in the case where crossing of the depositing positions occurs, but substantially the same processing may be carried out even in the case where there is no crossing of the depositing positions under conditions that the correspondence relationship is such that the virtual nozzles and the actual nozzles are equal (virtual nozzle position=actual nozzle position).

Figure 26:
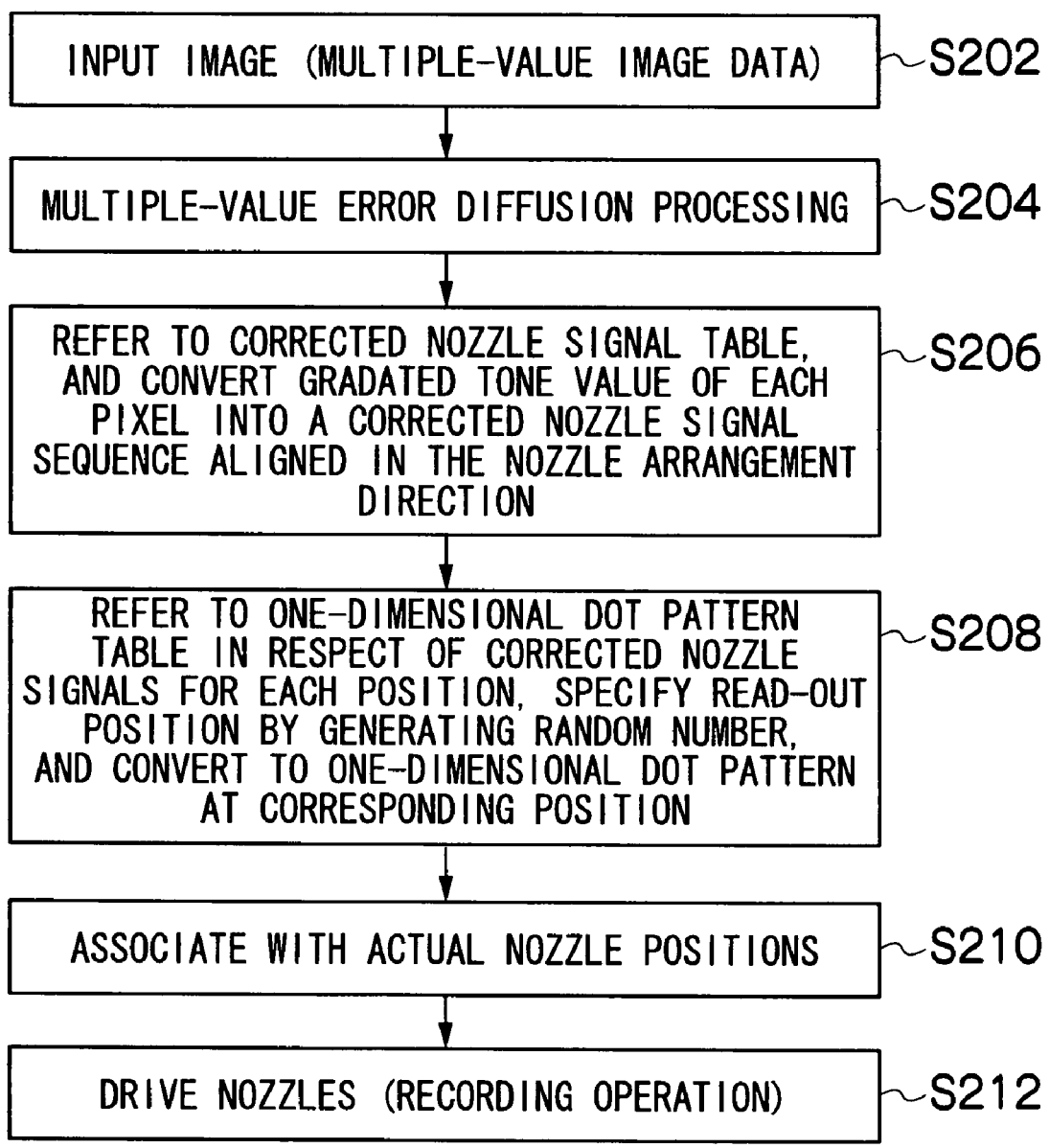
FIG. 26 is a flowchart showing the sequence of an image recording operation in the inkjet recording apparatus according to the present embodiment.

FIG. 26 is a flowchart showing the sequence of an image recording operation performed by the inkjet recording apparatus 110 according to the present embodiment. As shown in FIG. 26, firstly, the multiple-value image data of the image that is the object of image formation is input (step S202), and multiple-value error diffusion processing is carried out (step S204). Thereupon, the corrected nozzle signal table is referenced in respect of the multiple-value image data thus obtained, and the graduated tone values of the respective pixels are converted to a sequence of corrected nozzle signals which are aligned in the nozzle arrangement direction (first direction) (step S206).

Subsequently, the one-dimensional dot pattern table is referenced for the corrected nozzle signal at each of the positions, and a one-dimensional dot row is output for that position from a read-out position specified by means of generating a random number (step S208). In this way, the multiple-value image data is converted into a dot image (dot arrangement data).

When the virtual nozzle row is defined and used, processing for converting from the virtual nozzle positions back to the actual nozzle positions is carried out (step S210), and the respective nozzles are then driven on the basis of the dot image (step S212).

Figure 27:
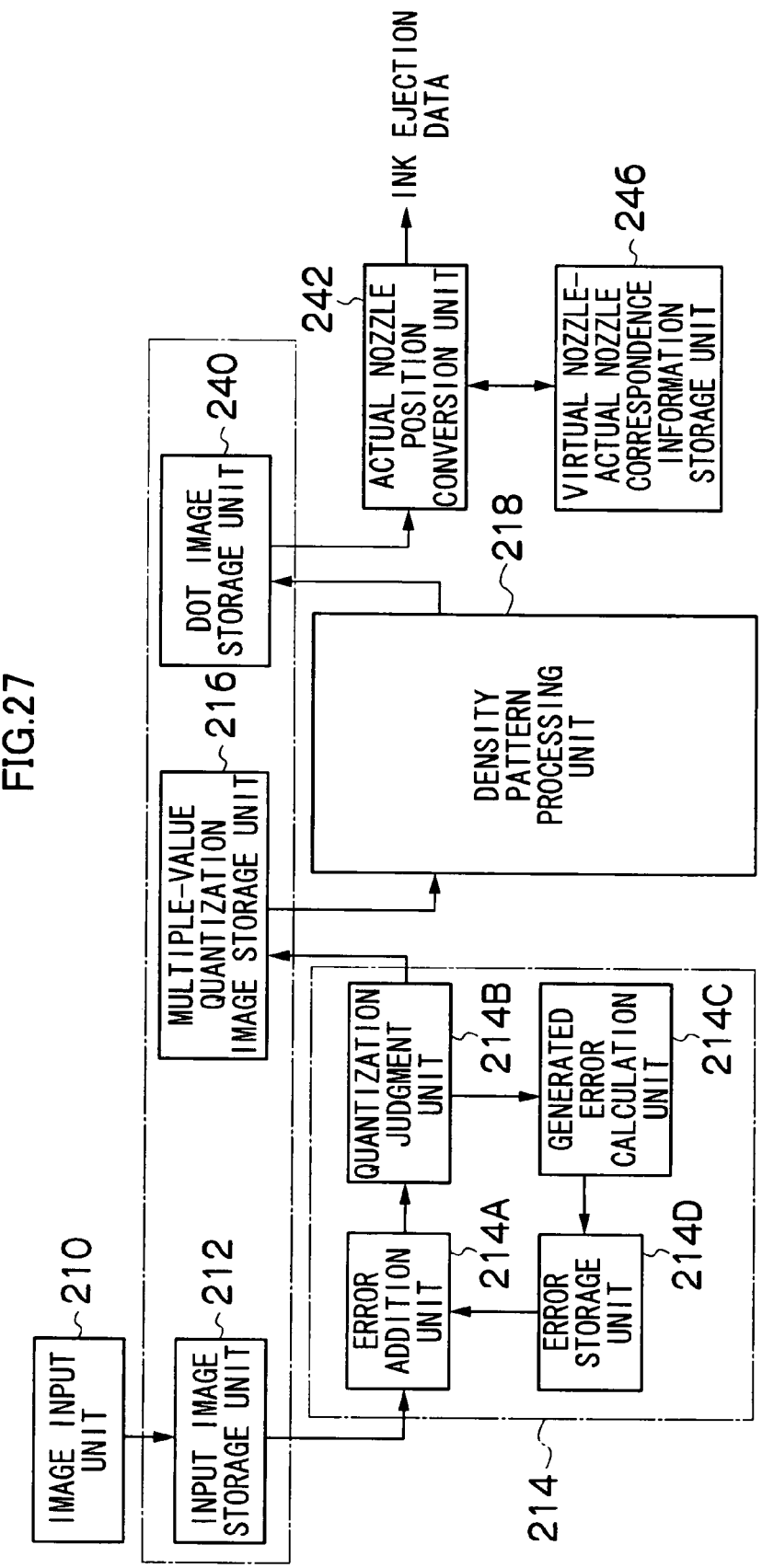
FIG. 27 is a principal block diagram showing image processing in the inkjet recording apparatus according to the present embodiment.
Figure 28:
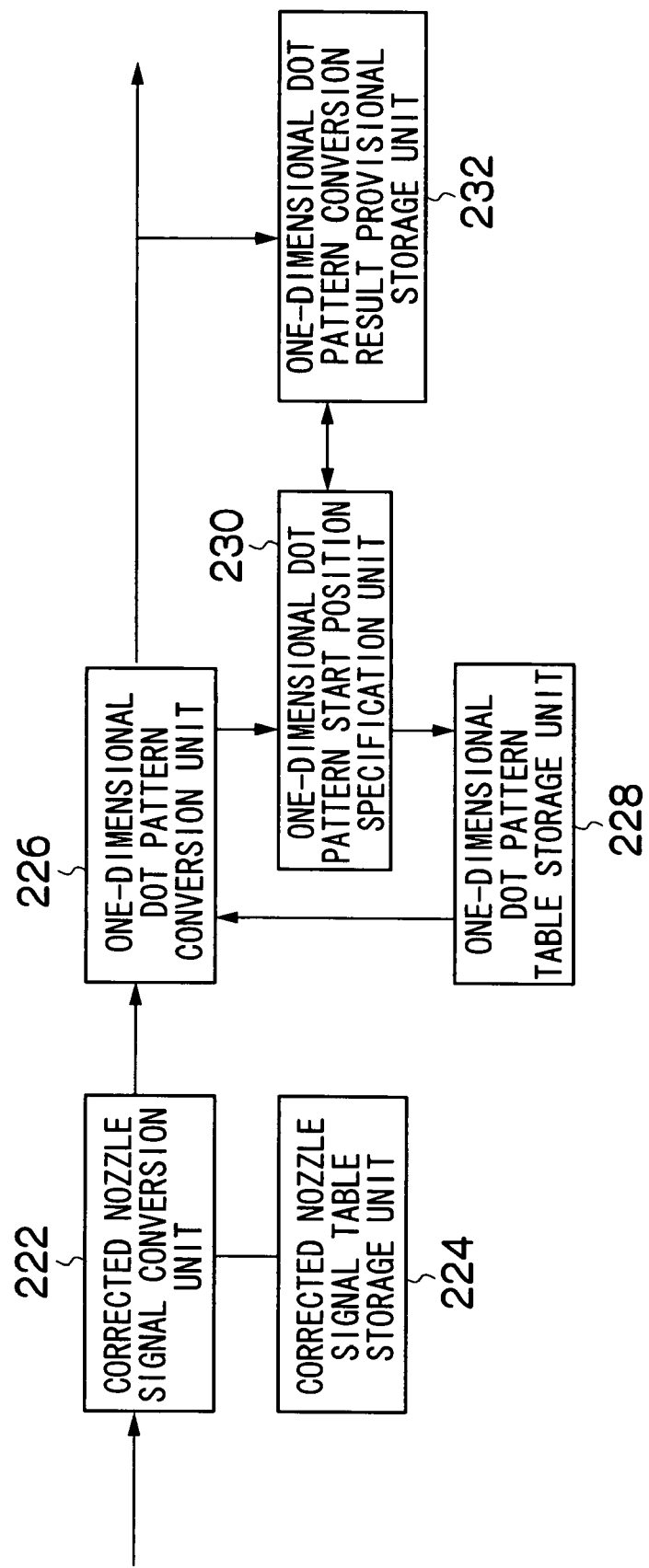
FIG. 28 is a block diagram showing the details of the density pattern processing unit in FIG. 27.

FIG. 27 is a principal block diagram which relates to image processing in the inkjet recording apparatus 110 according to the present embodiment, and FIG. 28 is a block diagram showing the detailed composition of the density pattern processing unit 218 shown in FIG. 27.

The image input unit 210 is an interface unit which takes in the data of the input image. The multiple-value image data input from the image input unit 210 is stored in the input image storage unit 212. According to requirements, color conversion processing, pixel number conversion processing, and the like, is carried out, and the multiple-value image data (which corresponds to image A shown in FIG. 1) prior to input to the multiple-value error diffusion processing unit 214 is stored in the input image storage unit 212.

The multiple-value error diffusion processing unit 214 includes an error addition unit 214A, a quantization judgment unit 214B, a generated error calculation unit 214C and an error storage unit 214D. The error addition unit 214A carries out calculation for adding the input value of the multiple-value image data represented by 8 bits (256 tones) for each pixel read out from the input image storage unit 212, with the accumulated error diffused into the pixel under processing (a value stored in the error storage unit 214D), of the error generated in the pixels which have already been quantized.

The calculation result of the error addition unit 214A is input to the quantization judgment unit 214B. The quantization judgment unit 214B quantizes the multiple-value data obtained from the error addition unit 214A into a graduated tone value having a prescribed number of tones (for example, a number of graduated tones b=16). The quantization result is stored in the multiple-value quantized image storage unit 216. The generated error calculation unit 214C calculates the error between the multiple-value data before quantization (the output value of the error addition unit 214A) and the quantized value after quantization by the quantization judgment unit 214B. The error calculated by the generated error calculation unit 214C is apportioned to the unquantized pixels surrounding the pixel under quantization processing, at a prescribed allocation ratio, and is stored in the error storage unit 214D.

By carrying out the quantization processing described above successively in respect of all of the pixels in the multiple-value image data stored in the input image storage unit 212, each of the pixels is quantized and the data is converted into multiple-value image data (the image B shown in FIG. 1) having a number of graduated tones "b". The multiple-value image data having this number of graduated tones "b" is stored in the multiple-value quantized image storage unit 216.

Subsequently, processing is carried out by the density pattern processing unit 218. As shown in FIG. 28, the density pattern processing unit 218 is constituted by a corrected nozzle signal conversion unit 222, a corrected nozzle signal table storage unit 224, a one-dimensional dot pattern conversion unit 226, a one-dimensional dot pattern table storage unit 228, a one-dimensional dot pattern start position specification unit 230, and a one-dimensional dot pattern conversion result provisional storage unit 232.

The corrected nozzle signal conversion unit 222 refers to the corrected nozzle signal table stored in the corrected nozzle signal table storage unit 224, in respect of each of the pixels of the multiple-value image data generated by the multiple-value error diffusion processing unit 214 (see FIG. 27), and converts the data into a sequence of corrected nozzle signals corresponding to the nozzle positions.

The one-dimensional dot pattern conversion unit 226 carries out processing for converting the values of the corrected nozzle signal sequence corresponding to each nozzle position to a one-dimensional dot row, by referring to the one-dimensional dot pattern table stored in the one-dimensional dot pattern table storage unit 228.

The one-dimensional dot pattern start position specification unit 230 includes a random number generating device, and functions as a position specification device which specifies the read-out position (start position) when reading out dot patterns corresponding to a prescribed number of dot pixels from the one-dimensional dot pattern table. Furthermore, the one-dimensional dot pattern start position specification unit 230 also functions as a device which evaluates the correlation between a candidate dot row at the start position specified on the basis of generating a random number, and dot rows resulting from previous conversion steps which are stored in the one-dimensional dot pattern conversion result provisional storage unit 232, and judges whether or not the candidate start position is suitable by determining whether or not the dot distribution will be able to maintain a prescribed standard level.

The conversion results from the one-dimensional dot pattern conversion unit 226 (in other words, the one-dimensional dot pattern output from the one-dimensional dot pattern conversion unit 226) are stored in the one-dimensional dot pattern conversion result provisional storage unit 232, and are also stored in the dot image storage unit 240 in FIG. 27. By converting all of the pixels in the multiple-value image data into dot patterns as described above, a dot image (dot arrangement data) is completed. The respective nozzles are driven on the basis of this dot arrangement data, but if virtual nozzles are introduced, then in order to return the correspondence relationships between the positions of the dot pixels in the dot arrangement data and the actual nozzle positions, to their original state, the actual nozzle position conversion unit 242 carries out conversion from the virtual nozzle positions to the actual nozzle positions.

More specifically, when virtual nozzles are introduced, processing is carried out for rewriting the positional relationships by referring to the information in the correspondence information storage unit 246, which stores the correspondence relationships (conversion information) between the virtual nozzle positions and the actual nozzle positions. In this way, ink ejection data for driving the actuators (reference numeral 158 in FIG. 22) of the nozzles is generated on the basis of dot arrangement data which is associated with the actual nozzle positions.

The respective storage units (212, 214D, and 240) shown in FIG. 27 and the storage unit (232) shown in FIG. 28 can be realized by utilizing the storage area of a recording device, such as the image memory 174 or the image buffer memory 182 shown in FIG. 24. Furthermore, the correspondence information storage unit 246 shown in FIG. 27 and the corrected nozzle signal table storage unit 224 and the one-dimensional dot pattern table storage unit 228 shown in FIG. 28 can be realized by utilizing the storage area of the ROM 175 (constituted by an EEPROM) shown in FIG. 24.

According to the inkjet recording apparatus 110 having the composition described above, even if nozzle ejection errors (ejection failure, depositing position error, ejection volume abnormality, or the like) have occurred, it is possible to obtain a satisfactory image in which the occurrence of image deterioration caused by the nozzle characteristics is suppressed.

The present embodiment has been described with respect to the example of an inkjet recording apparatus using a full line recording head, but the range of application of the present invention is not limited to this, and the present invention can also be applied to a case where image formation is carried out by using a short head having a nozzle row of a length which does not reach the full width of the recording medium, and performing scanning a plurality of times. The advantageous effects can be obtained especially when the present invention is applied to a so-called single-pass image formation method, in which image recording is completed in the region of relative movement (scanning range) covered by the nozzle row (recording element row) of the recording head, by carrying out one relative movement of the recording head and the recording medium.

Furthermore, in the foregoing embodiment, an inkjet recording apparatus is described as one example of an image forming apparatus, but the range of application of the present invention is not limited to this. The present invention can also be applied to image forming apparatuses based on various types of methods other than an inkjet method, such as a thermal transfer recording apparatus using a line head (an apparatus using thermal elements as recording elements), an LED electrophotographic printer, a silver halide photographic type printer having an LED line exposure head (an apparatus using LED elements as recording elements), or the like.

As ascertained from the description of the embodiments of the present invention detailed above, the present specification includes the disclosure of technical ideas including the aspects described below.

First Aspect of the Present Invention

A first aspect of the present invention is directed to an image processing apparatus which converts multiple-value image data of an image into a plurality of dot patterns to form the image on a recording medium, the multiple-value image data being constituted of a plurality of pixels each of which has a graduated tone value that is one of graduated tone numbers, the image being formed by means of: a recording head which has a plurality of recording elements arranged in a first direction, the recording elements forming dots on the recording medium to form the image in accordance with the dot patterns, each of the dot patterns representing an arrangement of the dots corresponding to the graduated tone value for each of the pixels, at least two of the recording elements being disposed at a position corresponding to each of the pixels to form the dots for said each of the pixels; and a relative movement device which causes the recording head and the recording medium to move relative to each other in a second direction that is substantially perpendicular to the first direction, the image processing apparatus including: a corrected recording element signal table storage device which stores a plurality of corrected recording element signal tables respectively for the graduated tone numbers, each of the corrected recording element signal tables being constituted of corrected recording element signals correlated with positions of the recording elements, each of the corrected recording element signals being one of corrected recording element signal numbers and determined so that banding caused by recording characteristics of the recording elements is corrected in accordance with a correlation between each of the recording elements and surrounding recording elements of said each of the recording elements; a one-dimensional dot pattern table storage device which stores a one-dimensional dot pattern table which specifies a one-dimensional dot pattern for each of the corrected recording element signal numbers, the one-dimensional dot pattern representing an arrangement of the dots in the second direction and reproducing said each of the corrected recording element signal numbers; a corrected recording element signal conversion device which converts the multiple-value image data into a one-dimensional sequence of the corrected recording element signals in the first direction correlated with the positions of the recording elements, by selecting the corrected recording element signals from one of the corrected recording element signal tables corresponding to the graduated tone value of each of the pixels according to a position and the graduated tone value of said each of the pixels; and a one-dimensional dot pattern conversion device which converts each of the corrected recording element signals of the one-dimensional sequence in the first direction into the one-dimensional dot pattern in the second direction, by reading out the one-dimensional dot pattern composed of a prescribed number of dot pixels, from the one-dimensional dot pattern table in accordance with said each of the corrected recording element signals of the one-dimensional sequence.

Here, "a plurality of recording elements arranged in a first direction" means that when the arrangement of a plurality of recording elements is projected (by orthogonal projection) to a straight line following a first direction, the projected recording elements are aligned following the first direction, and therefore this condition is not limited to a mode where the plurality of recording elements are aligned in a single straight line following the first direction, and may also include a mode where the recording elements are arranged in an oblique direction which is not perpendicular to the first direction, or a mode where a recording element row, in which a plurality of recording elements are projected so as to be aligned effectively in the first direction, is formed by means of a composition having a two-dimensional arrangement of a plurality of recording elements, or the like.

According to the first aspect of the present invention having the composition described above, the dot pattern tables required in order to convert multiple-value graduated tone values into a density pattern (dot pattern) is constituted of data of a one-dimensional dot arrangement, for each graduated tone value, and therefore the data volume can be reduced significantly in comparison with aspects of the related art which uses two-dimensional dot pattern tables. Consequently, it is possible to reduce the storage capacity required for conversion to a dot pattern.

Preferably, the image processing apparatus according to the first aspect of the present invention further includes a position specification device which specifies a read-out position in the one-dimensional dot pattern of the one-dimensional dot pattern table, the read-out position being a position at which the one-dimensional dot pattern composed of the prescribed number of the dot pixels starts to be read out from the one-dimensional dot pattern table in accordance with each of the corrected recording element signals of the one-dimensional sequence.

Preferably, in the image processing apparatus according to the first aspect of the present invention, the position specification device includes a random number generation device which generates a random number specifying the read-out position.

By specifying read-out positions on the basis of the generation of random numbers, the positions of the selected dot patterns change at random, thereby suppressing the occurrence of regular non-uniformities caused by repeating the same pattern consecutively.

Preferably, in the image processing apparatus according to the first aspect of the present invention, the multiple-value image data has a data structure in which positions of the pixels are shifted by half a pixel in the first direction, between a odd-numbered row of the pixels in the first direction and an even-numbered row of the pixels in the first direction, the odd-numbered row and the even-numbered row being mutually adjacent in the second direction; and the corrected recording element signal table storage device stores two types of the corrected recording element signal tables, one of the two types for the odd-numbered row and the other of the two types for the even-numbered row.

Due to the adoption of a composition in which the pixel arrangement of the multiple-value image data input to the density pattern processing incorporates a half-pixel offset in the first direction between adjacent pixel rows in the second direction, then even if the dot patterns obtained as a result of converting the graduated tone values of the respective pixels to two-dimensional dot patterns by means of the corrected recording element signal conversion device and the one-dimensional dot pattern conversion device are square-shaped patterns, the dot rows belonging to the boundaries of the dot patterns (namely, the pixel positions where there is a decline in banding correction performance) do not continue in a single straight line, and therefore, since human visual characteristics indicate low sensitivity in oblique directions, cyclical non-uniformities caused by repetition of blocks of dot patterns are not liable to become visible.

Preferably, the image processing apparatus according to the first aspect of the present invention further includes a conversion result storage device which stores the one-dimensional dot patterns in the second direction having been converted by the one-dimensional dot pattern conversion device, wherein the one-dimensional dot pattern conversion device sequentially converts the corrected recording element signals of the one-dimensional sequence in the first direction into the one-dimensional dot patterns in the second direction, so that the one-dimensional dot pattern to be converted and the one-dimensional dot patterns having been converted have a relationship in which a dot distribution in the first direction is maintained at a prescribed standard level between positions of the dot pixels in the second direction, the dot distribution being a distribution of the dots aligned in the first direction and contained in the one-dimensional dot pattern to be converted and the one-dimensional dot patterns having been converted and stored in the conversion result storage device.

For example, a dot pattern (dot row) forming a conversion candidate is extracted from the one-dimensional dot pattern table in respect of the position under processing, on the basis of a generated random number, the correlation between this conversion candidate dot row and a dot row (and desirably, a plurality of dot rows) resulting from a previous conversion operation is calculated, the standard level of the distribution of dots is evaluated with respect to the position in the second direction, and if it exceeds the prescribed level, then the conversion candidate is discarded and a conversion candidate is selected again, in such a manner that a dot row which achieves the prescribed standard level is employed.

Preferably, the image processing apparatus according to the first aspect of the present invention further includes a multiple-value error diffusion processing device which carries out multiple-value error diffusion processing with respect to an input image of multiple-value to generate the multiple-value image data which has a smaller number of graduated tones than the input image.

It is also possible to adopt a composition in which a multiple-value error diffusion processing device is provided in the stage before density pattern processing constituted by a corrected recording element signal conversion device and a one-dimensional dot pattern conversion device, and the multiple-value image data obtained by the multiple-value error diffusion device is input to the density pattern processing.

Second Aspect of the Present Invention

A second aspect of the present invention is directed to an image processing method of preparing a plurality of dot patterns used to form an image on a recording medium by converting multiple-value image data of the image into the dot patterns, the multiple-value image data being constituted of a plurality of pixels each of which has a graduated tone value that is one of graduated tone numbers, the image being formed by means of: a recording head which has a plurality of recording elements arranged in a first direction, the recording elements forming dots on the recording medium to form the image in accordance with the dot patterns, each of the dot patterns representing an arrangement of the dots corresponding to the graduated tone value for each of the pixels, at least two of the recording elements being disposed at a position corresponding to each of the pixels to form the dots for said each of the pixels; and a relative movement device which causes the recording head and the recording medium to move relative to each other in a second direction that is substantially perpendicular to the first direction, the image processing method including the steps of: preparing a plurality of corrected recording element signal tables respectively for the graduated tone numbers, each of the corrected recording element signal tables being constituted of corrected recording element signals correlated with positions of the recording elements, each of the corrected recording element signals being one of corrected recording element signal numbers and determined so that banding caused by recording characteristics of the recording elements is corrected in accordance with a correlation between each of the recording elements and surrounding recording elements of said each of the recording elements; preparing a one-dimensional dot pattern table which specifies a one-dimensional dot pattern for each of the corrected recording element signal numbers, the one-dimensional dot pattern representing an arrangement of the dots in the second direction and reproducing said each of the corrected recording element signal numbers; converting the multiple-value image data into a one-dimensional sequence of the corrected recording element signals in the first direction correlated with the positions of the recording elements, by selecting the corrected recording element signals from one of the corrected recording element signal tables corresponding to the graduated tone value of each of the pixels according to a position and the graduated tone value of said each of the pixels; and converting each of the corrected recording element signals of the converted one-dimensional sequence in the first direction into the one-dimensional dot pattern in the second direction, by reading out the one-dimensional dot pattern composed of a prescribed number of dot pixels, from the one-dimensional dot pattern table in accordance with said each of the corrected recording element signals of the one-dimensional sequence.

Preferably, the image processing method according to the second aspect of the present invention further includes the step of generating a random number specifying the read-out position.

Preferably, in the image processing method according to the second aspect of the present invention, the multiple-value image data has a data structure in which positions of the pixels are shifted by half a pixel in the first direction, between a odd-numbered row of the pixels in the first direction and an even-numbered row of the pixels in the first direction, the odd-numbered row and the even-numbered row being mutually adjacent in the second direction; and two types of the corrected recording element signal tables are stored, one of the two types for the odd-numbered row and the other of the two types for the even-numbered row.

Preferably, the image processing method according to the second aspect of the present invention further includes the step of storing the one-dimensional dot patterns in the second direction having been converted, wherein the corrected recording element signals of the one-dimensional sequence in the first direction are sequentially converted into the one-dimensional dot patterns in the second direction, so that the one-dimensional dot pattern to be converted and the one-dimensional dot patterns having been converted have a relationship in which a dot distribution in the first direction is maintained at a prescribed standard level between positions of the dot pixels in the second direction, the dot distribution being a distribution of the dots aligned in the first direction and contained in the one-dimensional dot pattern to be converted and the one-dimensional dot patterns having been converted and stored.

Preferably, the image processing method according to the second aspect of the present invention further includes the step of performing multiple-value error diffusion processing with respect to an input image of multiple-value to generate the multiple-value image data which has a smaller number of graduated tones than the input image.

Third Aspect of the Present Invention

A third aspect of the present invention is directed to an image forming apparatus which forms an image on a recording medium by converting multiple-value image data of the image into a plurality of dot patterns, the multiple-value image data being constituted of a plurality of pixels each of which has a graduated tone value that is one of graduated tone numbers, the image forming apparatus including: a recording head which has a plurality of recording elements arranged in a first direction, the recording elements forming dots on the recording medium to form the image in accordance with the dot patterns, each of the dot patterns representing an arrangement of the dots corresponding to the graduated tone value for each of the pixels; a relative movement device which causes the recording head and the recording medium to move relative to each other in a second direction that is substantially perpendicular to the first direction; a recording element characteristics information acquisition device which acquires characteristics information representing recording characteristics of the recording elements based on recording states of the dots formed on the recording medium by the recording elements of the recording head; a virtual recording element conversion device which converts the recording elements into a plurality of virtual recording elements and stores a correspondence relationship between positions of the virtual recording elements and positions of the recording elements, the virtual recording elements being disposed in an arrangement such that an adjacency relationship of the virtual recording elements in the first direction and an adjacency relationship of the dots formed on the recording medium in the first direction are preserved; a correction function calculation device which determines a correction function that corrects recording element signals for the pixels corresponding to the virtual recording elements, in such a manner that banding caused by the recording characteristics of the recording elements is corrected in accordance with a correlation between each of the recording elements and surrounding recording elements of said each of the recording elements; a corrected recording element signal calculation device which calculates corrected recording element signals correlated with the positions of the virtual recording elements for each of the graduated tone numbers by correcting the multiple-value image data of a single density image in accordance with the correction function, each of the corrected recording element signals being one of corrected recording element signal numbers, the single density image being such that all of the pixels constituting the single density image have a same graduated tone value corresponding to said each of the graduated tone numbers; a corrected recording element signal table generation device which divides up the corrected recording element signals for each of the graduated tone numbers into a prescribed number of blocks arranged in the first direction to generate a plurality of corrected recording element signal tables respectively for the graduated tone numbers, each of the corrected recording element signal tables being constituted of the blocks of the corrected recording element signals corresponding to positions of the pixels in the multiple-value image data of the single density image; a corrected recording element signal table storage device which stores the corrected recording element signal tables respectively for the graduated tone numbers; a one-dimensional dot pattern table generation device which generates a one-dimensional dot pattern table which specifies a one-dimensional dot pattern for each of the corrected recording element signal numbers, the one-dimensional dot pattern representing an arrangement of the dots in the second direction and reproducing said each of the corrected recording element signal numbers; a one-dimensional dot pattern table storage device which stores the one-dimensional dot pattern table generated by the one-dimensional dot pattern table generation device; a corrected recording element signal conversion device which converts the multiple-value image data into a one-dimensional sequence of the corrected recording element signals in the first direction corresponding to the positions of the recording elements, by selecting the corrected recording element signals from one of the corrected recording element signal tables corresponding to the graduated tone value of each of the pixels according to a position and the graduated tone value of said each of the pixels; a one-dimensional dot pattern conversion device which converts each of the corrected recording element signals of the one-dimensional sequence in the first direction into the one-dimensional dot pattern in the second direction, by reading out the one-dimensional dot pattern composed of a prescribed number of dot pixels, from the one-dimensional dot pattern table in accordance with said each of the corrected recording element signals of the one-dimensional sequence; and a recording control device which controls driving of the recording elements in accordance with the one-dimensional dot pattern converted by the one-dimensional dot pattern conversion device, and the correspondence relationship between the positions of the virtual recording elements and the positions of the recording elements stored by the virtual recording element conversion device.

The image forming apparatus according to the third aspect of the present invention includes: the image processing apparatus according to the first aspect of the present invention; a device which creates a corrected recording element signal table; and a device which creates one-dimensional dot pattern tables.

The "recording element characteristics information acquisition device" may acquire information by storing information relating to the recording characteristics of the recording elements, previously, in a storage device such as a memory, and then reading out the required information, or it may acquire information relating to recording characteristics by printing an actual test pattern, or the like, and then reading in and analyzing the print results. Considering that the recording characteristics change over time, a desirable mode is one in which the information is updated at suitable times.

An inkjet recording apparatus forming the image forming apparatus according to an embodiment of the present invention includes: a liquid ejection head (corresponding to a "recording head") having a liquid droplet ejection element row in which a plurality of liquid droplet ejection elements (corresponding to "recording elements") are arranged in a row, each liquid droplet ejection element including a nozzle for ejecting an ink droplet in order to form a dot and a pressure generating device (piezoelectric element, heating element, or the like) which generates an ejection pressure; and an ejection control device which controls the ejection of liquid droplets from the recording head on the basis of ink ejection data generated from the image data. An image is formed on a recording medium by means of the liquid droplets ejected from the nozzles.

A compositional example of the recording head is a full line type of head having a recording element row in which a plurality of recording elements are arranged through a length corresponding to the full width of the recording medium. In this case, a mode may be adopted in which a plurality of relatively short recording head modules having recording element rows which do not reach a length corresponding to the full width of the recording medium are combined and joined together, thereby forming recording element rows of a length that correspond to the full width of the recording medium.

A full line type (page-wide) head is typically disposed in a direction that is perpendicular to the relative feed direction (relative conveyance direction) of the recording medium, but a mode may also be adopted in which the recording head is disposed following an oblique direction that forms a prescribed angle with respect to the direction perpendicular to the conveyance direction.

"Recording medium" indicates a medium on which an image is recorded by means of the action of the recording head (this medium may also be called an image forming medium, recording medium, image receiving medium or, in the case of an inkjet recording apparatus, an ejection medium or ejection receiving medium, or the like). This term includes various types of media, irrespective of material and size, such as continuous paper, cut paper, sealed paper, resin sheets, such as OHP sheets, film, cloth, an intermediate transfer body, a printed circuit board on which a wiring pattern, or the like, is printed by means of an inkjet recording apparatus, and the like.

The "relative movement device" may include a mode where the recording medium is conveyed with respect to a stationary (fixed) recording head, or a mode where a recording head is moved with respect to a stationary recording medium, or a mode where both the recording head and the recording medium are moved.

When forming color images by means of an inkjet head, it is possible to provide recording heads for each color of a plurality of colored inks (recording liquids), or it is possible to eject inks of a plurality of colors, from one recording head.

Furthermore, the present invention is not limited to a full line type of head as described above, and it may also be applied to a system which performs recording by scanning a short recording head a plurality of times.

Preferably, the image forming apparatus according to the third aspect of the present invention further includes a position specification device which specifies a read-out position in the one-dimensional dot pattern of the one-dimensional dot pattern table, the read-out position being a position at which the one-dimensional dot pattern composed of the prescribed number of the dot pixels starts to be read out from the one-dimensional dot pattern table in accordance with each of the corrected recording element signals of the one-dimensional sequence.

Preferably, in the image forming apparatus according to the third aspect of the present invention, the position specification device includes a random number generation device which generates a random number specifying the read-out position.

Preferably, in the image forming apparatus according to the third aspect of the present invention, the multiple-value image data has a data structure in which positions of the pixels are shifted by half a pixel in the first direction, between a odd-numbered row of the pixels in the first direction and an even-numbered row of the pixels in the first direction, the odd-numbered row and the even-numbered row being mutually adjacent in the second direction; and the corrected recording element signal table storage device stores two types of the corrected recording element signal tables, one of the two types for the odd-numbered row and the other of the two types for the even-numbered row.

Preferably, the image forming apparatus according to the third aspect of the present invention further includes a conversion result storage device which stores the one-dimensional dot patterns in the second direction having been converted by the one-dimensional dot pattern conversion device, wherein the one-dimensional dot pattern conversion device sequentially converts the corrected recording element signals of the one-dimensional sequence in the first direction into the one-dimensional dot patterns in the second direction, so that the one-dimensional dot pattern to be converted and the one-dimensional dot patterns having been converted have a relationship in which a dot distribution in the first direction is maintained at a prescribed standard level between positions of the dot pixels in the second direction, the dot distribution being a distribution of the dots aligned in the first direction and contained in the one-dimensional dot pattern to be converted and the one-dimensional dot patterns having been converted and stored in the conversion result storage device.

Preferably, the image forming apparatus according to the third aspect of the present invention further includes a multiple-value error diffusion processing device which carries out multiple-value error diffusion processing with respect to an input image of multiple-value to generate the multiple-value image data which has a smaller number of graduated tones than the input image.

Fourth Aspect of the Present Invention

A fourth aspect of the present invention is directed to an image forming method of forming an image on a recording medium by converting multiple-value image data of the image into dot patterns, the multiple-value image data being constituted of a plurality of pixels each of which has a graduated tone value that is one of graduated tone numbers, the image being formed by means of: a recording head which has a plurality of recording elements arranged in a first direction, the recording elements forming dots on the recording medium to form the image in accordance with the dot patterns, each of the dot patterns representing an arrangement of the dots corresponding to the graduated tone value for each of the pixels; and a relative movement device which causes the recording head and the recording medium to move relative to each other in a second direction that is substantially perpendicular to the first direction, the image forming method including the steps of: acquiring characteristics information representing recording characteristics of the recording elements based on recording states of the dots formed on the recording medium by the recording elements of the recording head; converting the recording elements into a plurality of virtual recording elements that are disposed in an arrangement such that an adjacency relationship of the virtual recording elements in the first direction and an adjacency relationship of the dots formed on the recording medium in the first direction are preserved; storing a correspondence relationship between positions of the virtual recording elements and positions of the recording elements; determining a correction function that corrects recording element signals for the pixels corresponding to the virtual recording elements, in such a manner that banding caused by the recording characteristics of the recording elements is corrected in accordance with a correlation between each of the recording elements and surrounding recording elements of said each of the recording elements; calculating corrected recording element signals correlated with the positions of the virtual recording elements for each of the graduated tone numbers by correcting the multiple-value image data of a single density image in accordance with the correction function, each of the corrected recording element signals being one of corrected recording element signal numbers, the single density image being such that all of the pixels constituting the single density image have a same graduated tone value corresponding to said each of the graduated tone numbers; generating a plurality of corrected recording element signal tables respectively for the graduated tone numbers by dividing up the corrected recording element signals for each of the graduated tone numbers into a prescribed number of blocks arranged in the first direction, each of the corrected recording element signal tables being constituted of the blocks of the corrected recording element signals corresponding to positions of the pixels in the multiple-value image data of the single density image; storing the corrected recording element signal table correlated with the graduated tone value generated in the step of generating the corrected recording element signal table; generating a one-dimensional dot pattern table which specifies a one-dimensional dot pattern for each of the corrected recording element signal numbers, the one-dimensional dot pattern representing an arrangement of the dots in the second direction and reproducing said each of the corrected recording element signal numbers; storing the one-dimensional dot pattern table generated in the step of generating the one-dimensional dot pattern table; converting the multiple-value image data into a one-dimensional sequence of the corrected recording element signals in the first direction corresponding to the positions of the recording elements, by selecting the corrected recording element signals from one of the corrected recording element signal tables corresponding to the graduated tone value of each of the pixels according to a position and the graduated tone value of said each of the pixels; converting each of the corrected recording element signals of the one-dimensional sequence in the first direction into the one-dimensional dot pattern in the second direction, by reading out the one-dimensional dot pattern composed of a prescribed number of dot pixels, from the one-dimensional dot pattern table in accordance with said each of the corrected recording element signals of the one-dimensional sequence; and controlling driving of the recording elements in accordance with the converted one-dimensional dot pattern, and the correspondence relationship between the positions of the virtual recording elements and the positions of the recording elements stored by the virtual recording element conversion device.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image processing apparatus which converts multiple-value image data of an image into a plurality of dot patterns to form the image on a recording medium, the multiple-value image data being constituted of a plurality of pixels each of which has a graduated tone value that is one of graduated tone numbers, the image being formed by means of: a recording head which has a plurality of recording elements arranged in a first direction, the recording elements forming dots on the recording medium to form the image in accordance with the dot patterns, each of the dot patterns representing an arrangement of the dots corresponding to the graduated tone value for each of the pixels, at least two of the recording elements being disposed at a position corresponding to each of the pixels to form the dots for said each of the pixels; and a relative movement device which causes the recording head and the recording medium to move relative to each other in a second direction that is substantially perpendicular to the first direction, the image processing apparatus comprising:

a corrected recording element signal table storage device which stores a plurality of corrected recording element signal tables respectively for the graduated tone numbers, each of the corrected recording element signal tables being constituted of corrected recording element signals correlated with positions of the recording elements, each of the corrected recording element signals being one of corrected recording element signal numbers and determined so that banding caused by recording characteristics of the recording elements is corrected in accordance with a correlation between each of the recording elements and surrounding recording elements of said each of the recording elements;

a one-dimensional dot pattern table storage device which stores a one-dimensional dot pattern table which specifies a one-dimensional dot pattern for each of the corrected recording element signal numbers, the one-dimensional dot pattern representing an arrangement of the dots in the second direction and reproducing said each of the corrected recording element signal numbers;

a corrected recording element signal conversion device which converts the multiple-value image data into a one-dimensional sequence of the corrected recording element signals in the first direction correlated with the positions of the recording elements, by selecting the corrected recording element signals from one of the corrected recording element signal tables corresponding to the graduated tone value of each of the pixels according to a position and the graduated tone value of said each of the pixels;

a one-dimensional dot pattern conversion device which converts each of the corrected recording element signals of the one-dimensional sequence in the first direction into the one-dimensional dot pattern in the second direction, by reading out the one-dimensional dot pattern composed of a prescribed number of dot pixels, from the one-dimensional dot pattern table in accordance with said each of the corrected recording element signals of the one-dimensional sequence; and a position specification device which specifies a read-out position in the one-dimensional dot pattern of the one-dimensional dot pattern table, the read-out position being a position at which the one-dimensional dot pattern composed of the prescribed number of the dot pixels starts to be read out from the one-dimensional dot pattern table in accordance with each of the corrected recording element signals of the one-dimensional sequence.

2. The image processing apparatus as defined in claim 1, wherein the position specification device includes a random number generation device which generates a random number specifying the read-out position.

3. An image processing apparatus which converts multiple-value image data of an image into a plurality of dot patterns to form the image on a recording medium, the multiple-value image data being constituted of a plurality of pixels each of which has a graduated tone value that is one of graduated tone numbers, the image being formed by means of: a recording head which has a plurality of recording elements arranged in a first direction, the recording elements forming dots on the recording medium to form the image in accordance with the dot patterns, each of the dot patterns representing an arrangement of the dots corresponding to the graduated tone value for each of the pixels, at least two of the recording elements being disposed at a position corresponding to each of the pixels to form the dots for said each of the pixels; and a relative movement device which causes the recording head and the recording medium to move relative to each other in a second direction that is substantially perpendicular to the first direction, the image processing apparatus comprising:

a corrected recording element signal table storage device which stores a plurality of corrected recording element signal tables respectively for the graduated tone numbers, each of the corrected recording element signal tables being constituted of corrected recording element signals correlated with positions of the recording elements, each of the corrected recording element signals being one of corrected recording element signal numbers and determined so that banding caused by recording characteristics of the recording elements is corrected in accordance with a correlation between each of the recording elements and surrounding recording elements of said each of the recording elements;

a one-dimensional dot pattern table storage device which stores a one-dimensional dot pattern table which specifies a one-dimensional dot pattern for each of the corrected recording element signal numbers, the one-dimensional dot pattern representing an arrangement of the dots in the second direction and reproducing said each of the corrected recording element signal numbers;

a corrected recording element signal conversion device which converts the multiple-value image data into a one-dimensional sequence of the corrected recording element signals in the first direction correlated with the positions of the recording elements, by selecting the corrected recording element signals from one of the corrected recording element signal tables corresponding to the graduated tone value of each of the pixels according to a position and the graduated tone value of said each of the pixels; and a one-dimensional dot pattern conversion device which converts each of the corrected recording element signals of the one-dimensional sequence in the first direction into the one-dimensional dot pattern in the second direction, by reading out the one-dimensional dot pattern composed of a prescribed number of dot pixels, from the one-dimensional dot pattern table in accordance with said each of the corrected recording element signals of the one-dimensional sequence, wherein:

the multiple-value image data has a data structure in which positions of the pixels are shifted by half a pixel in the first direction, between a odd-numbered row of the pixels in the first direction and an even-numbered row of the pixels in the first direction, the odd-numbered row and the even-numbered row being mutually adjacent in the second direction; and the corrected recording element signal table storage device stores two types of the corrected recording element signal tables, one of the two types for the odd-numbered row and the other of the two types for the even-numbered row.

4. An image processing apparatus which converts multiple-value image data of an image into a plurality of dot patterns to form the image on a recording medium, the multiple-value image data being constituted of a plurality of pixels each of which has a graduated tone value that is one of graduated tone numbers, the image being formed by means of: a recording head which has a plurality of recording elements arranged in a first direction, the recording elements forming dots on the recording medium to form the image in accordance with the dot patterns, each of the dot patterns representing an arrangement of the dots corresponding to the graduated tone value for each of the pixels, at least two of the recording elements being disposed at a position corresponding to each of the pixels to form the dots for said each of the pixels: and a relative movement device which causes the recording head and the recording medium to move relative to each other in a second direction that is substantially perpendicular to the first direction, the image processing apparatus comprising:

a corrected recording element signal table storage device which stores a plurality of corrected recording element signal tables respectively for the graduated tone numbers, each of the corrected recording element signal tables being constituted of corrected recording element signals correlated with positions of the recording elements, each of the corrected recording element signals being one of corrected recording element signal numbers and determined so that banding caused by recording characteristics of the recording elements is corrected in accordance with a correlation between each of the recording elements and surrounding recording elements of said each of the recording elements;

a one-dimensional dot pattern table storage device which stores a one-dimensional dot pattern table which specifies a one-dimensional dot pattern for each of the corrected recording element signal numbers, the one-dimensional dot pattern representing an arrangement of the dots in the second direction and reproducing said each of the corrected recording element signal numbers;

a corrected recording element signal conversion device which converts the multiple-value image data into a one-dimensional sequence of the corrected recording element signals in the first direction correlated with the positions of the recording elements, by selecting the corrected recording element signals from one of the corrected recording element signal tables corresponding to the graduated tone value of each of the pixels according to a position and the graduated tone value of said each of the pixels;

a one-dimensional dot pattern conversion device which converts each of the corrected recording element signals of the one-dimensional sequence in the first direction into the one-dimensional dot pattern in the second direction, by reading out the one-dimensional dot pattern composed of a prescribed number of dot pixels, from the one-dimensional dot pattern table in accordance with said each of the corrected recording element signals of the one-dimensional sequence; and a conversion result storage device which stores the one-dimensional dot patterns in the second direction having been converted by the one-dimensional dot pattern conversion device, wherein the one-dimensional dot pattern conversion device sequentially converts the corrected recording element signals of the one-dimensional sequence in the first direction into the one-dimensional dot patterns in the second direction, so that the one-dimensional dot pattern to be converted and the one-dimensional dot patterns having been converted have a relationship in which a dot distribution in the first direction is maintained at a prescribed standard level between positions of the dot pixels in the second direction, the dot distribution being a distribution of the dots aligned in the first direction and contained in the one-dimensional dot pattern to be converted and the one-dimensional dot patterns having been converted and stored in the conversion result storage device.

5. An image forming apparatus which forms an image on a recording medium by converting multiple-value image data of the image into a plurality of dot patterns, the multiple-value image data being constituted of a plurality of pixels each of which has a graduated tone value that is one of graduated tone numbers, the image forming apparatus comprising:

a recording head which has a plurality of recording elements arranged in a first direction, the recording elements forming dots on the recording medium to form the image in accordance with the dot patterns, each of the dot patterns representing an arrangement of the dots corresponding to the graduated tone value for each of the pixels;

a relative movement device which causes the recording head and the recording medium to move relative to each other in a second direction that is substantially perpendicular to the first direction;

a recording element characteristics information acquisition device which acquires characteristics information representing recording characteristics of the recording elements based on recording states of the dots formed on the recording medium by the recording elements of the recording head;

a virtual recording element conversion device which converts the recording elements into a plurality of virtual recording elements and stores a correspondence relationship between positions of the virtual recording elements and positions of the recording elements, the virtual recording elements being disposed in an arrangement such that an adjacency relationship of the virtual recording elements in the first direction and an adjacency relationship of the dots formed on the recording medium in the first direction are preserved;

a correction function calculation device which determines a correction function that corrects recording element signals for the pixels corresponding to the virtual recording elements, in such a manner that banding caused by the recording characteristics of the recording elements is corrected in accordance with a correlation between each of the recording elements and surrounding recording elements of said each of the recording elements;

a corrected recording element signal calculation device which calculates corrected recording element signals correlated with the positions of the virtual recording elements for each of the graduated tone numbers by correcting the multiple-value image data of a single density image in accordance with the correction function, each of the corrected recording element signals being one of corrected recording element signal numbers, the single density image being such that all of the pixels constituting the single density image have a same graduated tone value corresponding to said each of the graduated tone numbers;

a corrected recording element signal table generation device which divides up the corrected recording element signals for each of the graduated tone numbers into a prescribed number of blocks arranged in the first direction to generate a plurality of corrected recording element signal tables respectively for the graduated tone numbers, each of the corrected recording element signal tables being constituted of the blocks of the corrected recording element signals corresponding to positions of the pixels in the multiple-value image data of the single density image;

a corrected recording element signal table storage device which stores the corrected recording element signal tables respectively for the graduated tone numbers;

a one-dimensional dot pattern table generation device which generates a one-dimensional dot pattern table which specifies a one-dimensional dot pattern for each of the corrected recording element signal numbers, the one-dimensional dot pattern representing an arrangement of the dots in the second direction and reproducing said each of the corrected recording element signal numbers;

a one-dimensional dot pattern table storage device which stores the one-dimensional dot pattern table generated by the one-dimensional dot pattern table generation device;

a corrected recording element signal conversion device which converts the multiple-value image data into a one-dimensional sequence of the corrected recording element signals in the first direction corresponding to the positions of the recording elements, by selecting the corrected recording element signals from one of the corrected recording element signal tables corresponding to the graduated tone value of each of the pixels according to a position and the graduated tone value of said each of the pixels;

a one-dimensional dot pattern conversion device which converts each of the corrected recording element signals of the one-dimensional sequence in the first direction into the one-dimensional dot pattern in the second direction, by reading out the one-dimensional dot pattern composed of a prescribed number of dot pixels, from the one-dimensional dot pattern table in accordance with said each of the corrected recording element signals of the one-dimensional sequence; and a recording control device which controls driving of the recording elements in accordance with the one-dimensional dot pattern converted by the one-dimensional dot pattern conversion device, and the correspondence relationship between the positions of the virtual recording elements and the positions of the recording elements stored by the virtual recording element conversion device.

6. An image forming method of forming an image on a recording medium by converting multiple-value image data of the image into dot patterns, the multiple-value image data being constituted of a plurality of pixels each of which has a graduated tone value that is one of graduated tone numbers, the image being formed by means of: a recording head which has a plurality of recording elements arranged in a first direction, the recording elements forming dots on the recording medium to form the image in accordance with the dot patterns, each of the dot patterns representing an arrangement of the dots corresponding to the graduated tone value for each of the pixels; and a relative movement device which causes the recording head and the recording medium to move relative to each other in a second direction that is substantially perpendicular to the first direction, the image forming method comprising the steps of:

acquiring characteristics information representing recording characteristics of the recording elements based on recording states of the dots formed on the recording medium by the recording elements of the recording head;

converting the recording elements into a plurality of virtual recording elements that are disposed in an arrangement such that an adjacency relationship of the virtual recording elements in the first direction and an adjacency relationship of the dots formed on the recording medium in the first direction are preserved;

storing a correspondence relationship between positions of the virtual recording elements and positions of the recording elements;

determining a correction function that corrects recording element signals for the pixels corresponding to the virtual recording elements, in such a manner that banding caused by the recording characteristics of the recording elements is corrected in accordance with a correlation between each of the recording elements and surrounding recording elements of said each of the recording elements;

calculating corrected recording element signals correlated with the positions of the virtual recording elements for each of the graduated tone numbers by correcting the multiple-value image data of a single density image in accordance with the correction function, each of the corrected recording element signals being one of corrected recording element signal numbers, the single density image being such that all of the pixels constituting the single density image have a same graduated tone value corresponding to said each of the graduated tone numbers;

generating a plurality of corrected recording element signal tables respectively for the graduated tone numbers by dividing up the corrected recording element signals for each of the graduated tone numbers into a prescribed number of blocks arranged in the first direction, each of the corrected recording element signal tables being constituted of the blocks of the corrected recording element signals corresponding to positions of the pixels in the multiple-value image data of the single density image;

storing the corrected recording element signal table correlated with the graduated tone value generated in the step of generating the corrected recording element signal table;

generating a one-dimensional dot pattern table which specifies a one-dimensional dot pattern for each of the corrected recording element signal numbers, the one-dimensional dot pattern representing an arrangement of the dots in the second direction and reproducing said each of the corrected recording element signal numbers;

storing the one-dimensional dot pattern table generated in the step of generating the one-dimensional dot pattern table;

converting the multiple-value image data into a one-dimensional sequence of the corrected recording element signals in the first direction corresponding to the positions of the recording elements, by selecting the corrected recording element signals from one of the corrected recording element signal tables corresponding to the graduated tone value of each of the pixels according to a position and the graduated tone value of said each of the pixels;

converting each of the corrected recording element signals of the one-dimensional sequence in the first direction into the one-dimensional dot pattern in the second direction, by reading out the one-dimensional dot pattern composed of a prescribed number of dot pixels, from the one-dimensional dot pattern table in accordance with said each of the corrected recording element signals of the one-dimensional sequence; and controlling driving of the recording elements in accordance with the converted one-dimensional dot pattern, and the correspondence relationship between the positions of the virtual recording elements and the positions of the recording elements stored in the step of storing the correspondence relationship.

* * * * *